(12) United States Patent
Nakamura

(10) Patent No.: US 7,458,663 B2
(45) Date of Patent: Dec. 2, 2008

(54) PRESSURE-REGULATING VALVE, FUNCTIONAL LIQUID SUPPLYING APPARATUS, IMAGING APPARATUS, METHOD OF MANUFACTURING ELECTRO-OPTIC DEVICE, ELECTRO-OPTIC DEVICE, AND ELECTRONIC APPARATUS

(75) Inventor: Tomonori Nakamura, Chino (JP)

(73) Assignee: Seiko Epson Corporation (JP)

( * ) Notice: Subject to any disclaimer, the term of this patent is extended or adjusted under 35 U.S.C. 154(b) by 369 days.

(21) Appl. No.: 11/251,359

(22) Filed: Oct. 14, 2005

(65) Prior Publication Data

US 2006/0108004 A1 May 25, 2006

(30) Foreign Application Priority Data

Nov. 19, 2004 (JP) .............................. 2004-336346

(51) Int. Cl.
B41J 2/175 (2006.01)

(52) U.S. Cl. ...................................................... 347/84

(58) Field of Classification Search .................. 347/84, 347/85, 86, 87
See application file for complete search history.

(56) References Cited

U.S. PATENT DOCUMENTS

| | | | | |
|---|---|---|---|---|
| 5,812,168 A | * | 9/1998 | Pawlowski et al. | 347/92 |
| 6,000,788 A | * | 12/1999 | Iida | 347/86 |
| 6,837,575 B2 | * | 1/2005 | Usui | 347/85 |
| 7,159,974 B2 | * | 1/2007 | Gray et al. | 347/86 |
| 7,278,718 B2 | * | 10/2007 | Aruga et al. | 347/85 |
| 2003/0146958 A1 | | 8/2003 | Aruga et al. | |

FOREIGN PATENT DOCUMENTS

| | | |
|---|---|---|
| JP | 2003-127014 | 5/2003 |
| JP | 2003-140177 | 5/2003 |
| JP | 2004-142405 | 5/2004 |

* cited by examiner

Primary Examiner—Anh T. N. Vo
(74) Attorney, Agent, or Firm—Harness, Dickey & Pierce, P.L.C.

(57) ABSTRACT

In a pressure-regulating valve which supplies a functional liquid from a functional liquid tank to a functional liquid droplet ejection head, using, as a reference regulating pressure, atmospheric pressure which a diaphragm receives, a valve-disc energizing spring, which energizes a valve disc for opening and closing a communication passage communicating a primary chamber and a secondary chamber, is configured so as to be separated from a housing main body along with a lid body.

10 Claims, 34 Drawing Sheets

FRONT ← → REAR
SIDE       SIDE

FIG. 2
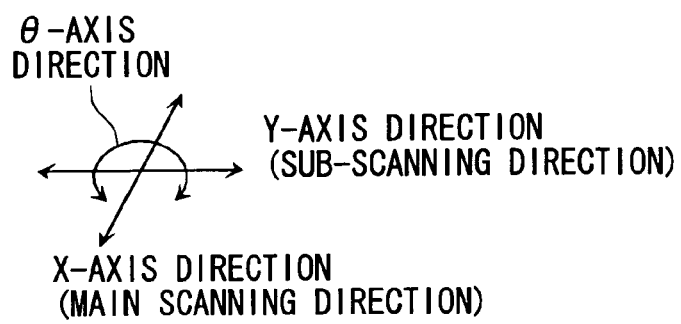
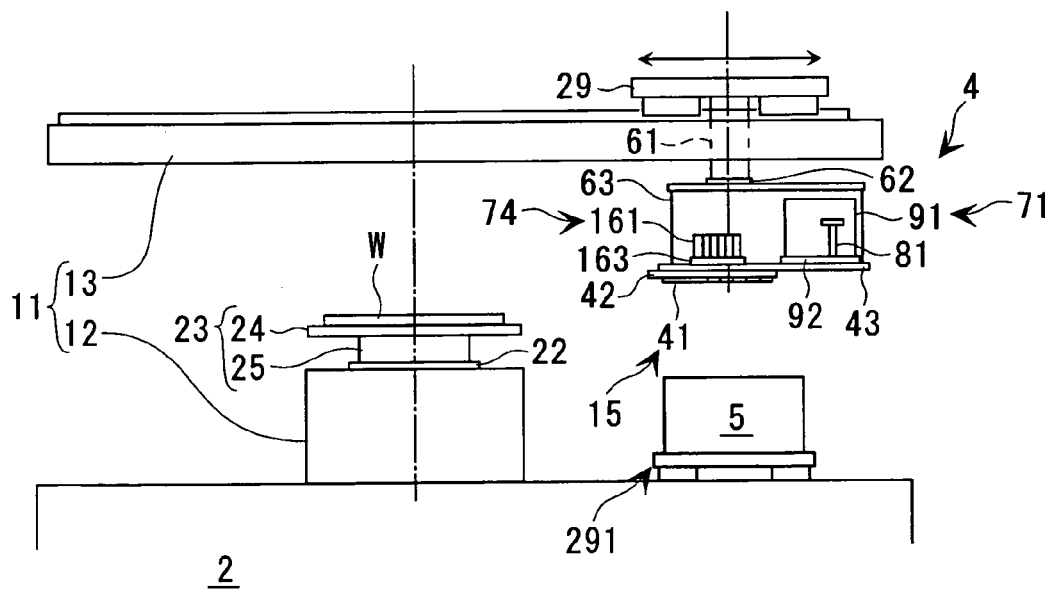

F I G. 4
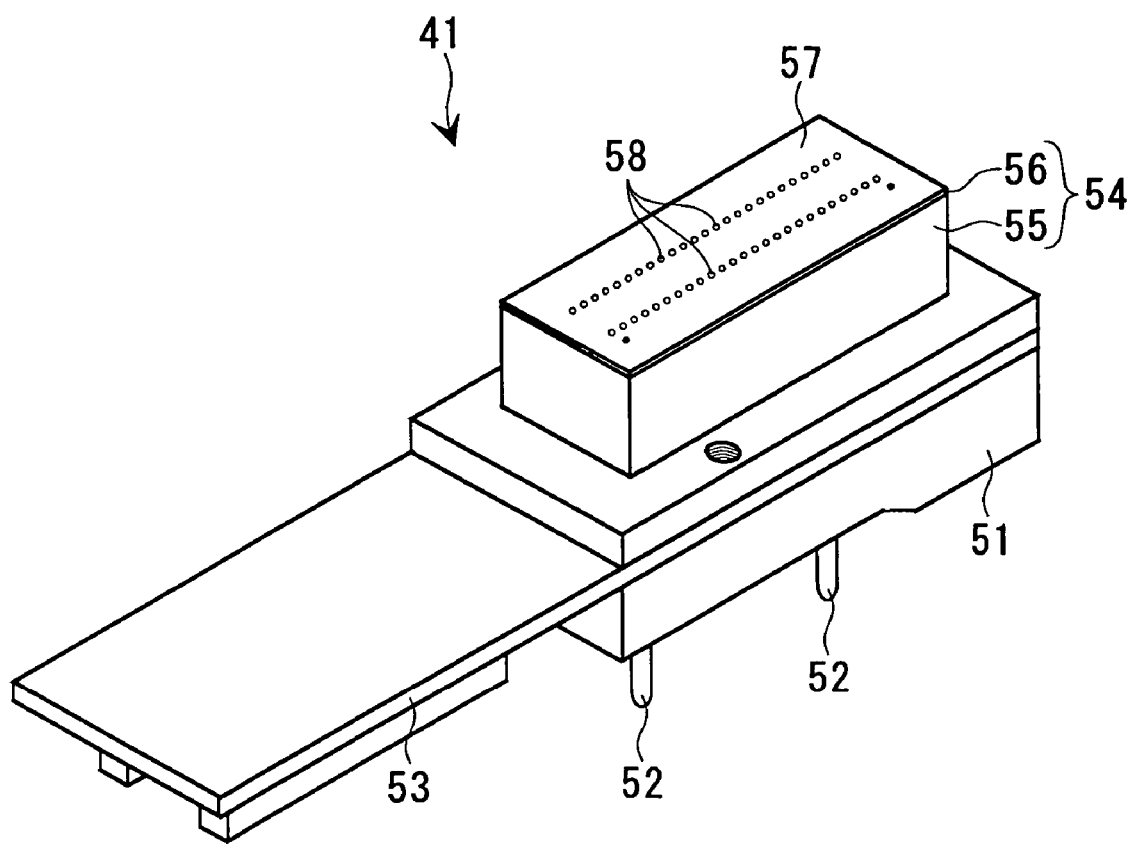

FIG. 8A
FIG. 8B
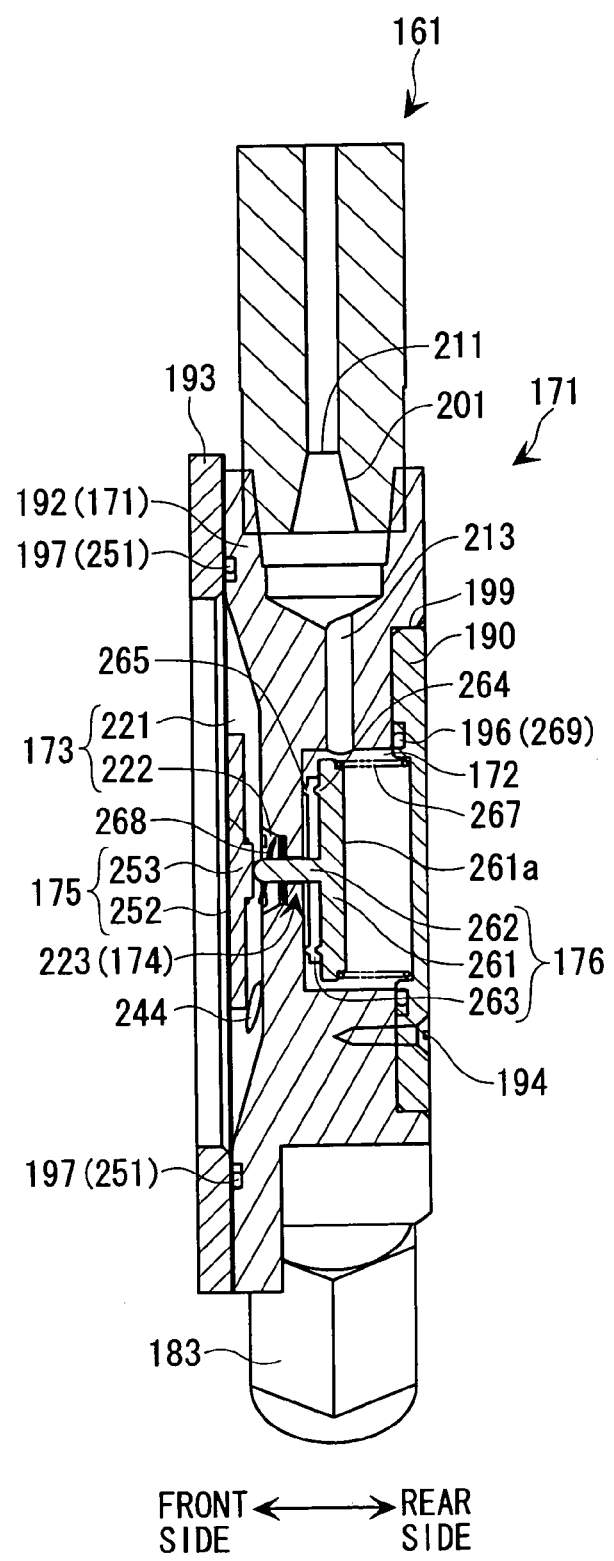
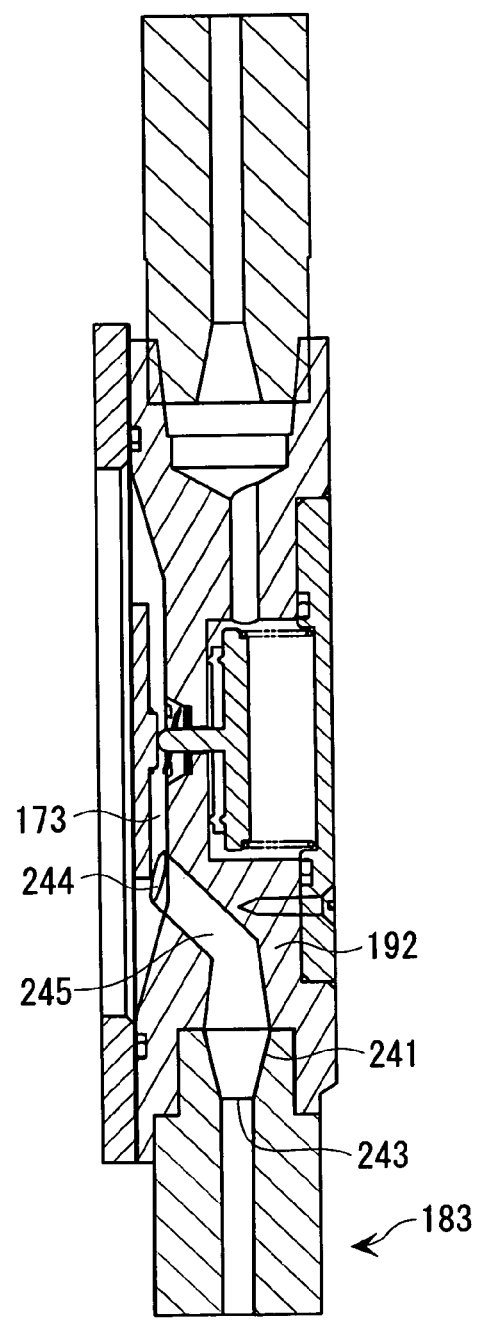
FRONT ← → REAR
SIDE        SIDE

FRONT SIDE ← → REAR SIDE

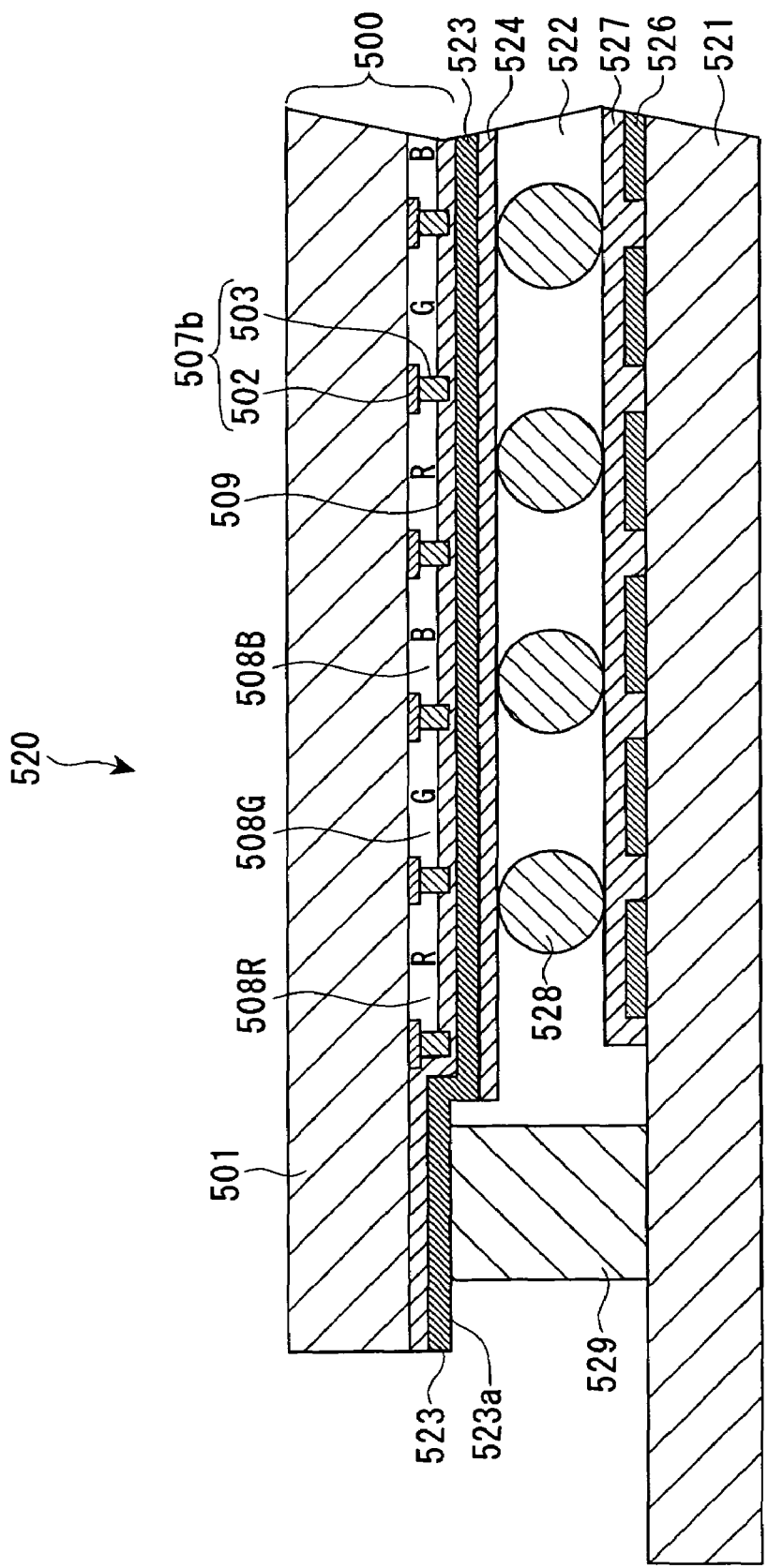

F I G. 3 2
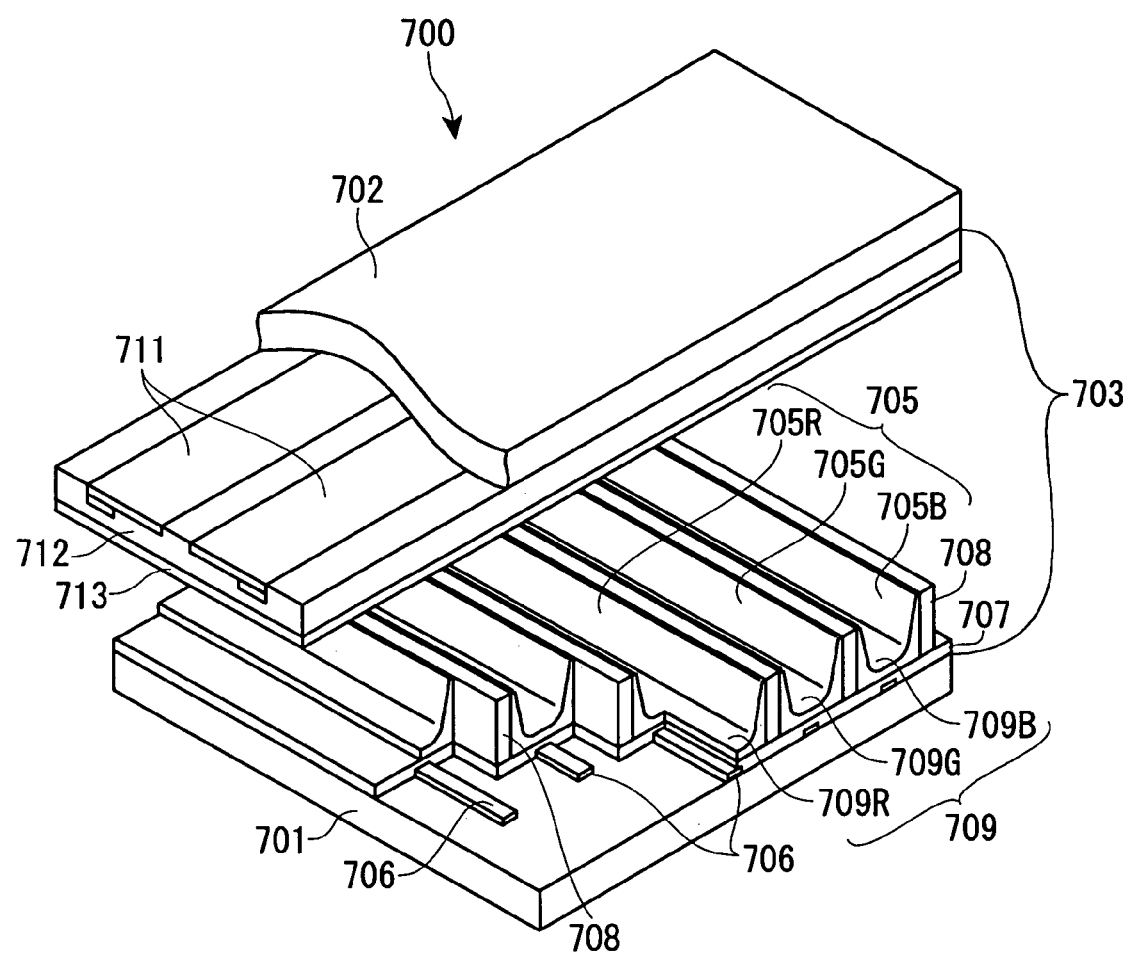

PRESSURE-REGULATING VALVE, FUNCTIONAL LIQUID SUPPLYING APPARATUS, IMAGING APPARATUS, METHOD OF MANUFACTURING ELECTRO-OPTIC DEVICE, ELECTRO-OPTIC DEVICE, AND ELECTRONIC APPARATUS

BACKGROUND OF THE INVENTION

1. Field of the Invention

The present invention relates to a pressure-regulating valve for supplying a functional liquid to a liquid droplet ejection head, a functional liquid supplying apparatus, an imaging apparatus, a method of manufacturing an electro-optic device, an electro-optic device, and an electronic apparatus.

2. Description of the Related Art

An imaging apparatus in which an ink jet printer as a kind of imaging apparatus is applied to an industrial purpose has a pressure-regulating valve (valve unit for supplying a liquid) which is disposed between a functional liquid tank filled with a functional liquid (ink) and the functional liquid droplet ejection head (ink jet head) in order to give the freedom in a position of installing the functional liquid tank relative to the functional liquid droplet ejection head. The pressure-regulating valve is constituted of: a housing (unit casing); a primary chamber (ink supplying chamber) which is formed by the housing and a first film member thermally welded thereto, and communicates with the functional liquid tank; a secondary chamber (pressure chamber) which is formed by the housing and a second film member (diaphragm) thermally welded thereto, and communicates with the functional liquid droplet ejection head; a communication passage (ink passage) for communicating the primary chamber and the secondary chamber; and a valve disc (movable valve) for opening and closing the communication passage.

A spring-receiving portion is attached to the first film member from the inside thereof, and a valve-disc energizing (or pushing) spring is disposed between the spring-receiving portion and the valve disc to energize the valve disc in a valve-closing direction. Furthermore, a negative-pressure holding spring is disposed between the diaphragm and the housing such that the diaphragm is energized to resist atmosphere from the inside thereof.

When the second chamber has a negative pressure relative to atmospheric pressure as a result of ink ejection from the liquid droplet ejection head, the valve disc is opened in such a way that the diaphragm resists the negative-pressure holding spring and the valve-disc energizing spring. As a result, the functional liquid in the primary chamber flows into the secondary chamber through the communication passage. When the negative pressure of the secondary chamber is canceled after the function liquid is kept flowing, the valve-disc energizing spring pushes back the valve disc to the secondary chamber side, and the negative-pressure holding spring pushes back the diaphragm until it is in the equilibrium state with atmospheric pressure. Accordingly, the valve disc is closed. In this manner, the negative-pressure holding spring and the valve-disc energizing spring expand and contract according to variation in pressure of the primary chamber and the secondary chamber, thereby allowing the functional liquid in the functional liquid tank to be supplied to the liquid droplet ejection head at a constant pressure.

Meanwhile, when a functional liquid having a different specific gravity is used in the pressure-regulating valve, the pressures in the primary chamber and the secondary chamber vary, making it necessary to replace the valve-disc energizing spring and the negative-pressure holding spring so far used with those having repulsion corresponding to the specific gravity of the functional liquid to be used. When a functional liquid having a large specific gravity is used, for example, the pressure generated by the head difference between the liquid droplet ejection head and the valve disc becomes large. As a result, it becomes necessary to increase the force of repulsion of the valve-disc energizing spring to secure improved sealing property of the valve disc. Conversely, when a functional liquid having a small specific gravity is used, it is required to decrease the force of repulsion of the spring. Moreover, the valve-disc energizing spring and the negative-pressure holding spring must be replaced with new ones, because they could be corroded depending on the functional liquid used.

In the conventional pressure-regulating valve, however, the primary chamber having the valve-disc energizing spring accommodated therein is sealed by the first film member and the secondary chamber having the negative-pressure holding spring accommodated therein is sealed by the second film member. Therefore, the springs cannot be replaced independently, thus the entire pressure-regulating valve must be replaced. Alternatively, it is required to change the height of the functional liquid tank and the valve disc. But, such replacing and adjusting operations are liable to make things complicated.

SUMMARY OF THE INVENTION

It is an advantage of the invention to provide a pressure-regulating valve in which a valve-disc energizing spring or a negative-pressure holding spring incorporated can be easily replaced, a functional liquid supplying apparatus, an imaging apparatus, a method of manufacturing an electro-optic device, an electro-optic device, and an electronic apparatus.

According to one aspect of the invention, there is provided a pressure-regulating valve which is interposed between a functional liquid droplet ejection head for ejecting a functional liquid droplet to perform an imaging process on a workpiece and a functional liquid tank for supplying a functional liquid to the functional liquid droplet ejection head, supplies to the functional liquid droplet ejection head through a secondary chamber a functional liquid introduced from the functional liquid tank to a primary chamber, and opens and closes a communication passage for communicating the primary chamber and the secondary chamber using, as a reference regulating pressure, atmospheric pressure which a diaphragm constituting one surface of the secondary chamber and exposed to atmosphere receives. The pressure-regulating valve comprises: a valve housing forming the primary chamber and the secondary chamber; a valve disc for opening and closing the communication passage; and a valve-disc energizing spring for energizing the valve disc in a valve-closing direction, using as a receiver a spring-receiving portion of the valve housing, wherein the valve housing is constituted of a housing main body and a lid body having the spring-receiving portion and detachably attached to the housing main body, and the valve-disc energizing spring is configured so as to be separated from the housing main body along with separation of the lid body.

According to this configuration, when a functional liquid having a different specific gravity is introduced, the lid body is pulled out from the housing main body, so that the primary chamber is left open to atmosphere and the valve-disc energizing spring can be replaced with one having repulsion corresponding to the specific gravity of the functional liquid. Furthermore, such a replacing operation can cope with features such as corrosion other than specific gravity as well.

This is to say that it is only necessary to keep, as replacement parts, common parts which can be commonly used irrespective of the material feature of a functional liquid and corresponding parts so as to correspond to the material feature are prepared in a state that they are prior to being built together. Accordingly, it is not required to, for example, replace the whole pressure-regulating valve, adjust the height of the functional liquid tank and the pressure-regulating valve, or the like.

In this case, it is preferable that the valve-disc energizing spring and the lid body be linked to each other.

According to this configuration, when a functional liquid having a different specific gravity is introduced, the valve-disc energizing spring can be detached along with separation of the lid body, thereby making it possible to complete a replacing operation simply and in a short period of time.

In this case, it is preferable that the valve disc be configured so as to be separated from the housing main body along with separation of the valve-disc energizing spring.

According to this configuration, when the valve disc having a different material or feature is used so as to correspond to the functional liquid having a different material, or when the valve disc is deteriorated, the valve disc can be also replaced after the valve-disc energizing spring is removed.

In this case, it is preferable that the valve-disc energizing spring and the valve disc be linked to each other.

According to this configuration, the valve disc can be detached along with separation of the valve-disc energizing spring, thereby making it possible to complete a replacing operation in a short period of time.

In this case, it is preferable that the valve disc be constituted of a valve-disc main body and a valve seal detachably attached to the valve-disc main body.

According to this configuration, in a case where the valve seal is deteriorated, it can be independently replaced.

In this case, it is preferable that the valve-disc energizing spring be constituted of a coil spring, and the valve disc be provided with a leading-end engaging portion where a leading-end portion on a valve-disc side of the valve-disc energizing spring is engaged in a positioned (or aligned) state.

According to this configuration, when the valve-disc energizing spring for replacement is attached to the valve disc incorporated into the housing, it is possible to easily secure the relative positional accuracy between the valve-disc energizing spring and the valve disc and complete the attachment operation in a short period of time.

In this case, it is preferable that the lid body be provided with a proximal-end engaging portion where a proximal-end portion on a lid body side of the valve-disc energizing spring is engaged in a positioned state.

According to this configuration, when the lid body is attached to the valve-disc energizing spring after the valve-disc energizing spring for replacement is attached to the valve disc, it is possible to easily secure the relative positional accuracy between the lid body and the valve-disc energizing spring and complete the attachment operation in a short period of time.

According to another aspect of the invention, there is provided a pressure-regulating valve which is interposed between a functional liquid droplet ejection head for ejecting a functional liquid droplet to perform an imaging process on a workpiece and a functional liquid tank for supplying a functional liquid to the functional liquid droplet ejection head, supplies to the functional liquid droplet ejection head through a secondary chamber a functional liquid introduced from the functional liquid tank to a primary chamber, and opens and closes a communication passage for communicating the primary chamber and the secondary chamber using, as a reference regulating pressure, atmospheric pressure which a diaphragm constituting one surface of the secondary chamber and exposed to atmosphere receives. The pressure-regulating valve comprising: a valve housing forming the primary chamber and the secondary chamber; a valve disc for opening and closing the communication passage; and a valve-disc energizing spring for energizing the valve disc in a valve-closing direction, using as a receiver a spring-receiving portion of the valve housing, wherein the valve housing is constituted of a secondary-chamber housing forming the secondary chamber and the communication passage and of a primary-chamber housing having the spring-receiving portion and detachably attached to the secondary-chamber housing, and the valve-disc energizing spring is configured so as to be separated from the secondary-chamber housing along with separation of the primary-chamber housing.

According to this configuration, when a functional liquid having a different specific gravity is introduced, the primary chamber housing of the pressure-regulating valve is pulled out from the secondary chamber housing, so that the primary chamber is left open to atmosphere and the valve-disc energizing spring can be replaced with one having repulsion corresponding to the specific gravity of the functional liquid. Furthermore, such a replacing operation can cope with features such as corrosion other than specific gravity as well. This is to say that it is only necessary to keep, as replacement parts, common parts which can be commonly used irrespective of the material feature of a functional liquid and corresponding parts so as to correspond to the material feature are prepared in a state that they are prior to being built together. Accordingly, it is not required to, for example, replace the whole pressure-regulating valve, adjust the height of the functional liquid tank and the pressure-regulating valve, or the like.

According to still another aspect of the invention, there is provided a pressure-regulating valve which is interposed between a functional liquid droplet ejection head for ejecting a functional liquid droplet to perform an imaging process on a workpiece and a functional liquid tank for supplying a functional liquid to the functional liquid droplet ejection head, supplies to the functional liquid droplet ejection head through a secondary chamber a functional liquid introduced from the functional liquid tank to a primary chamber, and opens and closes a communication passage for communicating the primary chamber and the secondary chamber using, as a reference regulating pressure, atmospheric pressure which a diaphragm constituting one surface of the secondary chamber and exposed to atmosphere receives. The pressure-regulating valve comprises: a valve housing forming the primary chamber and the secondary chamber; a valve disc for opening and closing the communication passage; a valve-disc energizing spring for energizing the valve disc in a valve-closing direction, using as a receiver a spring-receiving portion of the valve housing, and a negative-pressure holding spring for energizing the diaphragm in a direction resisting atmospheric pressure, wherein the diaphragm is detachably attached to the valve housing, and the negative-pressure holding spring is configured so as to be separated from the valve housing along with separation of the diaphragm.

According to this configuration, when a functional liquid having a different specific gravity is introduced, the diaphragm is pulled out from the valve housing, so that the secondary chamber is left open to atmosphere and the negative-pressure holding spring can be replaced with one having repulsion corresponding to the specific gravity of the functional liquid. Furthermore, such a replacing operation can cope with features such as corrosion other than specific gravity as well. This is to say that it is only necessary to keep, as replacement parts, common parts which can be commonly used irrespective of the material feature of a functional liquid and corresponding parts so as to correspond to the material feature are prepared in a state that they are prior to being built together. Accordingly, it is not required to, for example, replace the whole pressure-regulating valve, adjust the height of the functional liquid tank and the pressure-regulating valve, or the like.

In this case, it is preferable that the pressure-regulating valve further comprise a diaphragm holder for holding the diaphragm in a stretched state, and the diaphragm be detachably attached to the valve housing through the diaphragm holder.

According to this configuration, the diaphragm can be replaced together with the diaphragm holder. Accordingly, when the diaphragm is replaced with a new one, the operation of stretching the same is not required, thereby making it possible to complete a replacing operation of the diaphragm easily and in a short period of time.

According to still another aspect of the invention, there is provided a functional liquid supplying apparatus constituted of a functional liquid tank and the pressure-regulating valves as described in any one of the above interposed in a functional liquid passage connecting the functional liquid tank and a functional liquid droplet ejection head.

According to this configuration, when a functional liquid having a different specific gravity is introduced, or when one of the constituent members of the pressure-regulating valve is deteriorated, it is possible to cope with such a problem easily and in a short period of time.

According to still another aspect of the invention, there is provided an imaging apparatus which moves a functional liquid droplet ejection head connected to a functional liquid tank through a functional liquid passage relative to a workpiece and makes the functional liquid droplet ejection head drive to eject an droplet so as to perform an imaging operation on the workpiece with a functional liquid droplet, wherein the functional liquid passage has the pressure-regulating valve as described in any one of the above interposed therein.

According to this configuration, the imaging apparatus has the pressure-regulating valve of which a valve-disc energizing spring can be replaced interposed therein. Accordingly, when a functional liquid having a different specific gravity is introduced, or when one of the constituent members of the pressure-regulating valve is deteriorated, it is possible to replace the valve-disc energizing spring or the like easily and in a short period of time.

According to still another aspect of the invention, there are provided a method of manufacturing an electro-optic device and an electro-optic device, wherein a film-deposited portion of functional liquid droplets is formed on the workpiece by the use of the imaging apparatus.

According to this configuration, an electro-optic device is manufactured by the imaging apparatus capable of replacing parts of a pressure-regulating valve easily and in a short period of time. Accordingly, it is possible to reduce stop time of the apparatus in its manufacturing step and efficiently form the film-deposited portion. Examples of electro-optic devices include a liquid crystal device, an organic EL (Electro-Luminescence) device, an electron emission device, a PDP (Plasma Display Panel) device, an electrophoresis unit, or the like. Note that the electron emission device refers to a concept including a so-called FED (Field Emission Display) device or SED (Surface-Conduction Electron-Emitter Display) device.

Moreover, examples of electro-optic devices include devices for forming metal wiring, lens, resist, light diffuser, or the like According to still another aspect of the invention, there is provided an electronic apparatus incorporating therein an electro-optic device manufactured by the method as described above, or incorporating therein an electro-optic device as described above.

In this case, an electronic apparatus corresponds to a mobile phone having a so-called flat panel display mounted thereon, a personal computer, various electronic appliances.

BRIEF DESCRIPTION OF THE DRAWINGS

The above and other objects and the attendant features of the invention will become readily apparent by reference to the following detailed description when considered in conjunction with the accompanying drawings wherein:

FIG. 2 is a front schematic diagram of the imaging apparatus according to an embodiment of the invention;

FIG. 4 is an external perspective view of a functional liquid droplet ejection head;

FIGS. 8A and 8B are illustrations of the pressure-regulating valve, each showing its vertical cross section and vertical cross section schematic diagram showing the inner structure ranging from an inlet port to an outlet port through a valve disc;

FIG. 19 is a cross section of an essential part showing a schematic configuration of a liquid crystal device using the color filter to which the invention is applied;

FIG. 32 is an exploded perspective view of an essential part of a display device as a plasma display panel (PDP device);

DETAILED DESCRIPTION OF THE PREFERRED EMBODIMENTS

Hereinafter, an imaging apparatus to which the invention is applied will be described with reference to the accompanying drawings. The imaging apparatus is built in a production line of a so-called flat panel display and forms light-emitting elements or the like serving as a color filter of a liquid-crystal display device or each pixel of an organic EL (electro-luminescence) device according to a liquid droplet ejection method using a functional liquid droplet ejection head.

Figure 1:
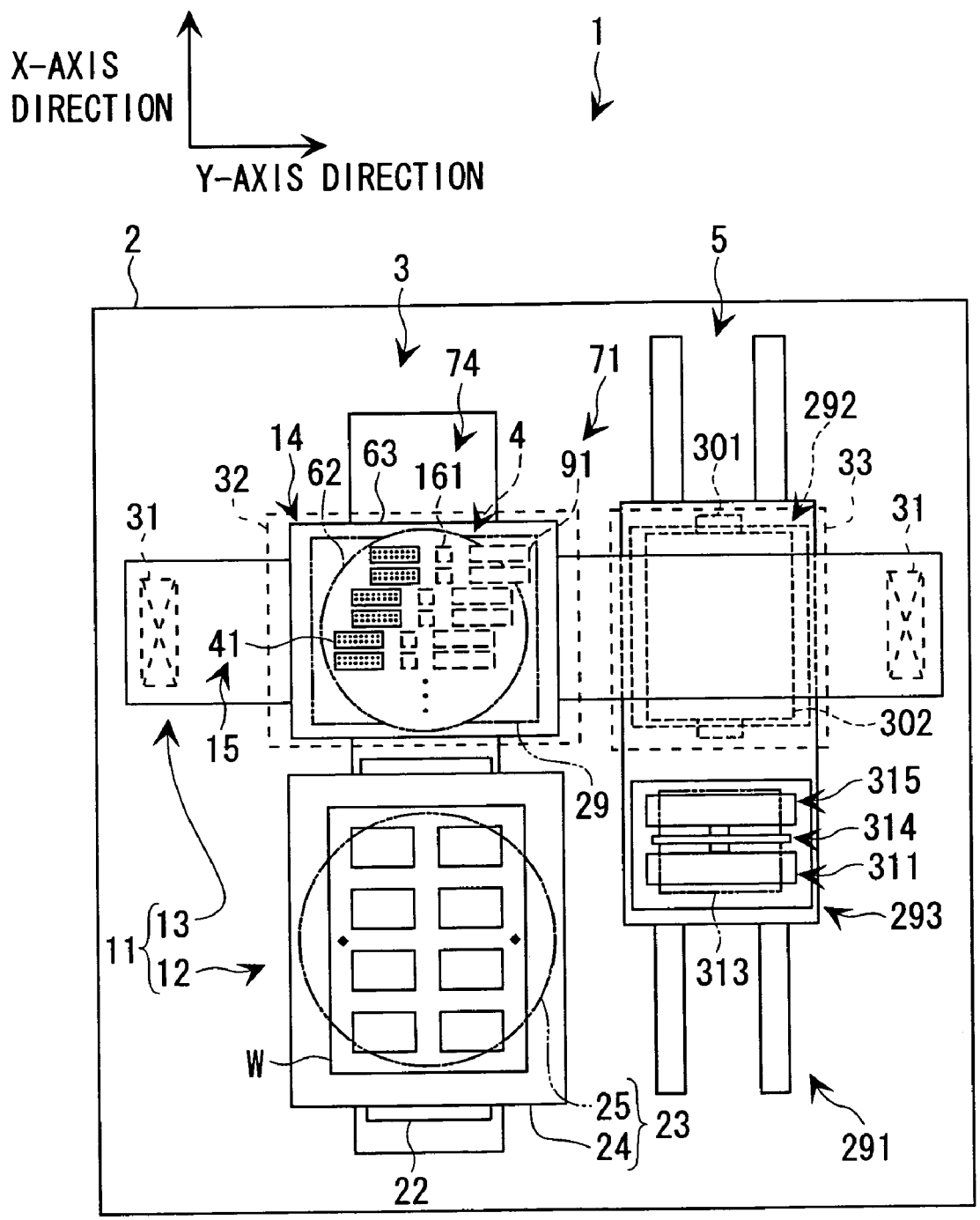
FIG. 1 is a plan schematic diagram of an imaging apparatus according to an embodiment of the invention.

As shown in FIGS. 1 and 2, the imaging apparatus 1 includes a base 2, a liquid droplet ejection apparatus 3 having a functional liquid droplet ejection head 41 and mounted on the whole base 2, a functional liquid supplying apparatus 4 connected to the liquid droplet ejection apparatus 3, and a head maintenance apparatus 5 mounted on the base 2 in a manner attached to the liquid droplet ejection apparatus 3. Furthermore, the imaging apparatus 1 is provided with a control apparatus 6 (not shown in the figures). In the imaging apparatus 1, the liquid droplet ejection apparatus 3 performs an imaging operation on a workpiece W based on the control by the control apparatus 6 while being supplied with a functional liquid from the functional liquid supplying apparatus 4, and the head maintenance apparatus 5 performs a maintenance operation on the functional liquid droplet ejection head 41, where necessary.

The liquid droplet ejection apparatus 3 has an X-Y axis moving mechanism 11 made up of an X-axis table 12 for moving the workpiece W in a main scanning direction (in an X-axis direction) and a Y-axis table 13 located perpendicular to the X-axis table 12, a main carriage 14 movably attached to the Y-axis table 13, and a head unit 15 suspended from the main carriage 14 and having the functional liquid droplet ejection head 41 mounted thereon.

The X-axis table 12 has an X-axis slider 22 driven by an X-axis motor (not shown) constituting a driving system in the X-axis direction, on which a set table 23 made up of a suction table 24, a θ table 25, or the like is movably mounted. Similarly, the Y-axis table 13 has a Y-axis slider 29 driven by a Y-axis motor (not shown) constituting a driving system in the Y-axis direction, on which the main carriage 14 supporting the head unit 15 is movably mounted. Note that the X-axis table 12 is disposed in a direction parallel with the X-axis and directly supported by the base 2. On the other hand, the Y-axis table 13 is supported by left and right columns 31 provided on the base 2 in a standing manner and extends in the Y-axis direction in such a way as to bridge over the X-axis table 12 and the head maintenance apparatus 5 (see FIGS. 1 and 2).

In the imaging apparatus 1, an area where the X-axis table 12 and the Y-axis table 13 cross each other is an imaging area for performing an imaging operation on the workpiece W, and an area where the Y-axis table 13 and the head maintenance apparatus 5 cross each other is a maintenance area 33 for performing a function-recovery process on the functional liquid droplet ejection head 41. The head unit 15 faces the imaging area 32 when the imaging operation is performed on the workpiece W, and faces the maintenance area 33 when the function-recovery process is performed.

The head unit 15 includes a plurality of (twelve) functional liquid droplet ejection heads 41 and a head plate 42 having the functional liquid droplet ejection heads 41 mounted thereon through a head maintenance member (not shown). The head plate 42 is detachably supported by a support frame 43, and the head unit 15 is positioned and mounted on the main carriage 14 through the support frame 43. As described in detail later, the support frame 43 supports a valve unit 74 of the functional liquid supplying apparatus 4 and a tank unit 71 along with the head unit 15 (see FIGS. 1 and 3).

As shown in FIG. 4, the functional liquid droplet ejection head 41 is of a so-called duplex type and includes a functional liquid introduction section 51 having duplex-type connecting needles 52, a duplex-type head substrate 53 connected to the functional liquid introduction section 51, and a head main body 54 connected to the lower part of the functional liquid introduction section 51 and having inside a liquid path filled with a functional liquid. The connecting needles 52 are connected to the functional liquid supplying apparatus 4 not shown in the figure and supply a functional liquid to the liquid passage of the functional liquid droplet ejection head 41. The head main body 54 includes a cavity 55 (piezoelectric element) and a nozzle plate 56 having a nozzle surface 57 on which ejection nozzles 58 with an opening are formed. On the nozzle surface 57 are formed nozzle rows made up of a plurality (180 pieces) of the ejection nozzles 58. When the functional liquid droplet ejection head 41 is driven for ejecting a functional liquid droplet, a functional liquid droplet is ejected from the ejection nozzles 58 by a pumping action of the cavity 55.

Figure 3:
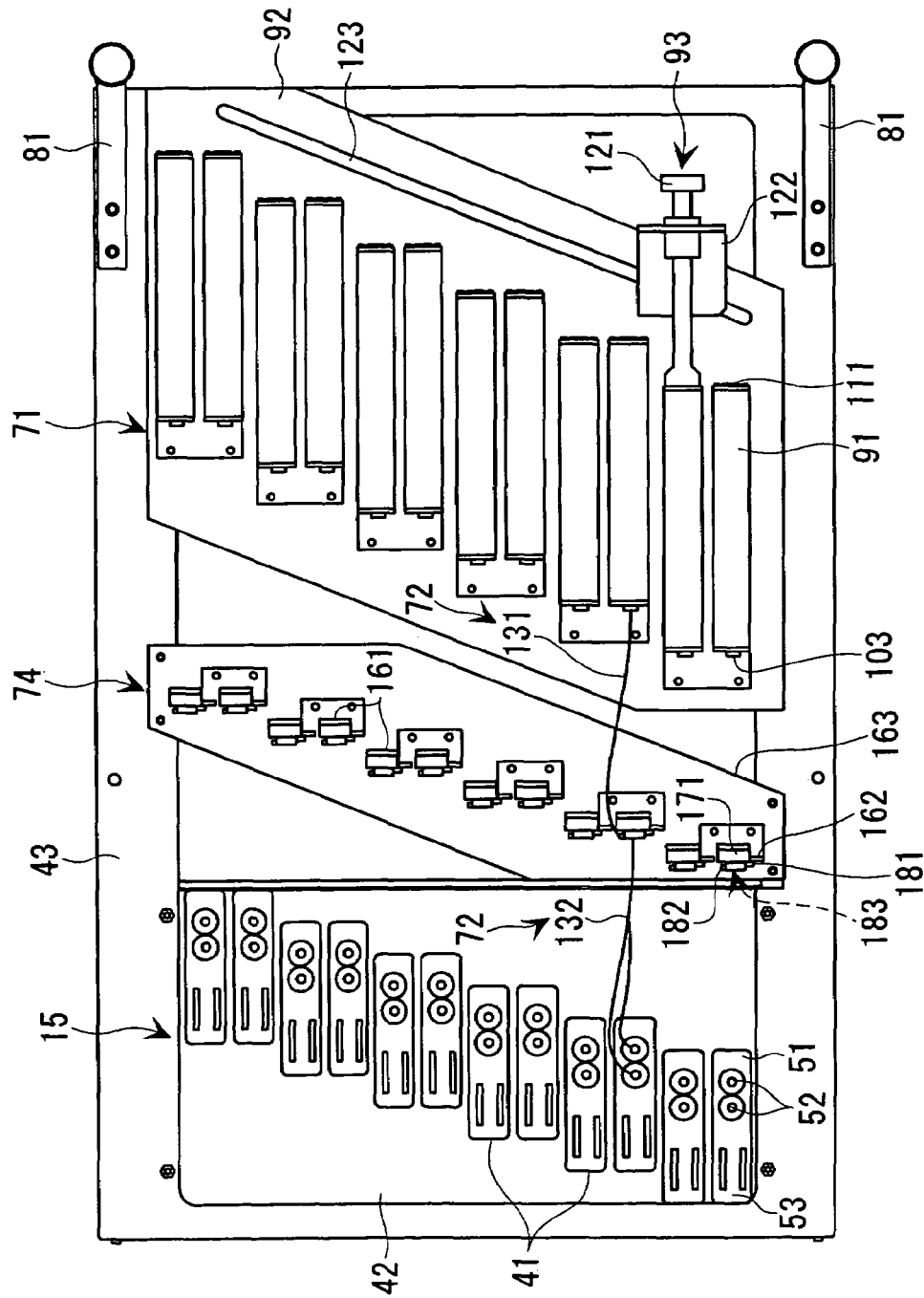
FIG. 3 is a plan schematic diagram showing a support frame and its surrounding components.

As shown in FIG. 3, the head plate 42 is constituted of a quadrate thick plate made of a stainless steel or the like. On the head plate 42 are positioned twelve functional liquid droplet ejection heads 41, and twelve installation openings (not shown) are formed thereon to fix the heads from the back surface side of the head plate through a head holding member. The twelve installation openings are grouped into six pairs, each pair having two openings. The installation openings of respective pairs are formed in such a way as to be shifted in a direction orthogonal to the nozzle rows of the functional liquid droplet ejection heads 41 (longitudinal direction of the head plate 42) so that they are partially overlapped with each other. In other words, the twelve functional liquid droplet ejection heads 41 are grouped into six pairs, each pair having two functional liquid droplet ejection heads, and the nozzle rows of the functional liquid droplet ejection heads of the respective pairs are arranged in a staircase pattern in a direction orthogonal to the nozzle rows so that they are partially overlapped with each other (see FIG. 3).

Note that the two nozzle rows formed on the respective functional liquid droplet ejection heads 41 are made up of a plurality (180 pieces) of the ejection nozzles 58, each being disposed with a pitch of about four dots, and the both nozzle rows are disposed with a pitch of about two dots in such a way as to be shifted in a row direction. In other words, the respective functional liquid droplet ejection heads 41 have the two nozzle rows, thereby forming imaging lines with a pitch of two dots. On the other hands, two neighboring functional liquid droplet ejection heads 41 as a pair are disposed such that imaging lines (with a pitch of two dots) are shifted in a row direction by one dot, thus enabling a pair of functional liquid droplet ejection heads 41 to form an imaging line with a pitch of one dot. In other words, the two functional liquid droplet ejection heads 41 as a pair are disposed such that respective nozzle rows with a resolution of one-fourth are shifted together, thereby achieving a nozzle row with a high resolution (one resolution) of one imaging line in conjunction with the five other pairs of ten functional liquid droplet ejection heads 41.

As shown in FIG. 2, the main carriage 14 is constituted of an "I"-shaped suspension member 61 fixed to the Y-axis table 13 from the lower side thereof, a θ-angle rotation mechanism 62 attached to the lower surface of the suspension member 61 for adjusting the angle in the θ direction (of the head unit 15), and a carriage main body 63 attached underneath the θ-angle rotation mechanism 62 so as to be suspended therefrom. The carriage main body 63 supports the head unit 15 through the support frame 43. Although omitted in the figure, the carriage main body 63 is formed with a quadrate opening into which the support frame 43 is loosely fitted and provided with a positioning mechanism for positioning the support frame 43, thereby fixing the head unit 15 in a positioned state.

As shown in FIGS. 1 to 3, the functional liquid supplying apparatus 4 is mounted on the support frame 43 together with the head unit 15. The functional liquid supplying apparatus includes a tank unit 71 made up of a plurality of (12) functional liquid tanks 91 for storing a functional liquid, a plurality of (12) functional liquid supplying tubes (functional liquid passages) 72 for connecting the corresponding functional liquid tanks 91 and the functional liquid droplet ejection heads 41, a plurality of (12) connection fittings 73 for connecting the functional liquid supplying tubes 72 to the corresponding functional liquid tanks 91 and the functional liquid droplet ejection heads 41, and a valve unit 74 made up of a plurality of (12) pressure-regulating valves 161 interposed in the plurality of functional liquid supplying tubes 72.

As shown in FIG. 3, the support frame 43 is formed in approximately a quadrate frame-shape. The head unit 15, the valve unit 74, and the tank unit 71 are mounted on the support frame in this order in a longitudinal direction thereof. Note that the support frame 43 is attached with a pair of handles 81 at long sides thereof, thereby permitting the user to detachably put the support frame 43 in the main carriage 14 (carriage main body 63).

The tank unit 71 is constituted of the twelve functional liquid tanks 91, a tank plate 92 having twelve setting portion 111 for positioning the functional liquid tanks to thereby support the same, and a tank setting jig 93 for mounting (setting) the functional liquid tanks 91 to the setting portion 111, respectively. The functional liquid tanks 91 are of a cartridge type and include a functional liquid package 101 having a functional liquid vacuum-packed therein and a resinous cartridge casing 108 for accommodating the functional liquid package 101. Note that the functional liquid to be stored in the functional liquid package 101 is previously degassed and has approximately a zero amount of a dissolved gas.

The functional liquid package 101 is of a bag type formed by superposing and thermally-welding two rectangular (flexible) film sheets 102 (not shown) together and is provided with a resinous supplying port 103 for supplying a functional liquid. The supplying port 103 has a communication opening 104 formed therein to be communicated with the inside of the package. The communication opening 104 is closed by a closing member 105 made of an elastic material such as butyl rubber having corrosion resistance to functional liquids, thereby preventing air (oxygen) or humidity from entering in the communication opening 104.

The tank plate 92 is formed of a thick plate such as a stainless steel in approximately a parallelogram shape. On the tank plate 92, as shown in FIG. 3, the functional liquid tanks 91 are positioned in a standing manner with the supplying port 103 thereof facing the valve unit 74 side, and the twelve setting portions 111 are also provided to detachably set the functional liquid tanks in position. As shown in the same figure, the setting portions 111 are arranged in the same manner as that of the twelve functional liquid droplet ejection heads 41 mounted on the head plate 42. In other words, the twelve functional liquid tanks 91 are grouped into six pairs, each having two functional liquid tanks, and are arranged in such a way as to be shifted to the direction on the short side of the support frame 43 along the long side of the tank plate 92, with the supplying ports 103 (front surfaces of the functional liquid tanks 91) facing the functional liquid droplet ejection heads 41.

The rear surface (surface opposite to the front surface of the functional liquid tank 91) of the functional liquid tank 91 is pushed forward with the tank setting jig 93 so that the functional liquid tank 91 slides forward to be set in the setting portion 111. The tank setting jig includes a pressure lever 121 for pushing out the functional liquid tank 91 and a support member 122 for supporting the pressure lever 121. The support member 122 is moved to a point where the functional liquid tank is set, thereby making the pressure lever 121 face against the respective functional liquid tanks 91. Thus, the functional liquid tank 91 can be properly set in position.

The functional liquid supplying tube 72 includes a tank-side tube 131 for connecting the corresponding functional liquid tanks 91 and the pressure-regulating valves 161, and a head-side tube 132 for connecting the corresponding pressure-regulating valves 161 and the functional liquid droplet ejection heads 41.

The connection fitting 73 includes a tank-side adapter 141 for connecting the functional liquid tank 91 and the tank-side tube 131, and a head-side adapter 158 for connecting the functional liquid droplet ejection head 41 and the head-side tube 132. The tank-side adapter 141 has a connecting needle 152 provided therein, the center of which is formed with a passage. The connecting needle 152 is connected with the functional liquid package 101 after being penetrated and inserted into the closing member 105 of the functional liquid package 101 (communication opening 104).

The valve unit 74 is constituted of twelve pressure-regulating valve 161, twelve valve support members 162 for supporting the twelve pressure-regulating valves 161, and a stainless valve plate 163 for supporting the twelve pressure-regulating valve 161 through the valve support member (see FIG. 3).

The valve plate 163 has twelve valve support members 162 mounted thereon in a standing manner, and the twelve pressure-regulating valves 161 are supported by the twelve valve support members 162 in such a way as to be shifted to the short side of the support frame 43 (FIG. 3).

Figure 6:
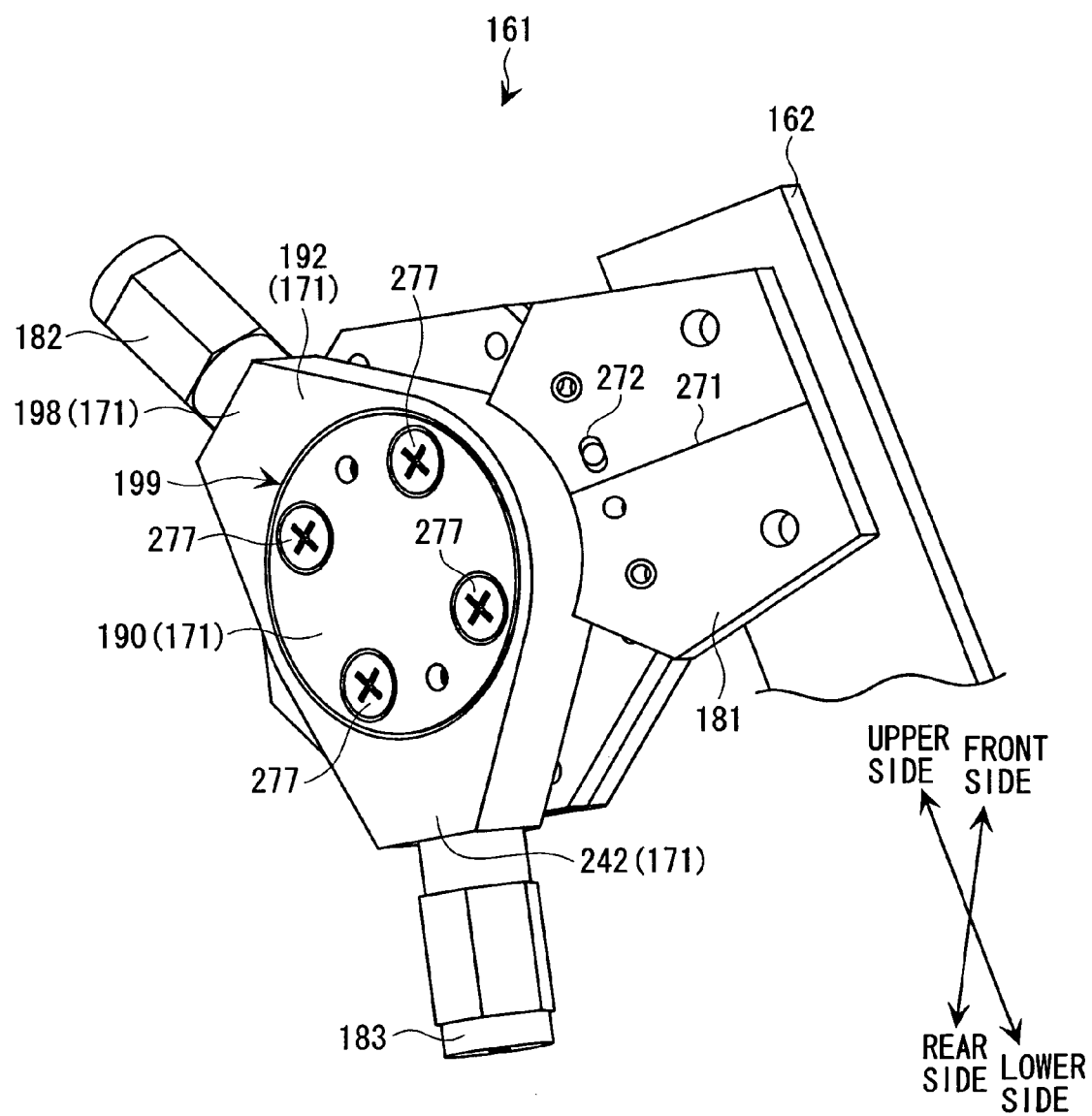
FIG. 6 is an external perspective view of the pressure-regulating valve as shown from its back surface side.
Figure 7A:
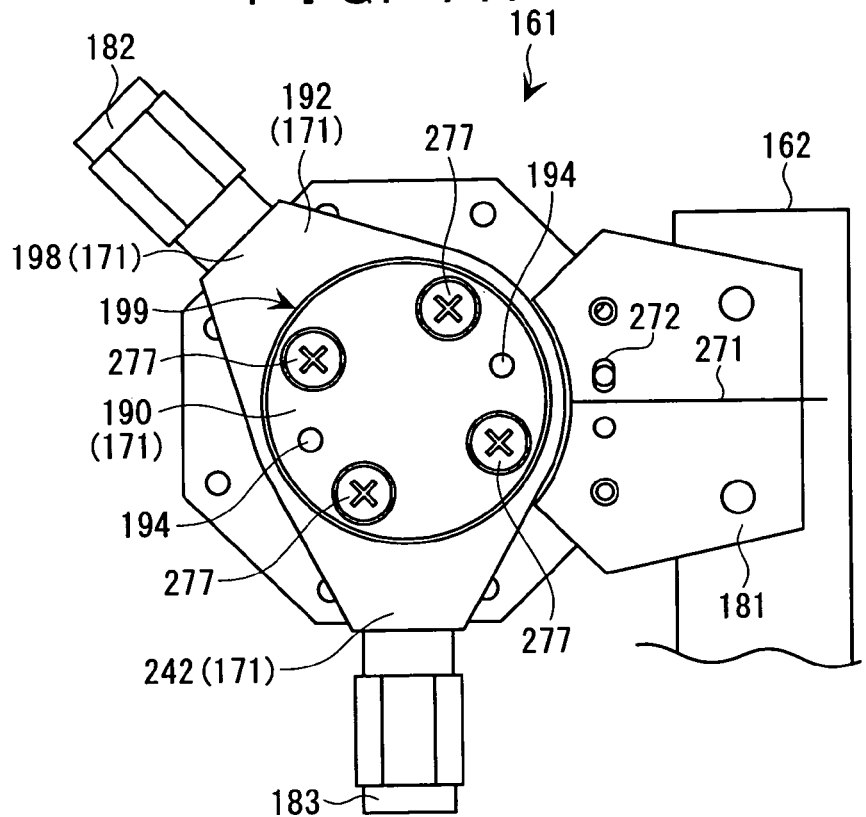
FIGS. 7A and 7B are illustrations of the pressure-regulating valve, each showing its back view and front-view.
Figure 7B:
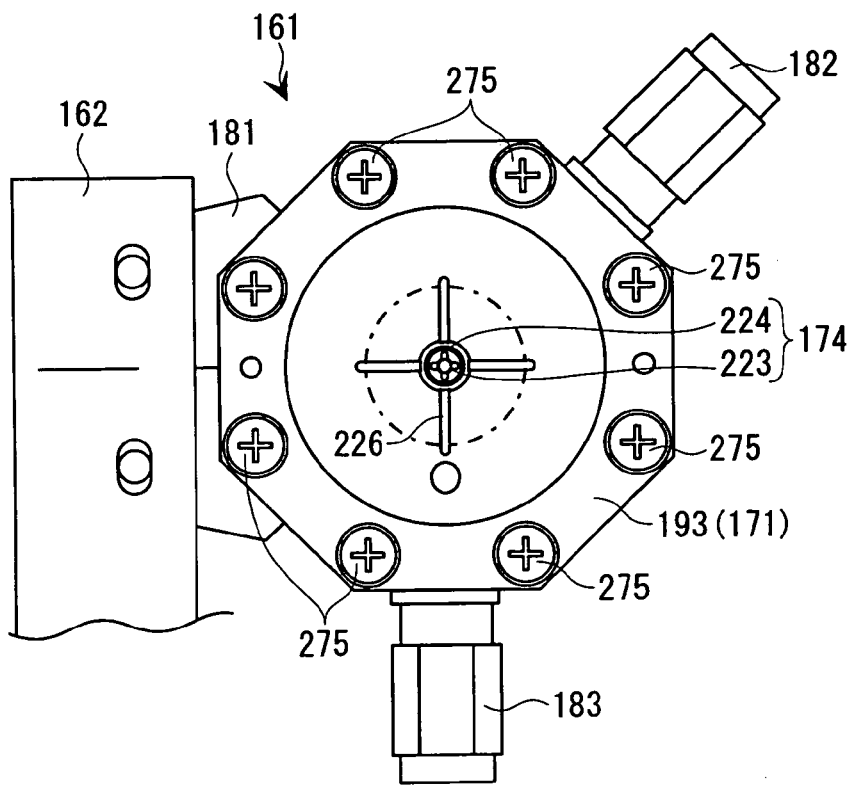

As shown in FIGS. 6 to 8, the pressure-regulating valve 161 has a valve housing 171 including: a primary chamber 172 communicated with the functional liquid tank 91; a secondary chamber 173 communicated with the functional liquid droplet ejection head 41; and a communication passage 174 communicating the primary chamber 172 and the secondary chamber 173. The secondary chamber 173 has one surface provided with a diaphragm 175 exposed to the outside, and the communication passage 174 is provided with a valve disc 176 which performs opening and closing operation with the diaphragm 175. The functional liquid introduced from the functional liquid tank 91 to the primary chamber 172 is supplied to the functional liquid droplet ejection head 41 through the secondary chamber 173. At this time, the diaphragm 175 opens and closes the valve disc 176 provided in the communication passage 174 using, as a reference regulating pressure, atmospheric pressure, to thereby regulate the pressure of the secondary chamber 173.

As shown in FIG. 8, when the pressure-regulating valve 161 is used, it is arranged in an upright position with the diaphragm 175 being vertically oriented. Accordingly, as in this figure, the far side, near side, left side, and right side of each figure are hereinafter indicated as the "upper" side, "lower" side, "front" side, and "rear" side, respectively, for convenience of description. Note that FIGS. 6 and 7 show the pressure-regulating valve 161 incorporating an attachment plate 181 for attaching the pressure-regulating valve to the frame or the like (valve support member 162 of the present embodiment), an inlet connector 182 (union joint) for connecting the tank-side tube 131, and an outlet connector 183 (union joint) for connecting the head-side tube 132.

The valve housing 171 is constituted of three members of a housing main body 192, a lid body 190 forming the primary chamber 172 in the inside thereof in conjunction with the housing main body 192, and a ring plate 193 forming the secondary chamber 173 in the inside thereof in conjunction with the housing main body 192 and fixing the diaphragm 175 to the housing main body 192. Each of the three members is made of a corrosion-resistance material such as a stainless steel. The lid body 190 and the ring plate 193 are assembled by being superposed on the housing main body 192 from the front and rear sides, positioned by plural pieces of stepped parallel pins 194, and fastened with screws. The lid body and the ring plate externally appear to be polygonal (octagonal) or circular, each being concentric with the axis passing through the center of the circular diaphragm 175. The lid body 190 and the housing main body 192 are air-tightly fitted with each other through a packing (O-ring) 196, and the housing main body 192 and the ring plate 193 are air-tightly fitted, face to face, with each other in a state in which an edge portion of the diaphragm 175 and the packing 197 are held therebetween.

The primary chamber 172 formed by the housing main body 192 and the lid body 190 is formed in substantially a cylindrical shape concentric with the diaphragm 175, and an open end of the primary chamber is closed by the lid body 190. Furthermore, the housing main body 192 has an upper boss portion 198 formed on the backside top on the primary chamber 172 side. At the left of an upper boss portion 198 is formed an inlet port 201 obliquely extending in the radial direction from the primary chamber 172. The inlet port 201 is connected with the inlet connector 182.

The inlet port 201 is made up of an inlet opening 211 formed on the outer circumferential surface of the housing main body 192 and of an inlet path 213 communicating the inlet opening 211 and the inner circumferential surface of the primary chamber 172. The inlet path 213 is arranged eccentrically to the primary chamber 172 side, relative to the inlet opening 211. The inlet opening 211 is threadedly engaged (taper thread) with the inlet connector 182 and connected with the tank-side tube 131 through the inlet connector 182. The inner passage of the inlet connector 182 is formed to be enlarged at the downstream end, thereby preventing stepped portions from being formed in the inner passage or great changes in the flow speed of a functional liquid. Similarly, the inlet opening 211 is tapered at the downstream end, thereby preventing stepped portions from being formed between the inlet opening and the inlet path 213.

Furthermore, the outer surface of the primary chamber 172 of the housing main body 192 is formed with a circular attachment groove 199 concentric with the primary chamber 172, and the lid body 190 is detachably attached to the circular attachment groove 199.

As shown in FIG. 8, the housing main body 192 is formed with the main chamber 221 of the secondary chamber 173 having a shape of a frustum of a cone (approximately a cylinder) whose font surface is left open to be attached with the diaphragm 175, a spring chamber 222 of the secondary chamber 173 having a shape of a frustum of a cone (approximately a cylinder), which is communicated with the rear side of the main chamber 221 and formed to be enlarged at the main chamber side, and the communication passage 174 for communicating the spring chamber 222 and the primary chamber 172. Furthermore, each of the main chamber 221, spring chamber 222, and communication passage 174 has a circular cross section concentric with the diaphragm 175. However, the communication passage 174 is constituted of a shaft inserting portion 223 having a circular cross section in which a shaft portion 262 of the valve disc 176 described later is slidably accommodated and a passage portion 224 having a cross-shaped cross section radially extending in all directions from the shaft inserting portion 223 (see FIG. 7). Note that, on the surface of the housing main body 192 which the diaphragm 175 faces, an annular groove 251 is formed in the annular housing main body 192 for use with packing 197 described later.

The outlet port 241 is formed at a lower boss portion 242 arranged at the lower portion of the housing main body 192 and made up of an outlet opening 243 formed at the lower portion of the housing main body 192, a secondary-chamber side opening 244 formed at the lower end portion of the secondary chamber 173, and an outlet passage 245 communicating the outlet passage and the secondary-chamber side opening. The outlet passage 245 obliquely extends from the tapered surface of the main chamber 221 and is communicated with the outlet opening 243 oriented downward. The outlet opening 243 is threadedly engaged with the outlet connector 183 from the axial direction of the outlet passage 245 and connected with the head-side tube 132 through the outlet connector 183. The inner passage of the outlet connector 183 is formed to be enlarged at the upstream end, thereby preventing stepped portions from developing in the inner passage or great changes from being made in the flow speed of a functional liquid. The functional liquid flowed out from the secondary chamber 173 obliquely flows down according to the gradient from the secondary-chamber side opening 244 to the outlet passage 245 and flows out to the functional liquid droplet ejection head 41 side.

Furthermore, the main chamber 221 has a wall surface formed with a drainage and discharge groove 226 extending outward in a cross shape from the spring chamber 222. A lower groove portion of the drainage and discharge groove 226 extends to the vicinity of the outlet opening 243 or to the outlet opening 243.

According to the pressure-regulating valve 161 of the embodiment, at the time of drainage prior to an initial filling of a functional liquid and the introduction of different types of functional liquids, a suction operation is to be performed by a suction unit. In this case, however, when the secondary chamber 173 side has a negative pressure, there is a possibility that the diaphragm 175 is kept in intimate contact with the wall surface (tapered surface) of the main chamber 221 even if the valve disc 176 is left open to atmosphere. As a result, the passage between the communication passage 174 and the outlet opening 243 is blocked.

Therefore, an arrangement is made to enable to maintain a communicated state between the communication passage 174 and the outlet opening 243 with the drainage and discharge groove 226 even if the diaphragm 175 is brought into intimate contact with the wall surface of the main chamber 221. It is further made possible to smoothly perform drainage and air vent inside the secondary chamber 173.

The ring plate 193 serves to fix the diaphragm 175 between the ring plate and the front surface of the housing main body 192 in a sandwiched manner and is formed in a polygonal (octagonal) or a circular shape correspondingly to the shape of the housing main body 192. According to the present embodiment, the ring plate 193 is brought into intimate contact with the housing main body 192 in a state in which the packing 197 inserted into the annular groove 251 of the housing main body 192 and the diaphragm 175 are sandwiched.

The diaphragm 175 is constituted of a diaphragm main body 252 of a resin film and a resinous pressure-receiving plate 253 adhered to the inside of the diaphragm main body 252. The pressure-receiving plate 253 is formed in a circular-plate shape concentric with the diaphragm main body 252, whose diameter is substantially smaller than that of the diaphragm main body 252. The shaft portion 262 of the valve disc 176 described later abuts against the center of the pressure-receiving plate. The diaphragm main body 252 is formed by laminating a heat-resistant PP (polypropylene) film, a special PP film, and a PET (polyethylene terephthalate) film vapor-deposited with silica. The diaphragm main body is formed in a circular shape having the same diameter as that of the front surface of the housing main body 192. The diaphragm 175 is air-tightly fixed to the front surface of the housing main body 192 by means of the ring plate 193 with a predetermined tension. Note that the pressure-receiving plate 253 may be provided outside the diaphragm main body 252. In the present embodiment, however, it is provided inside the diaphragm main body to prevent the diaphragm main body 252 from being damaged, since the shaft portion 262 of the valve disc 176 described later is subjected to repeated reciprocating movements.

The valve disc 176 is constituted of a valve-disc main body 261 having a circular-plate shape, the shaft portion 262 extending in one direction from the center of the valve-disc main body 261 so as to be a lying "T"-shape as shown in cross section, and an annular valve seal 263 provided (bonded) on the shaft portion side (front surface) of the valve-disc main body 261. The valve-disc main body 261 and the shaft portion 262 are integrally formed of a corrosion-resistant material such as a stainless steel. The valve-disc main body 261 has a front surface formed with an annular small projection 264 arranged on the outer side of the shaft portion 262. The valve seal 263 is made of, for example, a soft silicone rubber and has a front surface protruded with a seal projection 265 as an annular projection so as to correspond to the small projection 264. Accordingly, when the valve disc 176 is closed, the seal projection 265 strongly abuts against the wall surface of the primary chamber 172 side of the housing main body 192, which serves as a valve seat, i.e., an opening edge of the communication passage 174. The communication passage 174 is thus liquid-tightly sealed from the primary chamber 172 side. The valve-disc main body 261 is formed smaller enough than the diaphragm 175 to enable to open and close the valve disc 176 in response to the slightest pressure change in the secondary chamber 173 (see FIG. 8).

The shaft portion 262 is loosely and slidably fitted into the communication passage 174, and the hemispherical tip end thereof abuts against the pressure-receiving plate 253 of the diaphragm 175 which is in the neutral position when the valve disc is in a closed state. In other words, in its state of positive deformation where the diaphragm 175 swells outward, a predetermined gap is generated between the front end of the shaft portion 262 and the pressure-receiving plate 253. When the diaphragm 175 is negatively deformed (negative deformation) in this state, the front end of the shaft portion 262 abuts against the pressure-receiving plate 253 in a state where the diaphragm is parallel with the ring plate 193 and is in the neutral state. When the negative deformation of the diaphragm 175 further lasts, the pressure-receiving plate 253 pushes the valve-disc main body 261 through the shaft portion 262 so as to open the valve disc. Therefore, out of the entire volume of the secondary chamber 173, that amount of the functional liquid which is equivalent to the volume attributable to the change in the diaphragm 175 from the positively deformed state to the neutral state is supplied without being influenced by any pressure of the primary chamber 172 side.

On the other hand, between the back surface 261a of the valve disc 176 (valve-disc main body 261) and the lid body 190 is interposed a valve-disc energizing spring 267 for energizing the valve disc on the secondary chamber 173 side, i.e., in a valve-closing direction. Similarly, between the pressure-receiving plate 253 and the spring chamber 222 of the secondary chamber 173 is interposed a negative-pressure holding spring 268 for energizing the diaphragm main body 252 to the outside through the pressure-receiving plate 253. In this case, the valve-disc energizing spring 267 serves to complement the head of the functional liquid tank 91 applied to the back surface 261a of the valve disc 176, and the valve disc 176 is pressed to the closing direction by means of the head of the functional liquid tank 91 and the spring force of the valve-disc energizing spring 267. Moreover, the negative-pressure holding spring 268 maintains the sealing property of the valve seal 263 when the valve disc is closed, while complementing the positive deformation of the diaphragm 175 so as to make a state where the secondary chamber 173 has a slight negative pressure relative to atmospheric pressure. Note that each of the valve-disc energizing spring 267 and the negative-pressure holding spring 268 of the embodiment is constituted of a coil spring.

As described in detail later, in the pressure-regulating valve 161, the valve disc 176 is opened and closed as it moves back and forth in accordance with the pressure balance between atmospheric pressure and the secondary chamber 173 communicating with the functional liquid droplet ejection heads 41. At this time, the force caused by the pressure acts upon and is dispersed into the valve-disc energizing spring 267 and the negative-pressure holding spring 268, and the valve disc 176 is very slowly opened and closed by (elastic force of) the valve seal 263 made of a soft silicone rubber. As a result, changes in pressure (cavitation) according to the opening/closing of the valve disc 176 are restrained to have little effect on an ejection driving of the functional liquid droplet ejection heads 41. Of course, pulsation or the like generated on the functional liquid tank side (primary chamber side) is also isolated by the valve disc 176 and can be absorbed therein (damper function).

As shown in FIGS. 6 and 7, the attachment plate 181 is constituted of a quadrate stainless plate whose four corners are chamfered and fixed to the back surface of the side portion of the housing main body 192. The attachment plate 181 has both surfaces inscribed with a linear mark 271 indicating the center of the diaphragm 175 at the vertically intermediate position thereof. The mark 271 serves as an index to install the pressure-regulating valve 161 in the functional liquid droplet ejection head 41 with a predetermined level difference. Note that reference numeral 272 in the figure denotes a long hole for aligning the mark 271 of the attachment plate 181 with the center of the diaphragm 175, and thereafter the attachment plate 181 is fixed to the valve housing 171.

Figure 9:
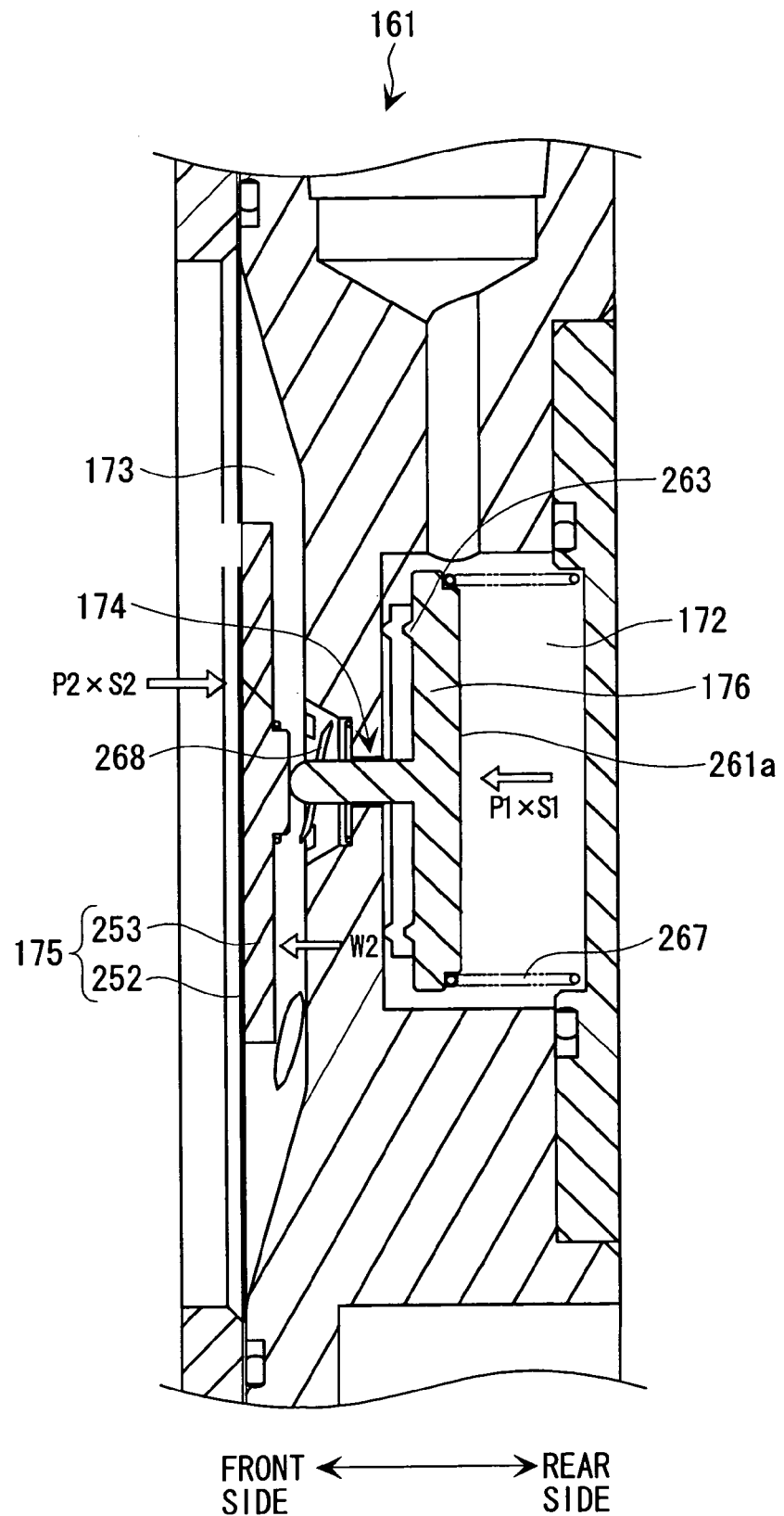
FIG. 9 is an illustration for explaining the operation of the pressure-regulating valve.

Referring next to FIG. 9, description will be made about the operating principle of the pressure-regulating valve 161. The head (in terms of design, head difference between the central axis of a supplying port of the functional liquid package 101 and the central axis of the primary chamber 172) based on the liquid level of a functional liquid stored in the functional liquid tank 91 acts upon the primary chamber 172. The pressure based on the head and the spring force of the valve-disc energizing spring 267 serve as a valve-closing force of the valve disc.

In other words, assuming that the pressure per unit area based on the head is P1, the area of the back surface 261a of the valve-disc main body 261 is S1, and the spring force of the valve-disc energizing spring 267 is W1, the force F1 applied to the valve disc 176 from the primary chamber side is determined as follows:

$$F1=(P1 \times S1)+W1$$

Note that W1 is based on the value considering the elastic force of the valve seal 263, and the sum of the spring force and the elastic force (energizing force) of the valve seal 263 is W1 herein.

On the other hand, assuming that the internal pressure of the secondary chamber 173 is P2, the area (atmospheric-pressure receiving area) of the diaphragm 175 is S2, and the spring force of the negative-pressure holding spring 268 is W2, the force F2 applied to the valve disc 176 from the secondary chamber side is determined as follows:

$$F2=-(P2 \times S2)+(P2 \times S1)-W2$$

Note that P1 and P2 are gauge pressures.

The valve disc is opened when F2>F1 and closed when F1<F2. According to the relationship, in the present embodiment, W1 and W2 are designated based on the area of the back surface 261a of the valve-disc main body 261, the area of the diaphragm 175, and the pressures of the primary chamber 172 and the secondary chamber 173, and the valve disc is arranged to be opened and closed (when $(PS \times S2)+W2<0$), using an approximate atmospheric pressure as a reference regulating pressure.

In other words, when functional liquids are consumed (ejected) by the functional liquid droplet ejection heads 41, and the secondary chamber 173 has a negative pressure therein in a state where the diaphragm 175 is positively deformed, the diaphragm 175 is pushed by atmospheric pressure and transformed from the neutral state to the negative deformation state. Accordingly, the valve disc 176 is pushed through the pressure-receiving plate 253 and slowly opened. When the valve disc 176 is opened, the functional liquid flows from the primary chamber 172 to the secondary chamber 173 through the communication passage 174. Thereby, the pressure of the secondary chamber 173 increases, and the valve disc 176 is slowly closed. The negative-pressure holding spring 268 keeps acting against atmospheric pressure even after the valve disc 176 is closed so that the diaphragm 175 is positively deformed and causes the functional liquid pressure of the secondary chamber 173 to be in a slightly negative state. After the above operation is slowly repeated, a functional liquid is supplied while the pressure of the secondary chamber 173 is held generally constant.

Similarly, at the time of the initial filling of a functional liquid as well, the above-described operation is performed upon a forcible suction of a functional liquid by the functional liquid droplet ejection head side, so that the functional liquid is filled in the passage of the valve. Note that the pressure of a functional liquid inside the secondary chamber 173 is held lower than atmospheric pressure by the negative-pressure holding spring 268. Thus, the value of the level difference between the position of the functional liquid droplet ejection head 41 (nozzle surface 57) and that of the pressure-regulating valve 161 (center of the diaphragm 175) is kept constant, thereby preventing liquids of the functional liquid droplet ejection head 41 from leaking.

Figure 5:
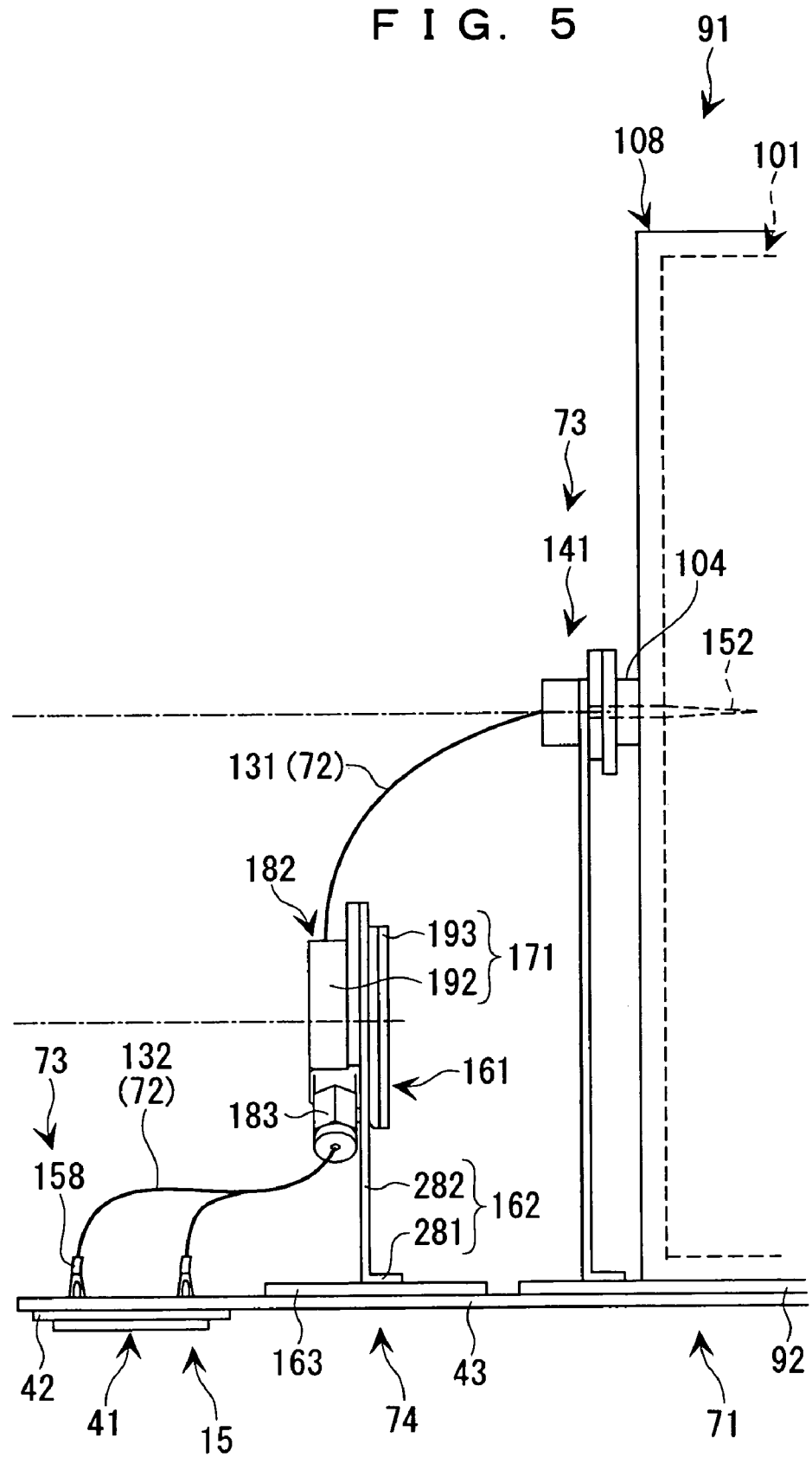
FIG. 5 is an illustration showing the height relationship between the functional liquid droplet ejection head, a pressure-regulating valve, and a functional liquid tank.

As shown in FIG. 5, the head difference between the functional liquid droplet ejection head 41 and the pressure-regulating valve 161 is designated or set beforehand. According to the designated value, the level difference between the functional liquid droplet ejection head 41 and the pressure-regulating valve 161 is determined. Specifically, the center position of the diaphragm 175 is determined in such a way that the height of the center position of the diaphragm 175 is higher than that of the nozzle surface 57 of the functional liquid droplet ejection head 41 by an amount of a predetermined height based on the head designated.

Furthermore, according to the present embodiment, the height position of the functional liquid tank 91 is designated based on the height position of the pressure-regulating valve 161. A functional liquid is designated to flow from the functional liquid tank 91 to the pressure-regulating valve 91 by (natural flow-down of) the head difference between the primary chamber 172 of the pressure-regulating valve 161 and the functional liquid tank 91.

On the other hand, as shown in FIG. 1, the head maintenance apparatus 5 includes a moving table 291 mounted on the base 2 and extending in the X-axis direction, a suction unit 292 mounted on the moving table 291, and a wiping unit 293 disposed on the moving table 291 along with the suction unit 292. The moving table 291 is configured so as to move in the X-axis direction and makes the suction unit 292 and the wiping unit 293 move properly to the maintenance area 33 when maintenance is performed on the functional liquid droplet ejection head 41. Note that the head maintenance unit 5 has preferably mounted thereon an ejection inspection unit for inspecting a flying state of a functional liquid droplet ejected from the functional liquid droplet ejection head 41, a weight measurement unit for measuring the weight of a functional liquid droplet ejected from the functional liquid droplet ejection head 41, or the like, in addition to the above-described respective units.

As shown in FIG. 1, the suction unit 292 has a cap stand 301, a cap 302 to be brought into intimate contact with the nozzle surface 57 of the functional liquid droplet ejection head 41, a single suction pump 303 capable of sucking the (twelve) functional liquid droplet ejection heads 41: through the respective caps 302, and a suction tube (not shown) for connecting the respective caps 302 and the suction pump 303. Note that, although omitted in the figure, the cap stand 301 has a cap lifting mechanism 305 incorporated therein, in which the respective caps are lifted up and down as a motor is driven. On the downstream side of the cap 302 of the suction tube (suction pump 303 side) are provided a suction-pressure detection sensor 306 for detecting a suction pressure and a liquid detection sensor 307 for detecting the presence or absence of a functional liquid passing through the suction tube.

When the suction operation is performed on the functional liquid droplet ejection head 41, the cap lifting mechanism 305 is driven so that the cap 302 is brought into intimate contact with the nozzle surface 57 of the functional liquid droplet ejection head 41, and the suction pump 303 is driven. Accordingly, sucking force can act upon the functional liquid droplet ejection head 41 through the cap 302, and a functional liquid is forcibly discharged from the functional liquid droplet ejection head 41. The operation of sucking a functional liquid is performed not only for solving and preventing the clogging of the functional liquid droplet ejection head 41, but also for filling a functional liquid in the functional liquid passage ranging from the functional liquid tank 91 to the functional liquid droplet ejection head 41 when the imaging apparatus 1 is newly constructed or the functional liquid droplet ejection head 41 is replaced with a new one.

As shown in FIG. 1, the wiping unit 293 includes a winding unit 311 in which a wiping sheet 313 wound in a rolled shape is reeled out and wound simultaneously as a winding motor 312 (not shown) is driven, a cleaning liquid supplying unit 314 which has a cleaning-liquid nozzle (spray nozzle not shown) for spraying a cleaning liquid on the wiping sheet 313 reeled out, and a wipe-off unit 315 for wiping off the nozzle surface 57 with the wiping sheet 313 on which the cleaning liquid is sprayed. The wiping unit 293 is brought to face the head unit 15 positioned at the maintenance area 33 and the nozzle surface 57 of the functional liquid droplet ejection head 41 is wiped off (by being subjected to the wiping operation) by the wiping sheet 313 impregnated with the cleaning liquid, thereby removing a stain (functional liquid) adhered to the nozzle surface 57.

The control apparatus 6 is constituted of a personal computer or the like. Although omitted in the figure, the apparatus main body is connected with input devices such as a keyboard and a mouse, various drives such as a FD (floppy disk) drive and a CD-ROM drive (not shown), and peripheral equipment such as a monitor display.

Figure 16:
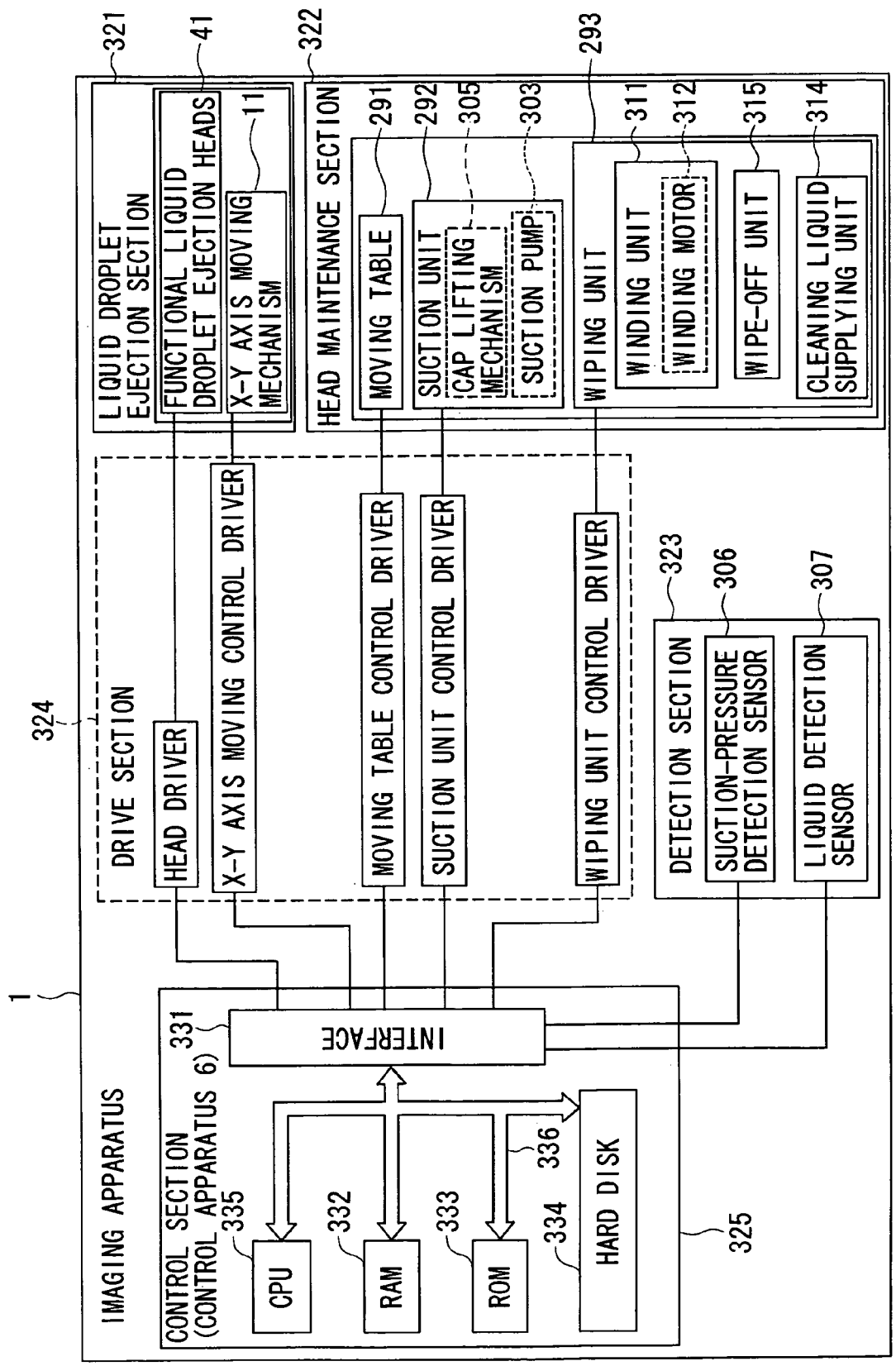
FIG. 16 is a block diagram explaining a main control system of an imaging apparatus.

Referring next to FIG. 16, description will be made about a main control system of the imaging apparatus 1. The imaging apparatus 1 includes a liquid droplet ejection section 321 having the liquid droplet ejection apparatus 3, a head maintenance section 322 having the head maintenance apparatus 5, a detection section 323 which has various sensors for the liquid droplet ejection apparatus 3 and the head maintenance apparatus 5 to perform various detections, a drive section 324 for driving respective sections, and a control section 325 (control apparatus 6) which is connected to the respective sections to perform controlling of the whole imaging apparatus 1.

The control section 325 includes: an interface 331 for connecting the liquid droplet ejection apparatus 3 and the head maintenance apparatus 5; a RAM 332 which has a storage region for temporarily storing programs and data and serves as a work area for controlling processes; a ROM 333 which has various storage regions for storing control programs and control data; a hard disk 334 which stores image data for performing an imaging operation on the workpiece W, various data or the like transferred from the liquid droplet ejection apparatus 3 and the head maintenance apparatus 5, as well as programs or the like for processing various data; a CPU 335 which calculates various data in accordance with the programs or the like stored in the ROM 333 and the hard disk 334; and a bus 336 for connecting the interface, the RAM, the ROM, the hard disk, and the CPU together.

The control section 325 inputs various data transferred from the liquid droplet ejection apparatus 3, the head maintenance apparatus 5, or the like through the interface 331, makes the CPU 335 calculate the various data in accordance with the programs stored in the hard disk 334 (or the programs sequentially read out by the CD-ROM drive or the like), and outputs the calculation results to the liquid droplet ejection apparatus 3, the head maintenance apparatus, or the like through the interface 331, thereby controlling the above-described respective units.

Meanwhile, both of the valve-disc energizing spring 267 and the negative-pressure holding spring 268 serve not only as a returning spring for energizing the valve disc 176 in the valve-closing direction, but also serve to apply a sealing force for preventing leakage of a functional liquid from the valve seal 263 brought into intimate contact with the valve seat when the valve disc is closed. Accordingly, when a functional liquid having a different specific gravity is to be introduced, it is required that the forces of those springs should be adjusted in accordance with said specific gravity, namely, a pressure difference between the primary chamber 172 and the secondary chamber 173. Specifically, when a functional liquid having a large specific gravity is to be introduced, it is required to replace either the valve-disc energizing spring 267 or the negative-pressure holding spring 268 with one having a large spring force, to thereby cope with said functional liquid. Similarly, when a functional liquid having a small specific gravity is to be introduced, it is required to replace either the valve-disc energizing spring 267 or the negative-pressure holding spring 268 with one having a small spring force, to thereby cope with said functional liquid.

Accordingly, in the present embodiment, the lid body 190 is provided on the primary chamber 172 side of the housing main body 192 as described above. The valve-disc energizing spring 267 can be replaced with a new one after the lid body 190 is pulled out.

The lid body 190 is formed in a circular-plate shape and is detachably attached to the housing main body 192 with four flat countersunk head screws 277 in a state of being fitted into the circular attachment groove 199 formed on the housing main body 192. The lid body 190 fitted into the circular attachment groove 199 is formed so as to be flush with the surface on the primary chamber 172 side of the housing main body 192 and is disposed so as not to protrude in a thickness direction of the pressure-regulating valve 161.

Figure 10:
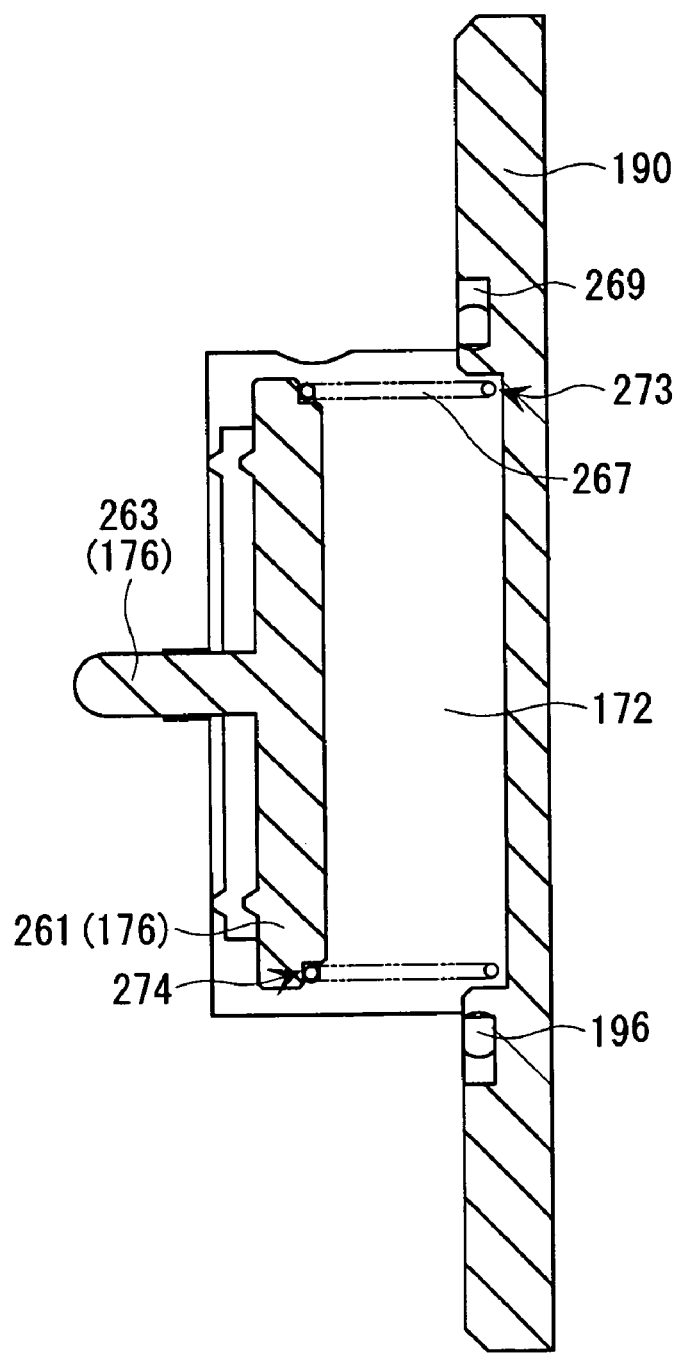
FIG. 10 is a partial diagram of a lid body and its surrounding components, representing a first embodiment of the invention.

At the inner surface of the lid body 190 is formed a circular concave groove 273 (proximal-end engaging portion) where one end of the valve-disc energizing spring 267 is positioned, and a lid-body annular groove 269 which is positioned outside the circular concave groove 273 and fitted with the packing 176. Note that at the head portion of the valve-disc main body 261 is formed a circular stepped portion 274 (leading-end engaging portion) where the other end of the valve-disc energizing spring 267 is positioned (see FIG. 10).

In this configuration, when a functional liquid having a different specific gravity is to be introduced, the flat countersunk head screws 277 are unscrewed and the lid body 190 is pulled out from the housing main body 192 so as to open the primary chamber 172, thereby making it possible to replace the valve-disc energizing spring 267 with one having a proper spring force. Moreover, in a state where the valve-disc energizing spring 267 is taken out from the primary chamber 172, the valve disc 176 can be also pulled out to the primary chamber 172 side. Accordingly, when a functional liquid having a different specific gravity is introduced and the spring force of the valve-disc energizing spring 267 is adjusted, the valve seal 263 can be also replaced with a new one after the valve disc 176 is taken out.

Thus, when an imaging operation is performed with a functional liquid having a different specific gravity, the valve-disc energizing spring 267 can be replaced with one having a spring force corresponding to said specific gravity of the functional liquid. Therefore, it is not required, for example, to replace the whole pressure-regulating valve 161, adjust its installation position for the height thereof, or the like.

In addition, when an imaging operation is performed with a functional liquid having corrosion resistance, the lid body 190 is pulled out in the same procedure as the above embodiment so that the valve-disc energizing spring 267, the valve disc 176, or the packing 196 can be replaced with a component made of a corrosion-resistant material.

Figure 11:
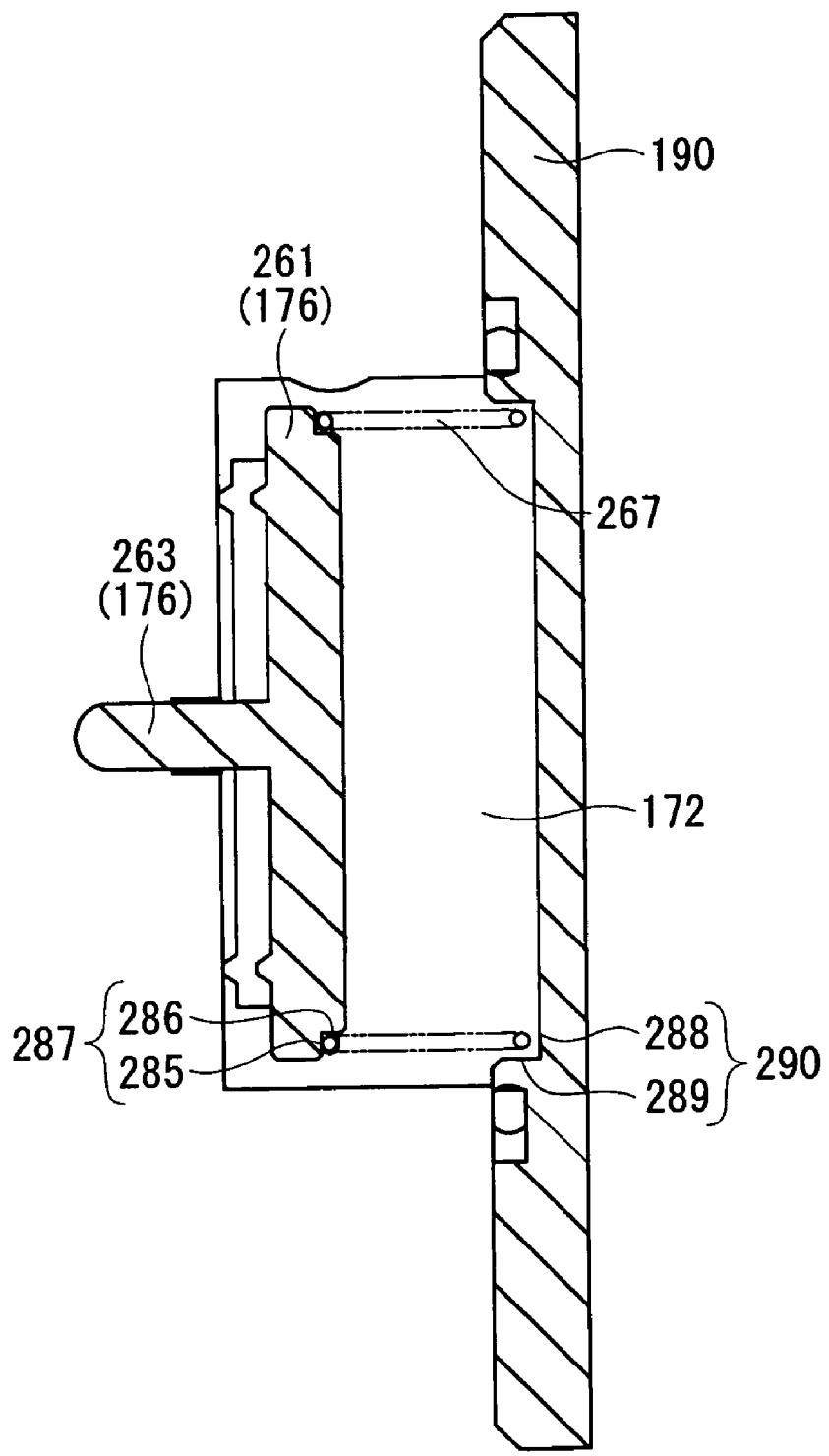
FIG. 11 is a partial diagram of the lid body and it surrounding components, representing a modified example according to the first embodiment.

Referring next to FIG. 11, description will be made about a first modified example of the above-described first embodiment. According to the modified example, the valve disc 176 of the invention has a part where the valve disc 176 is engaged with the valve-disc energizing spring 267. At that part is formed a leading-end engaging portion 287 made up of a generally flat spring-receiving portion 285 for receiving the force of the valve-disc energizing spring 267 and a conical convex portion 286 extending from the spring-receiving portion 285 to the valve-disc energizing spring side in a tapered state. The proximal-end portion of the conical convex portion 286 has an external diameter generally the same length as the internal diameter of the valve-disc energizing spring 267. Furthermore, the valve disc has a part where the lid body 190 is engaged with the valve-disc energizing spring 267. At that part is formed a proximal-end engaging portion 290 made up of a generally flat spring-receiving portion 288 for receiving the force of the valve-disc energizing spring 267 and a conical concave portion 289 tapered from the spring-receiving portion to the valve-disc energizing spring side. The proximal-end portion of the conical concave portion 289 has an internal diameter generally the same length as the external diameter of the valve-disc energizing spring 267. Note that a lid-side conical convex portion 289k identical with that formed inside the valve-disc energizing spring 267 may be formed inside the circular concave groove 273 in place of the conical concave portion 289.

In this configuration, when the valve-disc energizing spring 267 is engaged with the valve disc 176 so as to replace the same, it is pushed along the tapered conical convex portion 286, thereby making it possible to easily secure the relative positional accuracy between the valve disc 176 and the valve-disc energizing spring 267. Similarly, when the lid body 190 is engaged with the valve-disc energizing spring 267, the relative positional accuracy between the lid body 190 and the valve-disc energizing spring 267 can be easily secured by dint of the shape of the proximal-end engaging portion 290.

Note that, according to the invention, the lid body 190 and the valve disc 176 may be liked to the valve-disc energizing spring 267 by welding or bonding, in place of the proximal-end engaging portion 290 of the lid body 190 or the leading-end engaging portion 287 of the valve disc 176. In addition, it is possible to link together the valve disc 176 and the valve-disc energizing spring 267 or the lid body 190 and the valve-disc energizing spring 267 without welding them, etc. by providing an annular protruding portion slightly protruding outward on the tip end of the conical convex portion 286 as well as an annular protruding portion of the same type on the lid-side conical convex portion 289k.

In this configuration, when the valve-disc energizing spring 267 is replaced with a new one, it can be pulled out from the valve disc 176 as the lid body 190 is pulled out from the housing main body 192. As a result, time for replacing the valve-disc energizing spring can be completed in a short period of time. Also, the relative positional accuracy between the lid body 190 and the valve-disc energizing spring 267 can be secured.

A second modified example as described above refers to a mode where the lid body 190 and the valve-disc energizing spring 267 are linked to each other. However, the same advantages can be achieved in accordance with a mode where the valve-disc energizing spring 267 and the valve disc 176 are linked to each other, or a mode where the three members of the lid body 190, the valve-disc energizing spring 267, and the valve disc 176 are linked to one anther.

Figure 12:
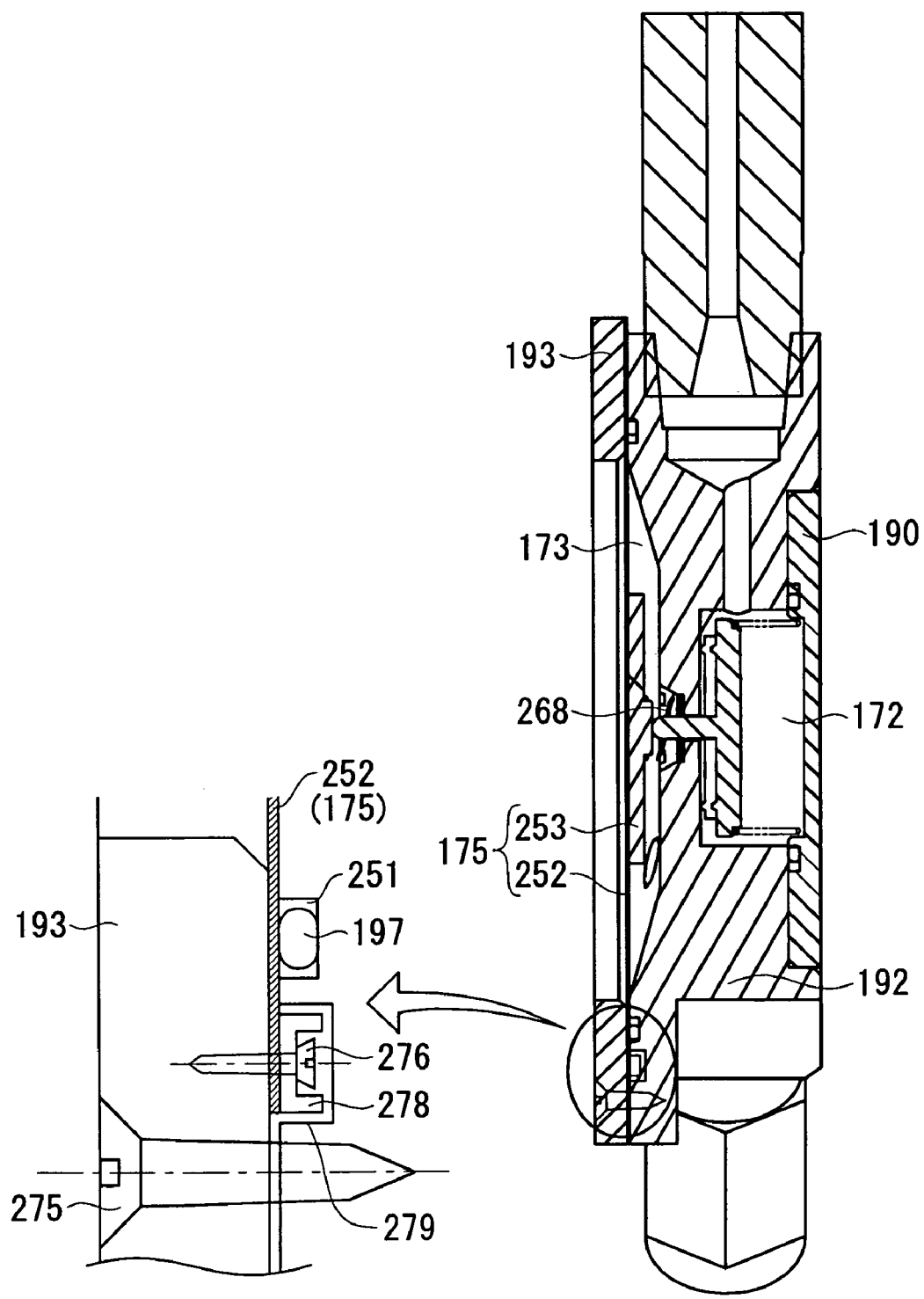
FIG. 12 is an illustration showing the pressure regulating valve according to a second embodiment.

Referring next to FIG. 12, description will be made about a second embodiment. According to this embodiment, the negative-pressure holding spring 268 can be replaced with a new one, and the following description refers to only portions different from the first embodiment. Note that, in this embodiment, the negative-pressure holding spring 268 is replaced with one having a proper spring force so as to cope with changes in pressure difference between the primary chamber 172 and the secondary chamber 173 resulting from the introduction of a functional liquid having a different specific gravity. Therefore, it is not necessary to employ the detachable lid body 190.

As shown in the figure, the diaphragm 175 is fixed and integrated between the ring plate 193 and a stretch ring (diaphragm holder) 278 with a countersunk head screw 276 in a state of being adequately tensed. Moreover, the ring plate 193 integrated with the diaphragm 175 and the stretch ring 278, is detachably attached to the housing main body 192 through the packing 197 attached to the annular groove 251 of the housing main body with a countersunk head screw 275. Note that the housing main body 192 is formed with an circular concave groove 279 for the stretch ring to hide the stretch ring 278.

In this configuration, when an imaging operation is performed with a functional liquid having a different specific gravity, the countersunk head screw is unscrewed to pull out the ring plate 193 integrated with the diaphragm 175 and the stretch ring 278, so that the negative-pressure holding spring 268 can be replaced with one having a spring force corresponding to said specific gravity of the functional liquid. Also, it is not required to adjust the tension of the diaphragm 175 at this time. Note that, when the tension of the diaphragm can be adjusted easily with the jig or the like, it is possible that the ring plate 193 and the diaphragm 175 are pulled out to replace the negative-pressure holding spring 268 with a new one in the configuration of the first embodiment.

Figure 13:
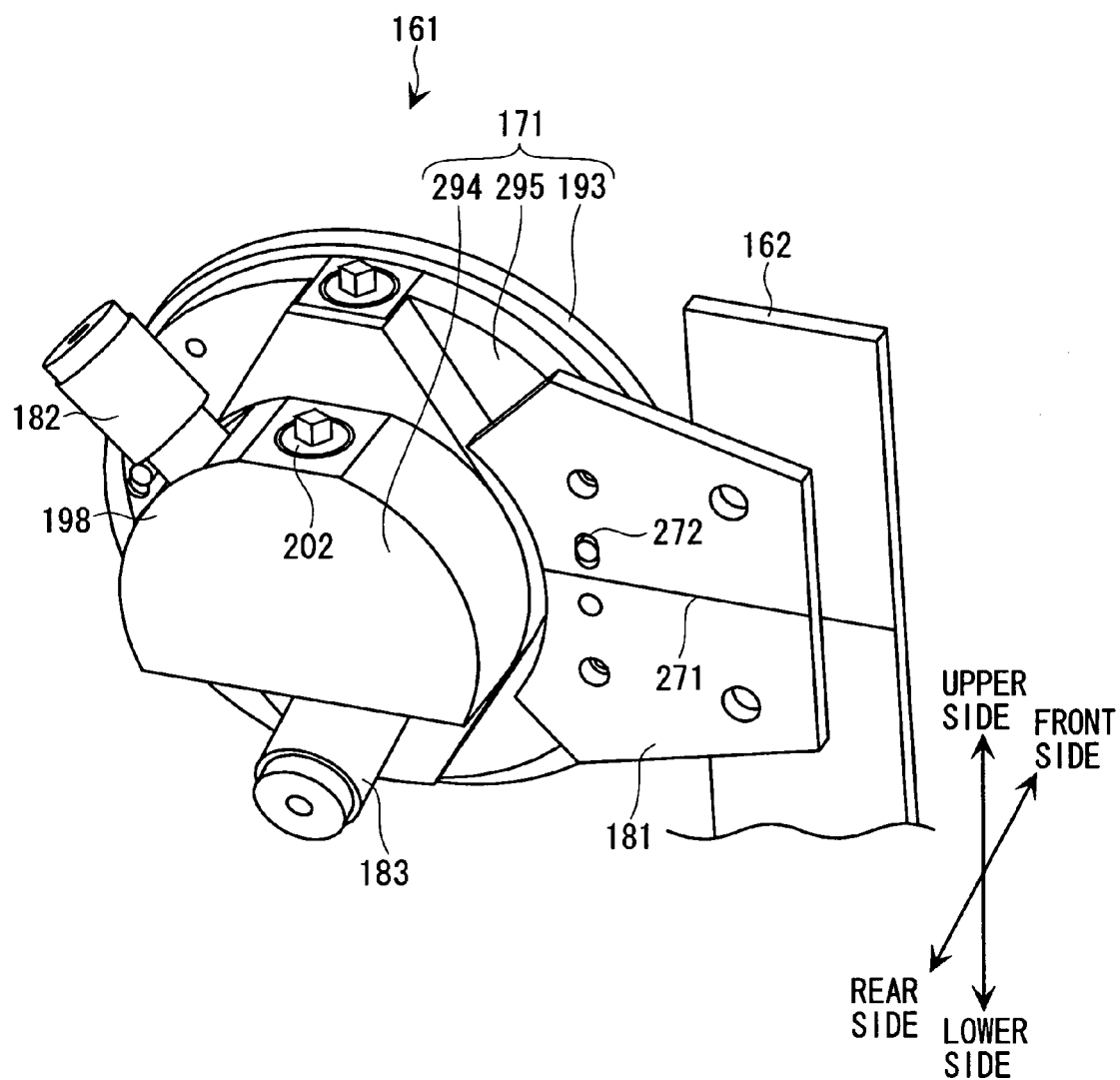
FIG. 13 is an external perspective view of the pressure-regulating valve as shown from its back surface side according to a third embodiment.
Figure 14A:
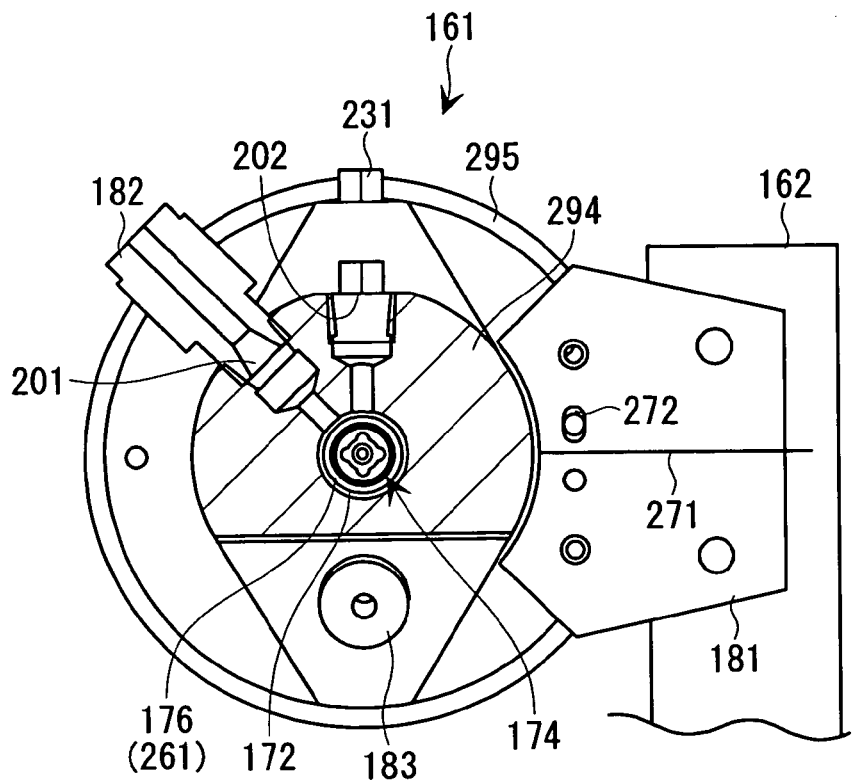
FIGS. 14A and 14B are illustrations of the pressure-regulating valve according to the third embodiment, each showing its back surface view and front view.
Figure 14B:
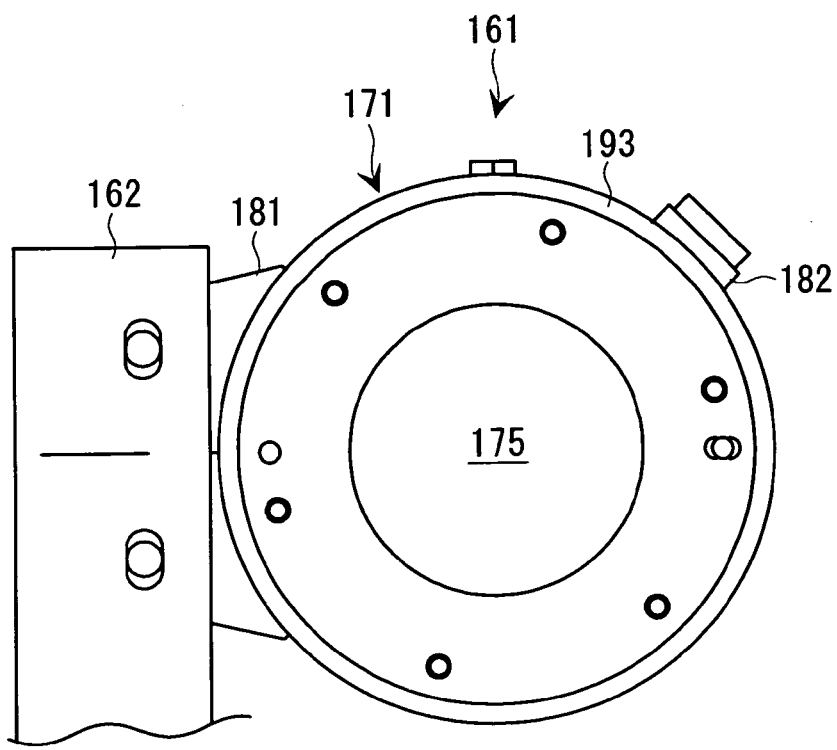
Figure 15A:
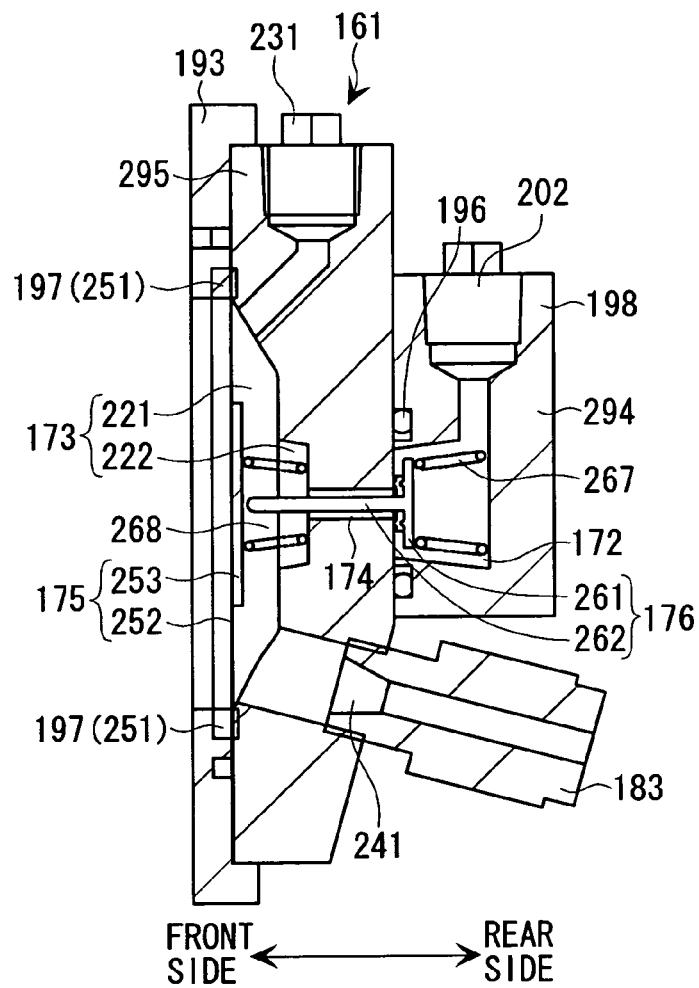
FIGS. 15A and 15B are illustrations of the pressure-regulating valve according to the third embodiment, each showing its vertical cross section and a vertical cross section of a magnified primary chamber and its surrounding components.
Figure 15B:
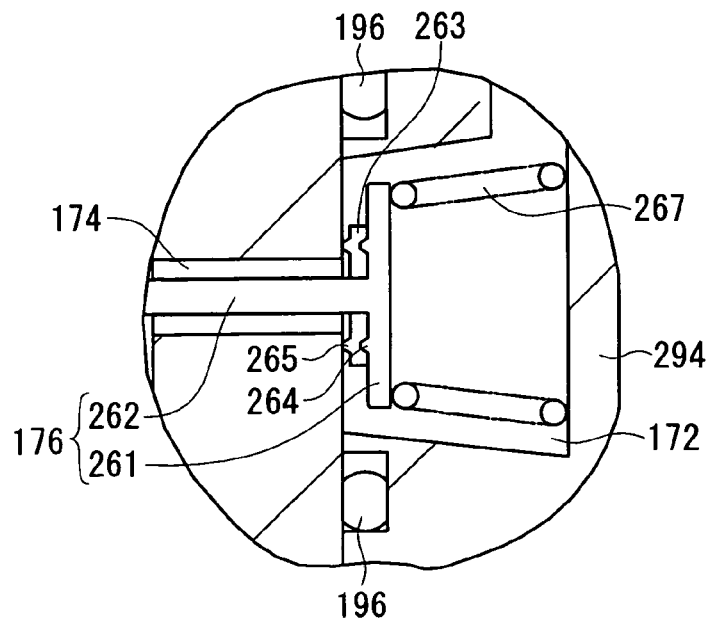

Referring next to FIGS. 13, 14, and 15, description will be made about the pressure-regulating valve 161 of a third embodiment. The pressure-regulating valve 161 of this case has also the valve housing 171 including: the primary chamber 172 communicating with the functional liquid tank 91; the secondary chamber 173 communicating with the functional liquid droplet ejection head 41; and the communication passage 174 communicating the primary chamber 172 and the secondary chamber 173. The secondary chamber 173 has one surface provided with the diaphragm 175 exposed to the outside, and the communication passage 174 is provided with the valve disc 176 which performs opening and closing operation with the diaphragm 175. The functional liquid introduced from the functional liquid tank 91 to the primary chamber 172 is supplied to the functional liquid droplet ejection head 41 through the secondary chamber 173. At this time, the diaphragm 175 opens and closes the valve disc 176 provided in the communication passage 174 using, as a reference regulating pressure, atmospheric pressure, to thereby regulate the pressure of the secondary chamber 173.

The valve housing 171 of the pressure-regulating valve 161 is constituted of three members of a primary chamber housing 294 having a primary chamber 172 formed therein, a secondary chamber housing 295 having a secondary chamber 173 formed therein, and a ring plate 193 for fixing the diaphragm 175 to the secondary chamber housing 295. The ring plate 193 and the primary chamber housing 294 are superposed on the secondary chamber housing 295 from the front and rear sides, respectively, and they are positioned by a plural pieces of stepped parallel pins or the like and screw-held. The primary chamber housing 294 and the secondary chamber housing 295 are air-tightly confronted with each other and bonded together through the O-ring 196, and the secondary chamber housing 295 and the ring plate 193 are air-tightly confronted with each other and bonded together by being inserted with an edge portion of the diaphragm 175 and the packing 197.

At the upper boss portion 198 formed on the backside top of the primary chamber housing 294 are formed the inlet port 201 communicating with the functional liquid tank 91 and an air-vent port 202 for the primary chamber. The air-vent port 202 for the primary chamber extends vertically, and the inlet port 201 extends obliquely. The upstream end of the inlet port 201 communicates with the inlet connector 182, and the downstream end thereof communicates with the primary chamber 172.

The secondary chamber housing 295 has formed therein the main chamber 221 of the secondary chamber 173 whose font surface is left open to be attached with the diaphragm 175, the spring chamber 222 communicating with the main chamber 221, and the communication passage 174 for communicating the spring chamber 222 and the primary chamber 172.

In the secondary chamber 173 (primary chamber 221), an air-vent port 231 for the secondary chamber (air-vent portion for the secondary chamber) and the outlet port 241 are vertically communicated with each other. The outlet port 241 is positioned at the backside bottom of the secondary chamber housing 295 and obliquely extends in front and rear directions, and the downstream end of the outlet port is threadedly engaged with the outlet connector 183.

The diaphragm 175 is constituted of the diaphragm main body 252 made of a resin film and of the resinous pressure-receiving plate 253 adhered to the inside of the diaphragm main body 252. The diaphragm 175 is air-tightly fixed to the front surface of the secondary chamber housing 295 with the packing 197 attached to the diaphragm from the outside as well as the ring plate 193.

The valve disc 176 is constituted of the valve-disc main body 261 having a circular-plate shape, the shaft portion 262 extending in one direction from the center of the valve-disc main body 261 so as to be a lying "T"-shape as shown in cross section, and the annular valve seal 263 provided (bonded) on the shaft portion side (front surface) of the valve-disc main body 261. The valve-disc main body 261 and the shaft portion 262 are integrally formed of a corrosion-resistant material such as a stainless steel. The valve-disc main body 261 has a front surface formed with the annular small projection 264 which is arranged on the outer side of the shaft portion 262. The valve seal 263 is made of, for example, a soft silicone rubber and has a front surface protruded with the seal projection 265 as an annular projection so as to correspond to the small projection 264.

The shaft portion 262 is loosely and slidably fitted into the communication passage 174, and the tip end (front end) thereof abuts against the pressure-receiving plate 253 of the diaphragm 175 which is in the neutral position when the valve disc is in a closed state. In other words, in its state of positive deformation where the diaphragm 175 swells outward, a predetermined gap is generated between the front end of the shaft portion 262 and the pressure-receiving plate 253. When the diaphragm 175 is negatively deformed (negative deformation) in this state, the front end of the shaft portion 262 abuts against the pressure-receiving plate 253 in a state where the diaphragm is parallel with the ring plate 193 and is in the neutral state. When the negative deformation of the diaphragm 175 further lasts, the pressure-receiving plate 253 pushes the valve-disc main body 261 through the shaft portion 262 so as to open the valve disc.

On the other hand, between the back surface of the valve disc 176 and the rear surface wall of the primary chamber 172 is interposed the valve-disc energizing spring 267 for energizing the valve disc 176 on the secondary chamber 173 side, i.e., in the valve-closing direction.

In this configuration, the primary chamber housing 294 is detachably screw-held to the secondary chamber housing 295. Therefore, when an imaging operation is performed with a functional liquid having a different specific gravity, the primary chamber housing 294 is pulled out from the secondary chamber housing 295 so that the valve-disc energizing spring 267 can be replaced with one having a spring force corresponding to said specific gravity of the functional liquid.

Next, description will be made about a construction and a method of manufacturing, for example, a color filter, a liquid-crystal display (LCD), an organic EL (electro-luminescence) device, a plasma display panel (PDP device), an electron emission device (FED (field emission display) and SED (surface-conduction electron-emitter display)), and an active matrix substrate which is formed in the aforementioned display devices, as an electro-optic device (flat panel display) manufactured by the use of the imaging apparatus 1 of the present embodiment. Note that the active matrix substrate refers to a substrate having a thin film transistor, a source line electrically connected to the thin film transistor, and a data line formed therein.

Figure 17:
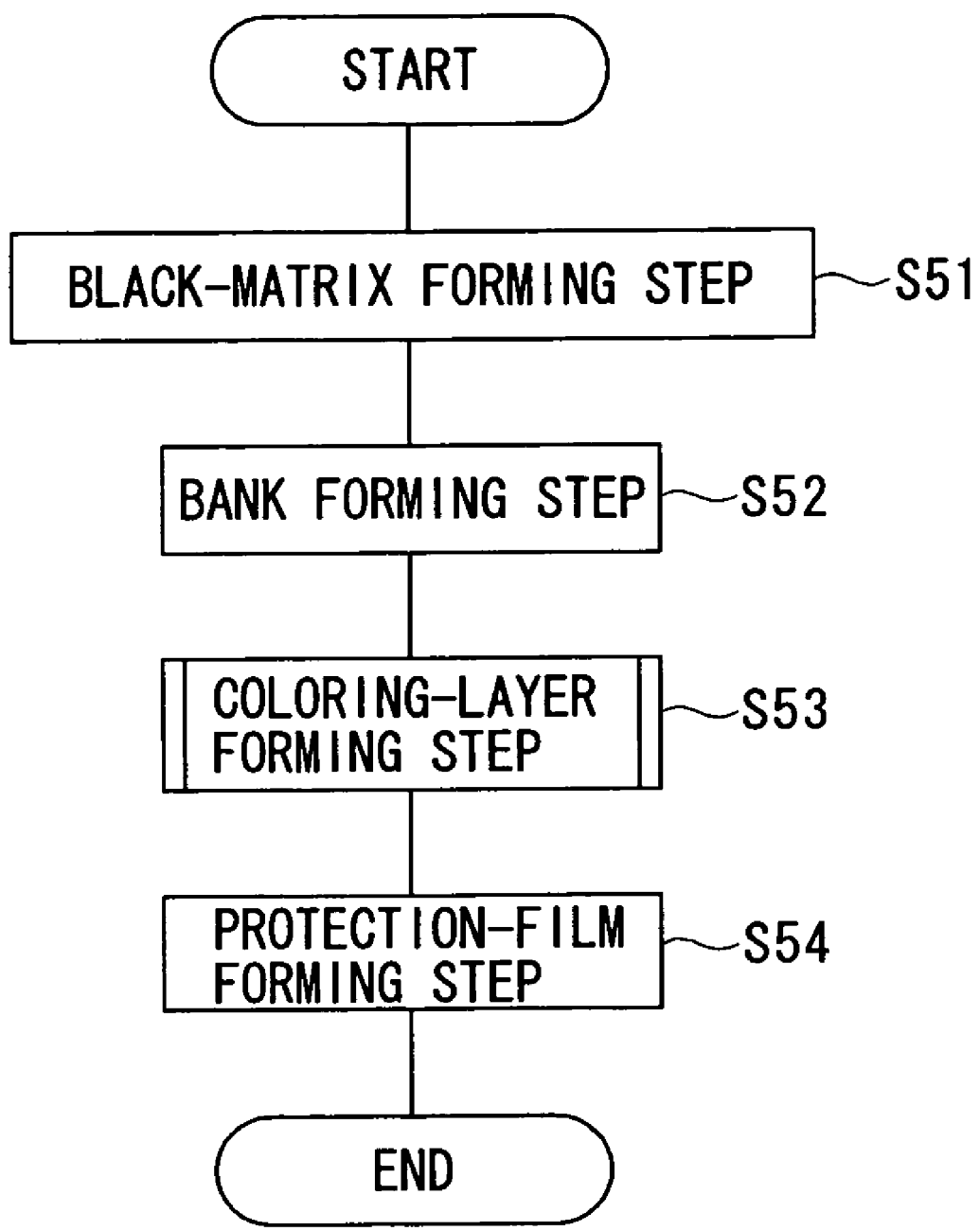
FIG. 17 is a flow chart explaining a step of manufacturing a color filter.

To begin with, description will be made about a method of manufacturing a color filter to be incorporated in a liquid-crystal display device, an organic EL device, or the like. FIG. 17 is a flow chart showing a process of manufacturing a color filter, and FIG. 18 is a schematic cross section of a color filter 500 (filter substrate 500A) of the present embodiment as shown in the order of the manufacturing process thereof.

Figure 18A:
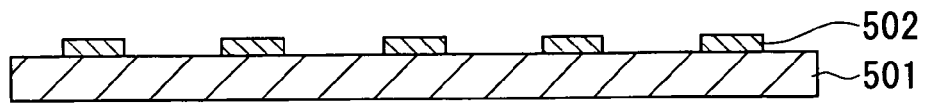
FIGS. 18A to 18E are schematic cross sections of the color filter as shown in the order of manufacturing the same.

First, in a black-matrix forming step (S51), a black matrix 502 is formed on a substrate (W) as shown in FIG. 18A. The black matrix 502 is made of a chromium metal, a laminated body of a chromium metal and a chromium oxide, a resin black, or the like. A sputtering method, a vapor deposition method, or the like can be used to form the black matrix 502 made of a metallic thin film. Furthermore, a gravure printing method, a photo-resist method, a thermal transfer method, or the like can be used to form the black matrix 502 made of a resin thin film.

Figure 18B:
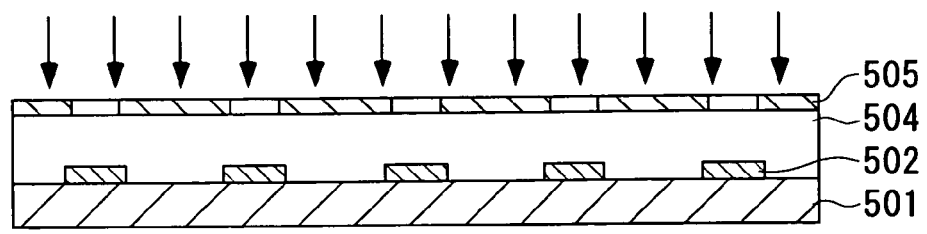

Subsequently, in a bank forming step (S52), a bank 503 is formed so as to superpose on the black matrix 502. In other words, as shown in FIG. 18B, a resist layer 504 made of a negative transparent photosensitive resin is formed to cover the substrate 501 and the black matrix 502. Then, an exposure process is performed on the top surface of the resist layer in a state of being covered by a mask film 505 formed in a matrix pattern.

Figure 18C:
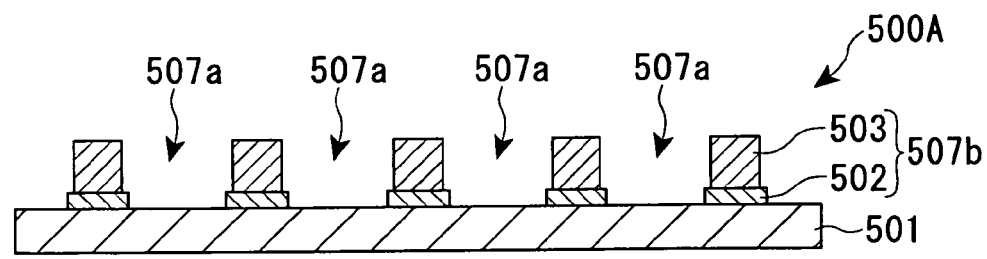

Moreover, as shown in FIG. 18C, an unexposed portion of the resist layer 504 is etched to pattern the resist layer 504, thereby forming the bank 503. Note that, when the black matrix is formed of a resin black, it is possible that the black matrix serves also as the bank.

The bank 503 and the black matrix 502 thereunder serve as a partition wall portion 507b for partitioning respective pixel regions 507a and define shooting positions of functional liquid droplets when coloring layers (film-deposited portions) 508R, 508G, and 508B are formed with the functional liquid droplet ejection heads 41 in a coloring-layer forming step as described later.

According to the black-matrix forming step and the bank forming step as described above, the filter substrate 500A can be obtained.

Note that, in the present embodiment, a resin material is used as a material of the bank 503 so as to have a lyophobic (hydrophobic) surface of a coating film. The front surface of the substrate (glass substrate) 501 is lyophilic (hydrophilic), thereby enhancing the positional accuracy for shooting liquid droplets into the respective pixel regions 507a surrounded by the banks 503 (partition wall portions 507b) in a coloring-layer forming step as described later.

Figure 18D:
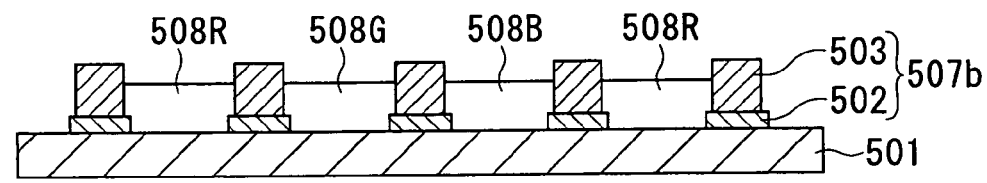

Next, in the coloring-layer forming step (S53), functional liquid droplets are ejected by the functional liquid droplet ejection heads 41 and shot into the respective pixel regions 507a surrounded by the partition wall portions 507b as shown in FIG. 18D. In this case, a functional liquid (filter material) of three colors of R (red), G (green), and B (blue) is introduced by the functional liquid droplet ejection heads 41 to eject functional liquid droplets. Note that examples of arrangement patterns for the three colors of R, G, and B include a strip arrangement, a mosaic arrangement, a delta arrangement, or the like.

Figure 18E:
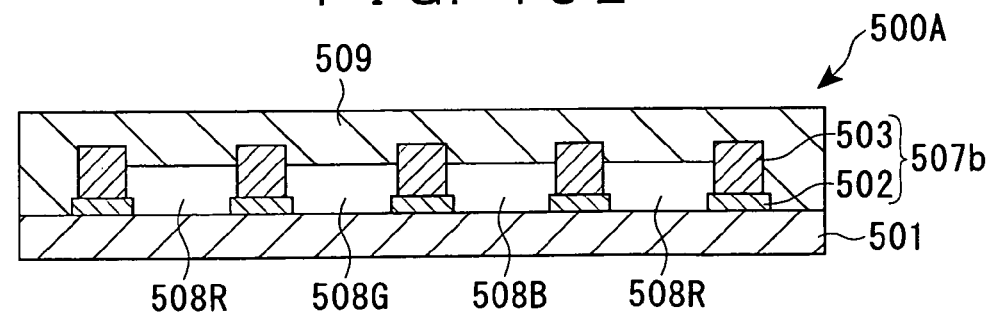

Subsequently, the functional liquids are subjected to drying treatment (e.g., thermal treatment) so as to be fixed, and the coloring layers 508R, 508G, and 508B of the three colors are formed. After the coloring layers of 508R, 508G, and 508B are formed, the step is moved to a protection-film forming step (S54) where a protection film 509 is formed to cover the top surfaces of the substrate 501, the partition wall portions 507b, and the top surface of the coloring layers 508R, 508G, and 508B as shown in FIG. 18E.

In other words, after a coating liquid for a protection film is ejected on the whole surface of the substrate 501 having the coloring layers 508R, 508G, 508B formed thereon, the whole surface is subjected to drying treatment to thereby form the protection film 509.

After the protection film 509 is formed, the step is moved to the next step of forming ITO (Indium Tin Oxide) as a transparent electrode in manufacturing the color filter 500.

FIG. 19 is a cross section of an essential part showing a schematic configuration of a passive matrix liquid crystal display (liquid crystal device) as an example of an LCD using the color filter 500 as described above. It is made possible to obtain a transmission liquid crystal display as a final product by mounting additional elements such as a liquid crystal driving IC, a backlight, a supporting body on a liquid crystal device 520. Note that this color filter 500 is identical with that shown in FIG. 18. Thus, the corresponding portions are denoted by the same reference numerals, but the description thereof will be omitted.

The liquid display device 520 is roughly made up of the color filter 500, a counter substrate 521 made of a glass substrate or the like, and a liquid crystal layer 522 which is made of an STN (Super Twisted Nematic) liquid crystal composition and held between the color filter and the counter substrate. The color filter 500 is arranged on the upper side of the figure (on the observer's side).

Note that, although not shown in the figure, polarizers are each disposed on the outside surfaces of the counter substrate 521 and the color filter 500 (the surfaces opposite to the liquid crystal layer 522 side), and the backlight is disposed on the outside of the polarizer arranged on the counter substrate 521 side.

On the protection film 509 of the color filter 500 (liquid crystal layer side), a plurality of elongated first electrodes 523 in a strip shape are formed in the longitudinal direction at predetermined intervals as shown in FIG. 19. A first alignment layer 524 is formed to cover the surfaces opposite to the color filter 500 side of the first electrodes 523.

On the other hand, on the surface of the counter-substrate 521 opposite to the color filter 500, a plurality of elongated second electrodes 526 in a strip shape are formed in the direction orthogonal to the first electrodes 523 of the color filter 500 at predetermined intervals. A second alignment layer 527 is formed to cover the surfaces of the liquid crystal layer 522 side of the second electrodes 526. The first electrodes 523 and the second electrodes 526 are made of a transparent conductive material such as ITO.

Spacers 528 provided in the liquid crystal layer 522 are members for holding a constant thickness (cell gap) of the liquid crystal layer 522. Furthermore, a sealant 529 is a member for preventing a liquid crystal composition of the liquid crystal layer 522 from leaking outside. Note that one end portion of each of the first electrode 523 extends to the outside of the sealant 529 as a routing wire 523a.

Areas where the first electrodes 523 and the second electrodes 526 cross each other are pixels at which the coloring layers 508R, 508G, and 508B of the color filter 500 are to be positioned.

According to the conventional manufacturing process, the color filter 500 side is formed in such a way that the first electrodes 523 are patterned and the first alignment layer 524 is coated on the color filter 500, while the counter substrate 521 side is formed in such a way that the second electrodes 526 are patterned and the second alignment layer 527 is coated on the counter substrate 521. Subsequently, the spacers 528 and the sealant 529 are formed on the counter substrate 521 side and bonded to the color filter 500 side. Next, after liquid crystal constituting the liquid crystal layer 522 is filled in from an inlet of the sealant 529, the inlet is closed. Then, both polarizers and the backlight are deposited.

According to the imaging apparatus 1 of the embodiment, it is, for example, possible to coat a spacer material (functional liquid) constituting the cell gap and evenly coat liquid crystal (functional liquid) in the region surrounded by the sealant 529 before the color filter 500 side is bonded to the counter substrate 521 side. It is further possible to perform printing of the sealant 529 with the functional liquid droplet ejection heads 41. In addition, it is possible to coat the first and second alignment layers 524 and 527 with the functional liquid droplet ejection heads 41.

Figure 20:
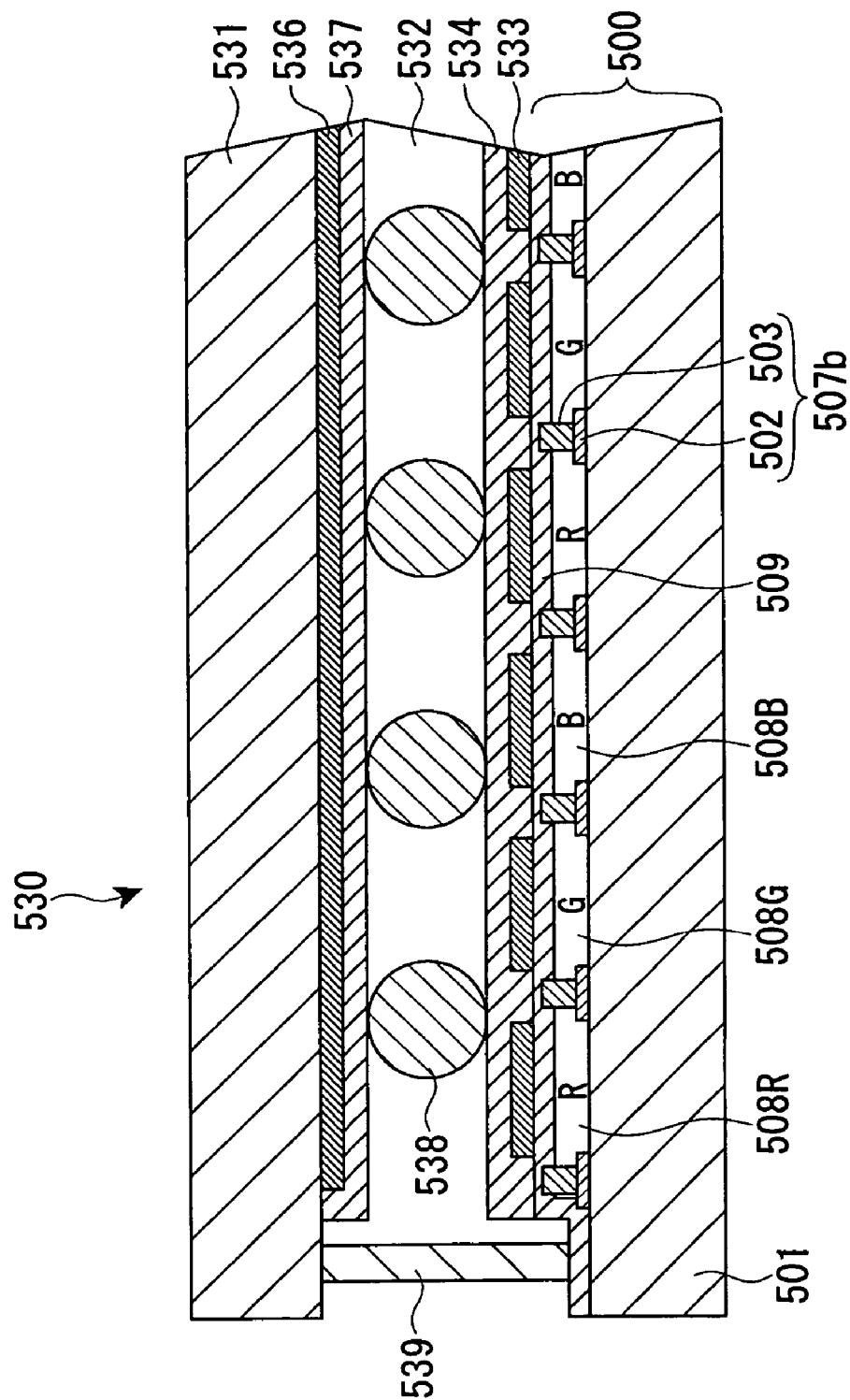
FIG. 20 is a cross section of an essential part showing a schematic configuration of a liquid crystal device as a second example using the color filter to which the invention is applied.

FIG. 20 is a cross section of an essential part showing a schematic configuration of a liquid crystal device, as a second example, using the color filter 500 manufactured in the present embodiment.

The liquid crystal device 530 is greatly different from the liquid crystal device 520 in that the color filter 500 is arranged on the lower side of the figure (the side opposite to the observer's side).

The liquid display device 530 is roughly made up of the color filter 500, a counter substrate 531 made of a glass substrate or the like, and a liquid crystal layer 532 made of an STN liquid crystal composition and held between the color filter and the counter substrate. Note that, although not shown in the figure, polarizers or the like are each disposed on the outside surfaces of the counter substrate 531 and the color filter 500.

On the protection film 509 of the color filter 500 (liquid crystal layer 532 side), a plurality of elongated first electrodes 533 in a strip shape extending in the direction orthogonal to the figure are formed at predetermined intervals. A first alignment layer 534 is formed to cover the surfaces on the liquid crystal layer 532 side of the first electrodes 533.

On the surface of the counter substrate 531 opposite to the color filter 500, a plurality of elongated second electrodes 536 in a strip shape extending in the direction orthogonal to the first electrodes 533 on the color filter 500 side are formed at predetermined intervals. A second alignment layer 537 is formed to cover the surfaces of the liquid crystal layer 532 side of the second electrodes 526.

The liquid crystal layer 532 has provided therein spacers 538 for holding a constant thickness of the liquid crystal layer 532 and a sealant 539 for preventing a liquid crystal composition in the liquid crystal layer 532 from leaking outside.

In the same manner as that of the liquid crystal device 520, areas where the first electrodes 533 and the second electrodes 536 cross each other are pixels at which the coloring layers 508R, 508G, and 508B of the color filter 500 are to be positioned.

Figure 21:
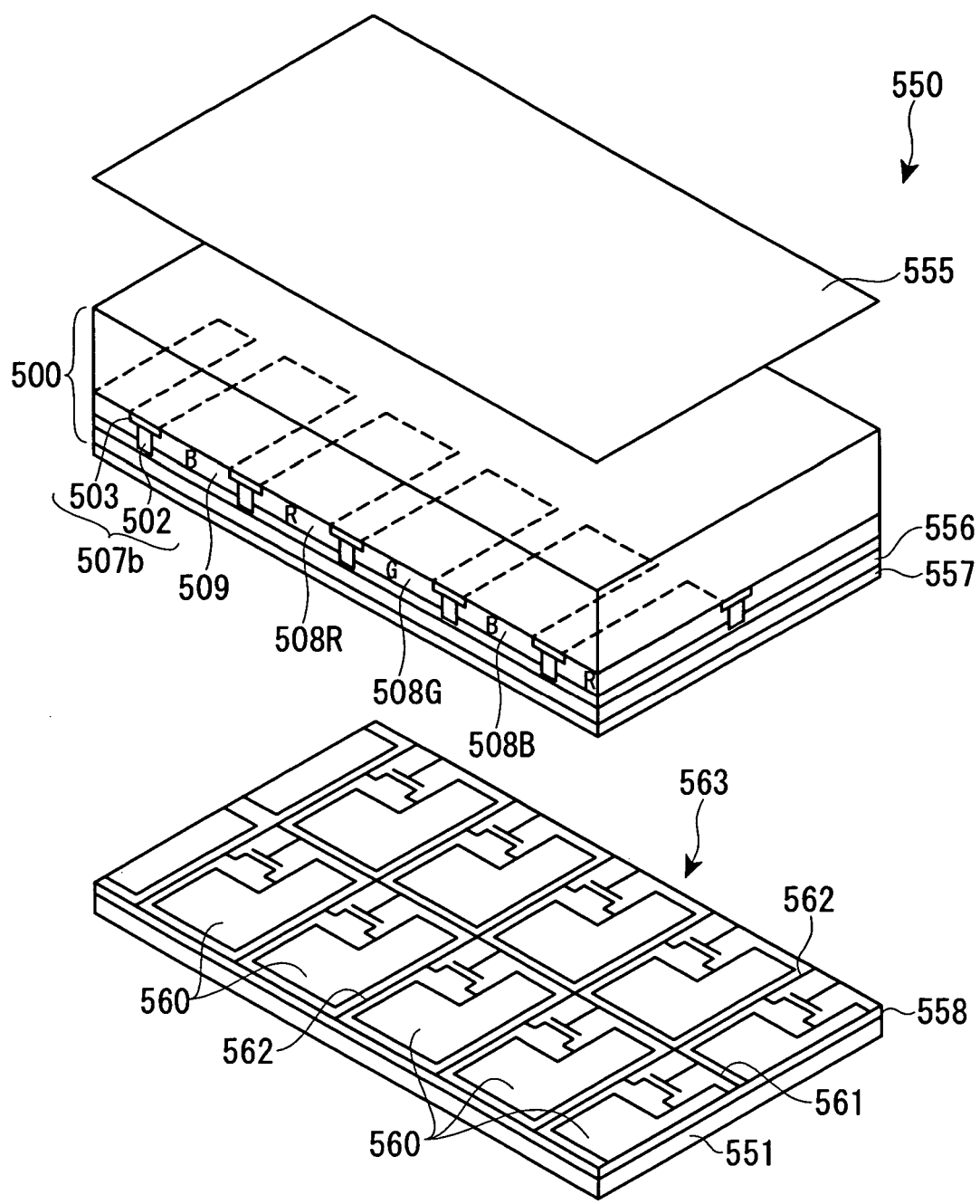
FIG. 21 is a cross section of an essential part showing a schematic configuration of a liquid crystal device as a third example using the color filter to which the invention is applied.

FIG. 21 shows a third example in which a liquid crystal device is constituted by the use of the color filter 500 to which the invention is applied and is an exploded perspective view showing a schematic configuration of a transmission TFT (Thin Film Transistor) liquid crystal device.

In the liquid crystal device 550, the color filter 500 is arranged on the upper side of the figure (on the observer's side).

The liquid crystal device 550 is roughly made up of the color filter 500, a counter substrate 551 disposed so as to oppose the color filter, a liquid crystal layer held between the color filter and the counter substrate (not shown), a polarizer 555 disposed on the top surface side of the color filter 500 (observer's side), and a polarizer (not shown) disposed on the bottom surface side of the counter substrate 551.

On the front surface of the protection film 509 of the color filter 500 (the surface on the counter substrate 551 side) is formed electrodes 556 for driving liquid crystal. The electrodes 556 are made of a transparent conductive material such as ITO and serves as a whole electrode covering the whole region in which the later-mentioned pixel electrodes 560 are formed. Furthermore, an alignment layer 557 is disposed in such a way as to cover the surfaces of the electrodes 556 opposite to the pixel electrodes 560 side.

The counter substrate 551 has an insulating layer 558 formed on the surface thereof opposite to the color filter 500. On the insulating layer 558 are formed scanning lines 561 and signal lines 562 in such a way that they directly cross each other. In regions surrounded by the scanning lines 561 and the signal lines 562 are formed pixel electrodes 560. Note that, although an alignment layer is disposed on the pixel electrodes 560 in an actual liquid crystal devices, it is omitted in the figure.

Furthermore, in the portion surrounded by a notch of the pixel electrode 560, each of the scanning lines 561, and each of the signal lines 562 is incorporated a thin film transistor 563 including a source electrode, a drain electrode, a semiconductor, and a gate electrode. It is possible, by applying signals to the scanning lines 561 and the signal lines 562, to turn on or off the thin film transistor 563 so as to perform a current-exiting control on the pixel electrodes 560.

Note that, although the liquid crystal devices 520, 530, and 550 of the respective examples as described above are of a transmission type, it is also possible to employ a liquid crystal device of a reflective type or a semi-transparent reflective type by providing a reflective layer or a semi-transparent reflective layer therein.

Figure 22:
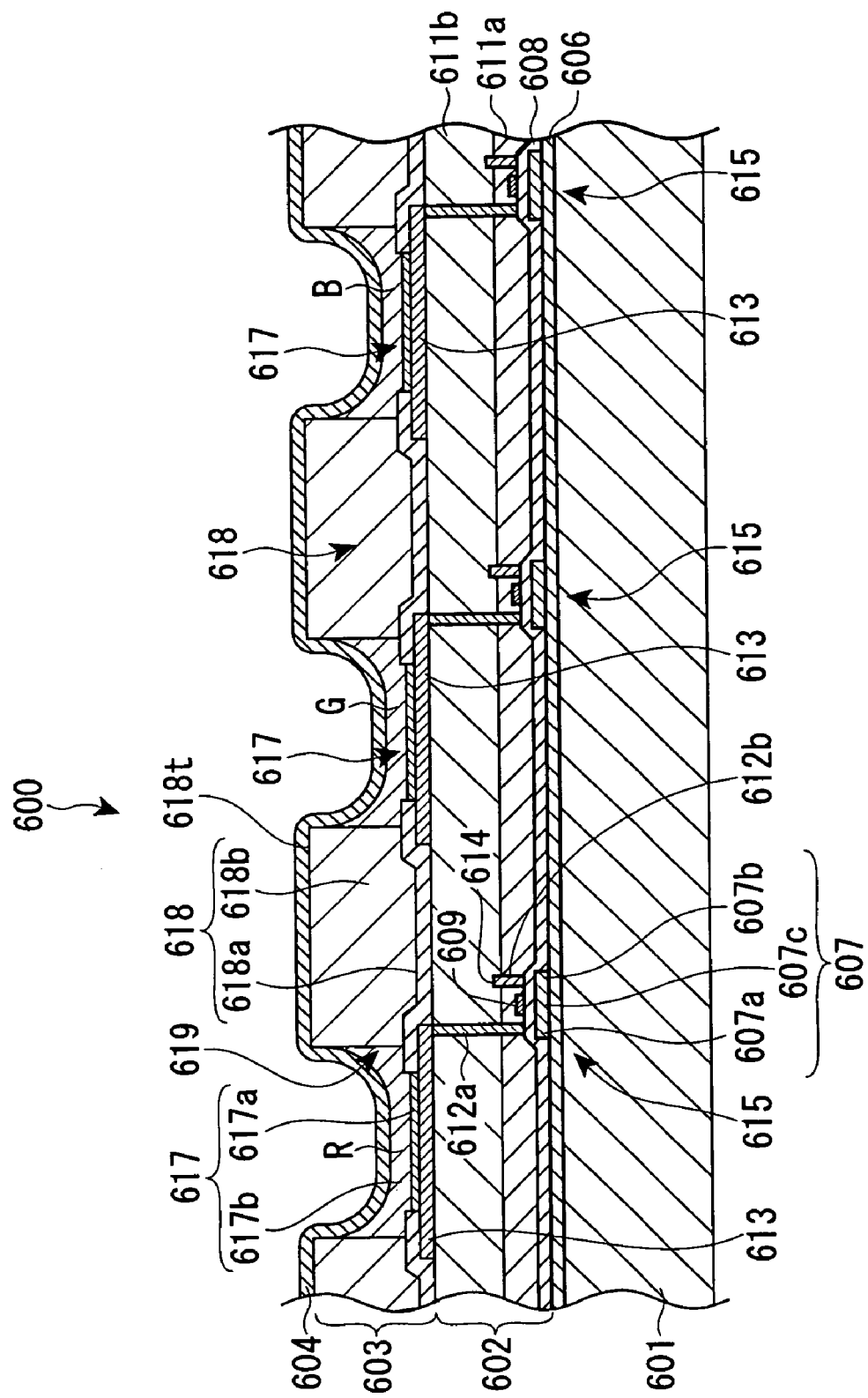
FIG. 22 is a cross section of an essential part of a display device as an organic EL device.

Next, FIG. 22 is a cross section of an essential part of a display region of an organic EL device (hereinafter, simply referred to as a display device 600).

The display device 600 has a rough configuration in which a circuit element portion 602, a light-emitting element portion 603, and a cathode 604 are laminated on a substrate (W) 601.

In the display device 600, light emitted from the light-emitting element portion 603 to the substrate 601 side passes through the circuit element portion 602 and the substrate 601 and is emitted to the observer's side, while light emitted from the light-emitting element portion 603 to the side opposite to the substrate 601 is reflected by the cathode 604, then passes through the circuit element portion 602 and the substrate 601, and is emitted to the observer's side.

The circuit element portion 602 and the substrate 601 have a base protection film 606 made of a silicone oxide film formed therebetween. The base protection film 606 (light-emitting element portion 603 side) has island-shaped semiconductor films 607 made of polycrystalline silicone formed thereon. In the left and right regions of the semiconductor films 607, highly concentrated cations are implanted so as to form a source region 607a and a drain region 607b, respectively. The central portion where no cations are implanted serves as a channel region 607c.

Furthermore, the circuit element portion 602 has a transparent gate insulation film 608 covering the base protection film 606 and the semiconductor film 607 formed thereon. At the positions corresponding to the channel regions 607c of the semiconductor film 607 on the gate insulation film 608 are formed gate electrodes 609 consisting of Al, Mo, Ta, Ti, W, or the like. The gate electrodes 609 and the gate insulation film 608 have first and second transparent interlayer insulation films 611a and 611b formed thereon. Furthermore, contact holes 612a and 612b are formed in such a way as to penetrate the first and second interlayer insulation films 611a and 611b and communicate with the source region 607a and the drain region 607b of the semiconductor film 607, respectively.

The second interlayer insulation film 611b has transparent pixel electrodes 613 made ITO or the like formed thereon in a predetermined pattern, and each of the pixel electrodes 613 is connected to the source region 607a through the contact hole 612a.

Furthermore, the first interlayer insulation film 611a has a power source line 614 disposed thereon. The power source line 614 is connected to the drain region 607b through the contact hole 612b.

As described above, the circuit element portion 602 has driving thin film transistors 615 connected to the respective pixel electrodes 613 formed therein.

The light-emitting element portion 603 is roughly made up of functional layers 617 laminated on a plurality of pixel electrodes 613 and bank portions 618 which are provided between sets of the respective pixel electrodes 613 and the functional layers 617 so as to partition the respective functional layers 617.

A light-emitting element is constituted of the pixel electrodes 613, the functional layers 617, and the cathode 604 disposed on the functional layers 617. Note that the pixel electrodes 613 are patterned in an approximately rectangular shape in plan view, and the bank portions 618 are formed between the respective pixel electrodes 613.

Each of the bank portions 618 is constituted of an inorganic bank layer 618a (first bank layer) made of an inorganic material such as SiO, $SiO_2$, or $TiO_2$ and an organic bank layer 618b (second bank layer) laminated on the inorganic bank layer 618a and is made of a resist such as an acryl resin resist or a polyimide resin resist excellent in thermal resistance and solvent resistance, having a trapezoidal shape in cross section. A part of the bank portion 618 overlies the periphery of the respective pixel electrodes 613.

The respective bank portions 618 have an opening portion 619 formed therebetween, formed to be gradually enlarged upward relative to the pixel electrodes 613.

Each of the functional layers 617 is constituted of a hole-injecting/transporting layer 617a and a light-emitting layer 617b formed on the hole-injecting/transporting layer 617a, both lying on the pixel electrode 613 of the opening portion in a laminated state. Note that another functional layer having any other function may be additionally formed, lying adjacent to the light-emitting layer 617b. For example, it is possible to form an electron-transporting layer. The hole-injecting/transporting layer 617a serves to transport holes from the pixel electrode 613 side and inject the same into the light-emitting layer 617b. The hole-injecting/transporting layer 617a is formed after a first composition (functional liquid) containing a material for forming a hole-injecting/transporting layer is ejected. A publicly known material is used as the material for forming a hole-injecting/transporting layer.

The light-emitting layer 617b emits light of any one of the colors red (R), green (G), and blue (B) and is formed after a second composition (functional liquid) containing a material for forming a light-emitting layer (light-emitting material) is ejected. It is preferable that a publicly known material insoluble to the hole-injecting/transporting layer 617a be used as a solvent of the second composition (nonpolar solvent). Such a nonpolar solvent is used as the second composition of the light-emitting layer 617, thereby making it possible to form the light-emitting layer 617b without dissolving the hole-injecting/transporting layer 617a again.

According to this configuration, holes injected from the hole-injecting/transporting layer 617a and electrons injected from the cathode 614 are reunited so as to emit light in the light-emitting layer 617b.

The cathode 604 is formed so as to cover the whole light-emitting element portion 603 and plays an role of passing an electric current to the functional layer 617 together with the pixel electrode 613 as a pair. Note that the cathode 604 has a sealing member (not shown) arranged thereabove.

Referring next to FIGS. 23 to 31, description will be made about a process of manufacturing the display device 600.

The display device 600 is manufactured by way of a bank-portion forming step (S61), a surface-treatment step (S62), a hole-injecting/transporting layer forming step (S63), a light-emitting layer forming step (S64), and an counter-electrode forming step (S65). Note that the manufacturing process is not limited to that exemplified in the figure, and some steps may be deleted from or added to the process as required.

Figure 24:
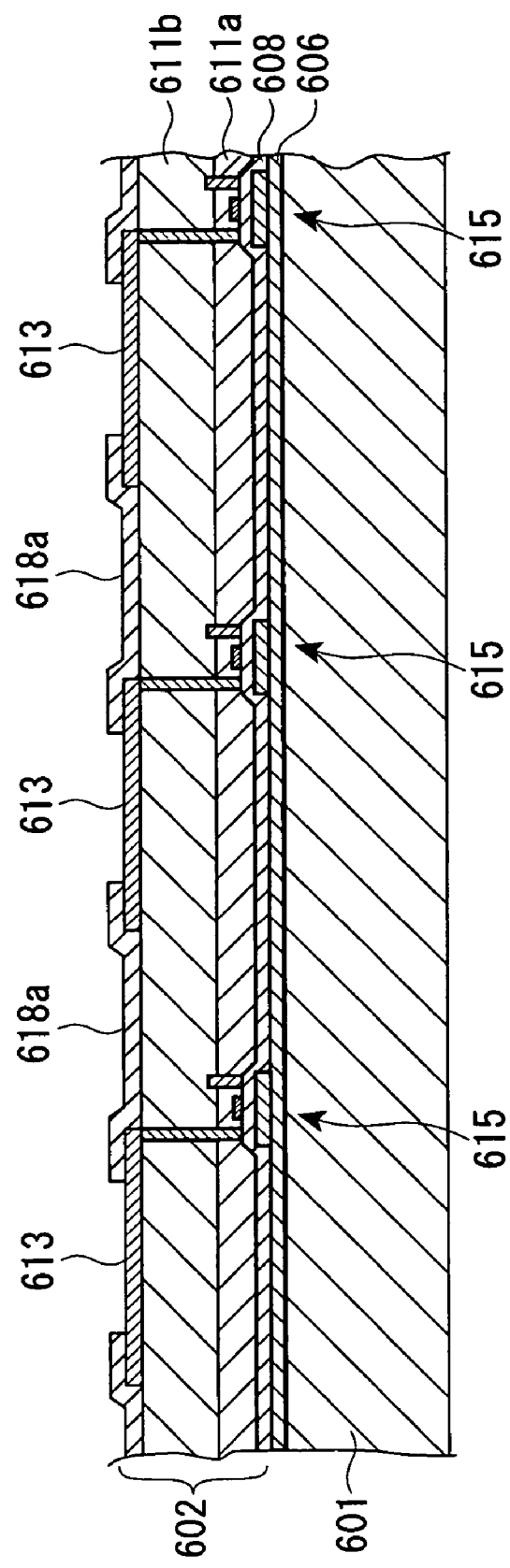
FIG. 24 is a process drawing explaining the formation of an inorganic bank layer.

First, as shown in FIG. 24, the inorganic bank layer 618a is formed on the second interlayer insulation film 611b in the bank-portion forming step (S61). The inorganic bank layer 618a is formed after an inorganic film is formed at its forming position and is then patterned by a photolithographic process or the like. At this time, a part of the inorganic bank layer 618a is formed so as to overlap with the periphery of the pixel electrode 613.

Figure 25:
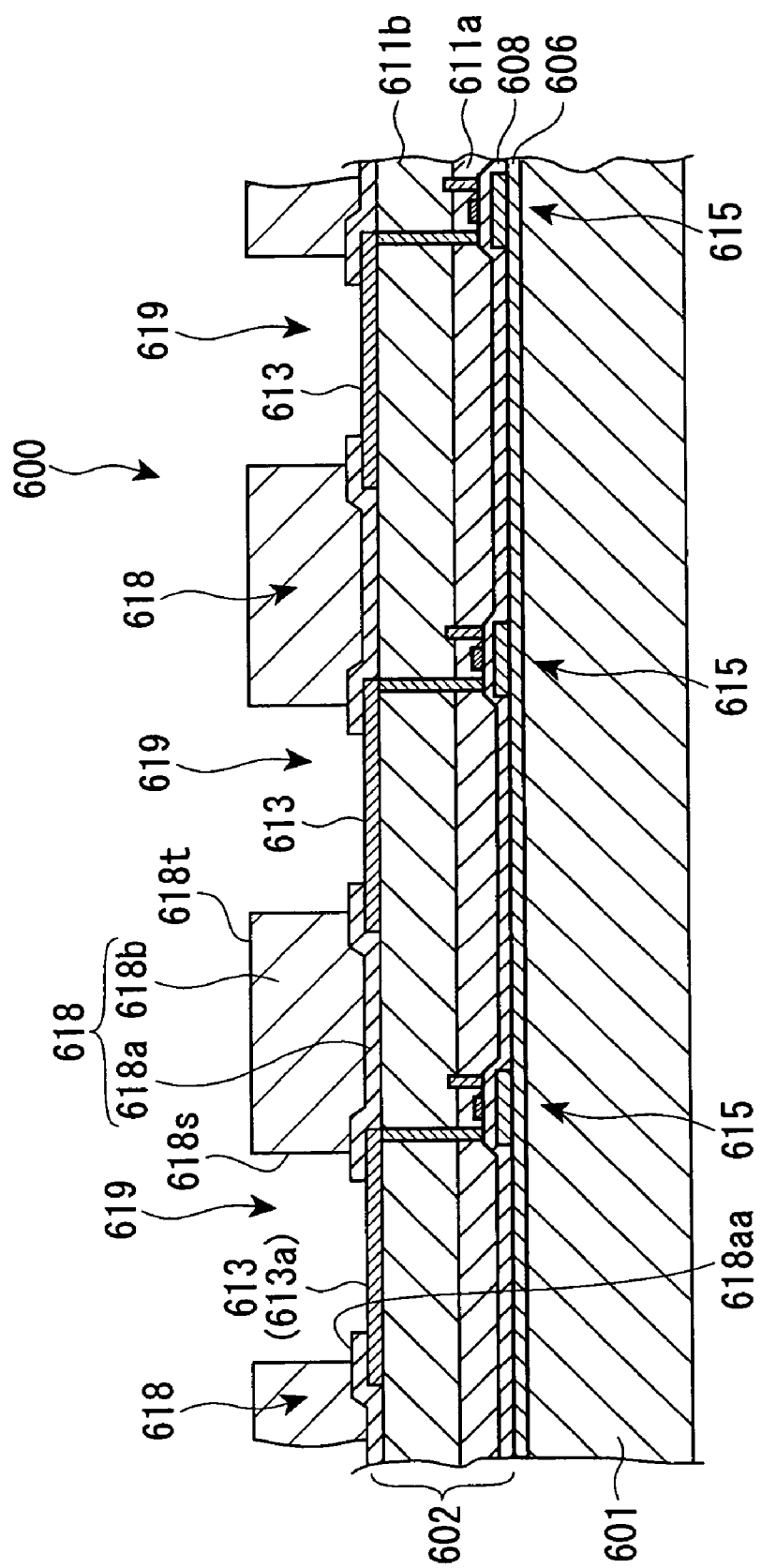
FIG. 25 is a process drawing explaining the formation of an organic bank layer.

After the inorganic bank layer 618a is formed, the organic bank layer 618b is formed on the inorganic bank layer 618a as shown in FIG. 25. The organic bank layer 618b is also patterned by the photolithographic process or the like in the same manner as that of the inorganic bank layer 618a.

The bank portion 618 is thus formed. In accordance with the formation of the bank, the respective bank portions 618 have the opening portion 619 formed therebetween so as to be opened upward relative to the pixel electrodes 613. The opening portion 619 serves to define a pixel region.

In the surface-treatment step (S62), lyophilic and liquid-repellent treatments are performed. The lyophilic treatment is applied to the regions of a first lamination portion 618aa of the inorganic bank layer 618a and an electrode surface 613a of the pixel electrode 613, and the regions are surface-treated so as to be lyophilic with plasma treatment using, for example, oxygen as a process gas. The plasma treatment serves also to clean ITO constituting the pixel electrode 613.

Furthermore, the liquid-repellent treatment is applied to wall surfaces 618s and the top surface 618t of the organic bank layer 618b, and the surfaces are fluoridized (treated so as to be liquid-repellent) with plasma treatment using, for example, tetrafluoromethane as a process gas.

As a result of the surface treatment step, it is possible to reliably shoot functional liquid droplets into pixel regions when the functional layer 617 is formed with the functional liquid droplet ejection head 41 and prevent the functional liquids shot into the pixel regions from leaking out of the opening portion 619.

According to the above-described steps, a display device substrate 600A can be obtained. The display device substrate 600A is mounted on the set table 23 of the imaging apparatus 1 as shown in FIG. 1, and the following hole-injecting/transporting layer forming step (S63) and the light-emitting layer forming step (S64) are hereinafter performed.

Figure 26:
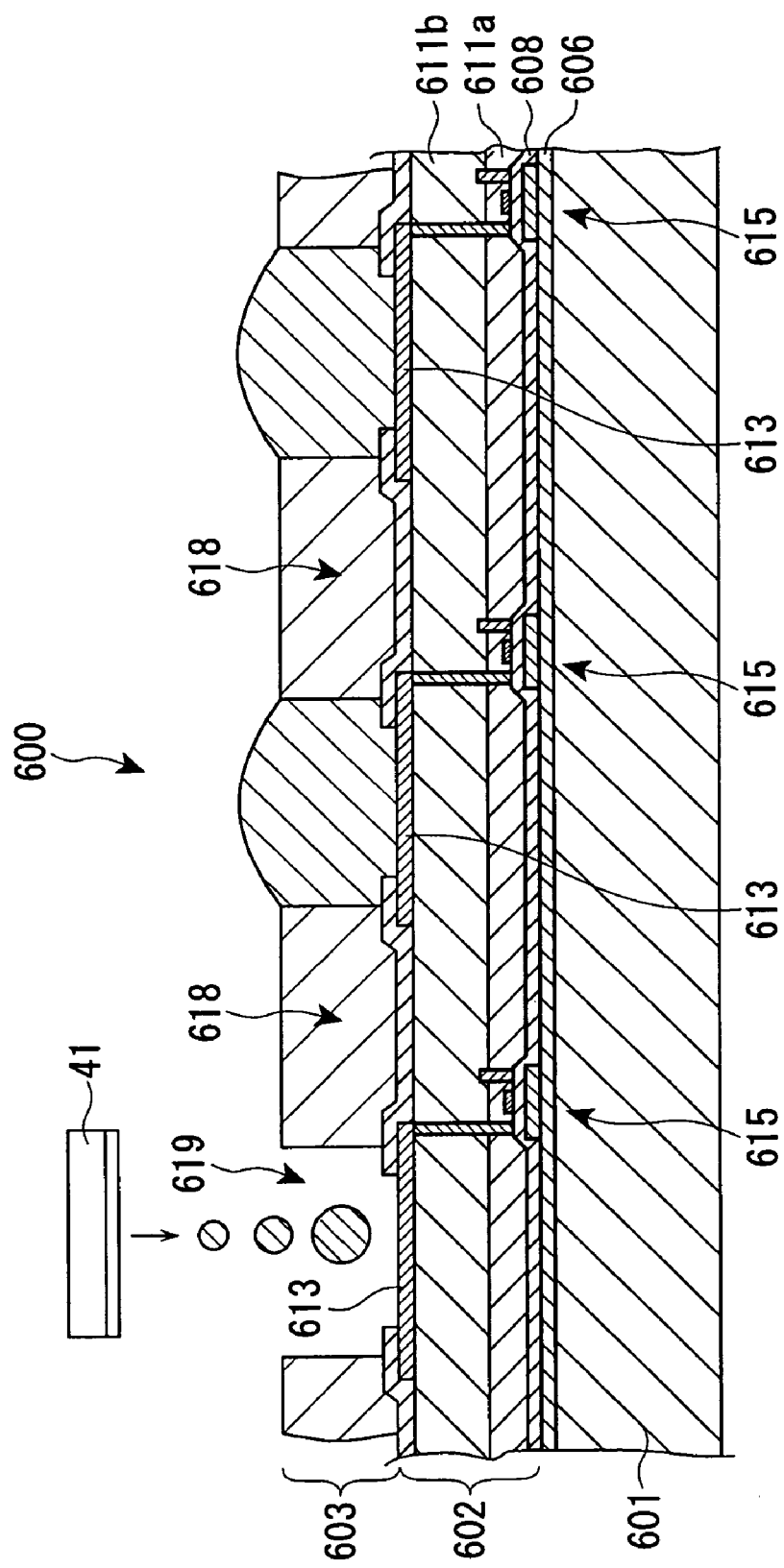
FIG. 26 is a process drawing explaining a step of forming a hole-injecting/transporting layer.
Figure 27:
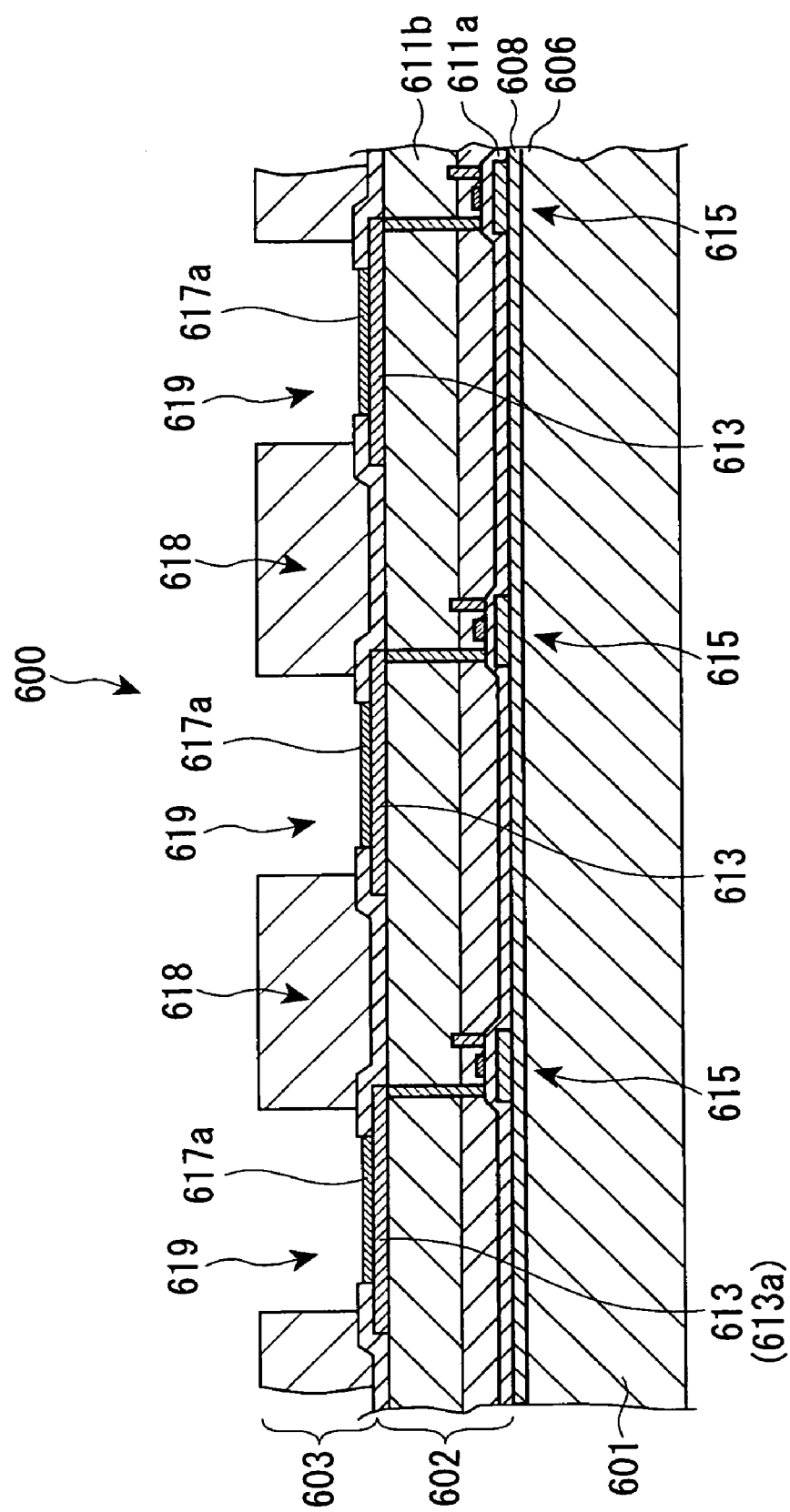
FIG. 27 is a process drawing explaining a state where the hole-injecting/transporting layer is formed.

As shown in FIG. 26, in the hole-injecting/transporting layer forming step, the functional liquid droplet ejection head 41 ejects the first composition containing the hole-injecting/transporting layer forming material in the corresponding opening portion 619 as a pixel region. Subsequently, drying treatment and thermal treatment are performed on the first composition so as to evaporate a polar solvent contained therein and form the hole-injecting/transporting layer 617a on the pixel electrode (electrode surface 613a) 613 as shown in FIG. 27.

Next, description will be made about the light-emitting layer forming step (S64). In the light-emitting layer forming step, the nonpolar solvent insoluble to the hole-injecting/transporting layer 617a is used as the second composition solvent for use in forming the light-emitting layer so as to prevent the hole-injecting/transporting layer 617a from being dissolved again as described above.

On the other hand, however, the hole-injecting/transporting layer 617a has a low affinity for the nonpolar solvent. Therefore, even if the second composition containing the nonpolar solvent is ejected on the hole-injecting/transporting layer 617a, there is a possibility that the hole-injecting/transporting layer 617*a* cannot be brought into intimate contact with the light-emitting layer 617*b*, or that the light-emitting layer 617*b* cannot be evenly coated.

To enhance the affinity of the surface of the hole-injecting/transporting layer 617*a* with respect to the nonpolar solvent and the light-emitting layer forming material, it is preferable that the surface treatment (surface modification treatment) be performed before the light-emitting layer is formed. In the surface treatment, a surface modification material as a solvent identical with or similar to the nonpolar solvent of the second composition for use in forming the light-emitting layer is coated on the hole-injecting/transporting layer 617*a* and then dried.

Such treatments make it easy for the surface of the hole-injecting/transporting layer 617*a* to soak into the nonpolar solvent, and the second composition containing the light-emitting layer forming material can be evenly coated on the hole-injecting/transporting layer 617*a* in the following steps.

Figure 23:
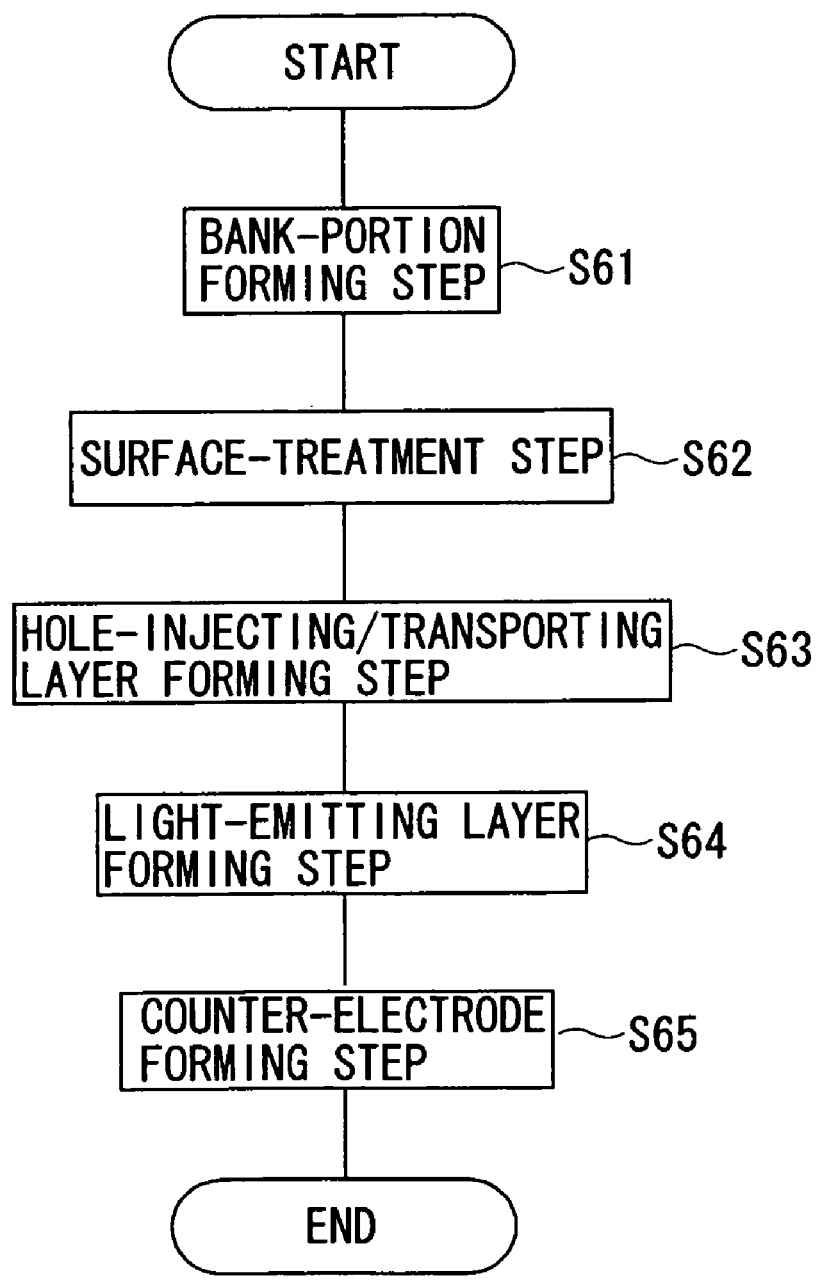
FIG. 23 is a flow chart explaining a step of manufacturing the display device as an organic EL device.
Figure 28:
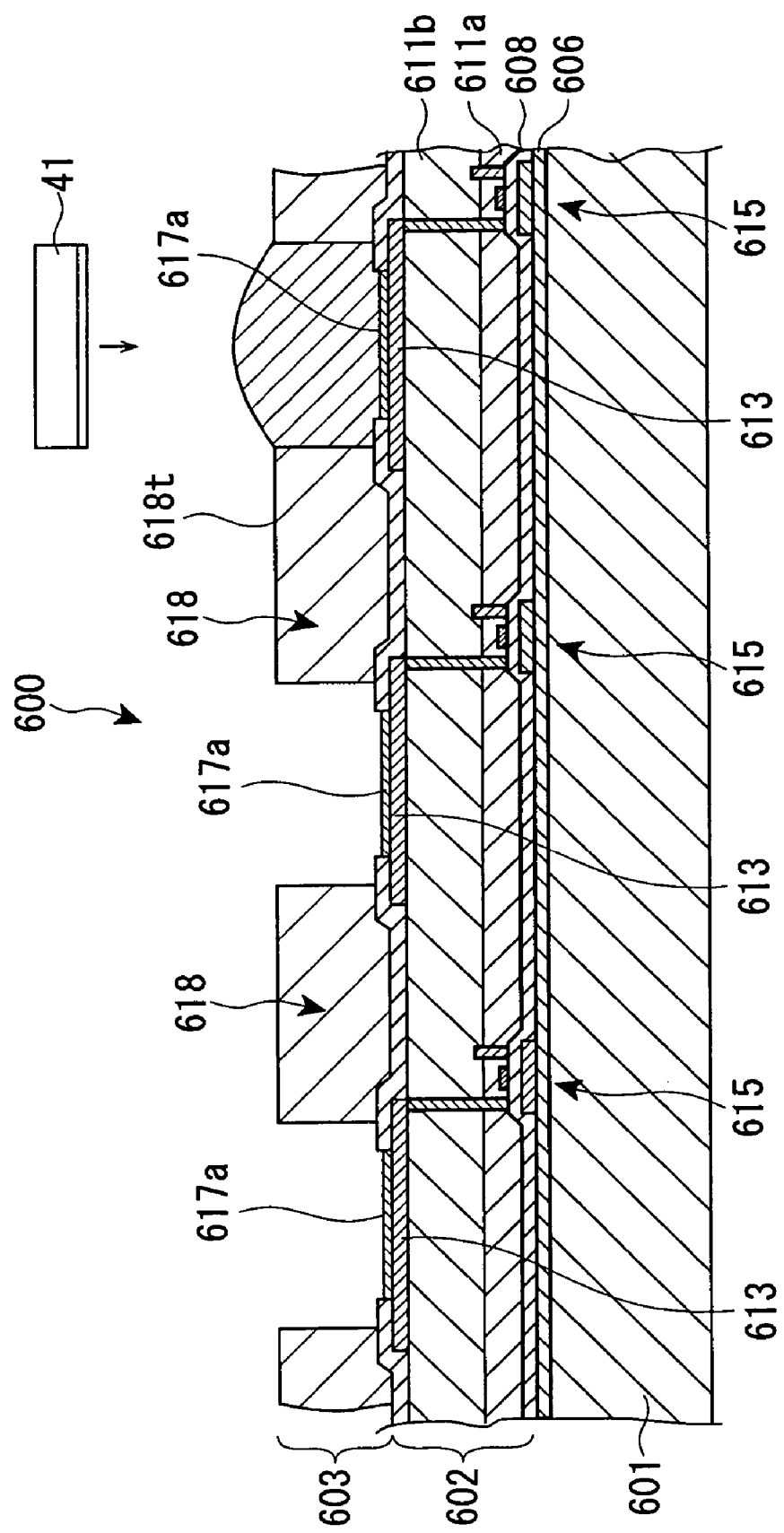
FIG. 28 is a process drawing explaining a step of forming a blue light-emitting layer.
Figure 29:
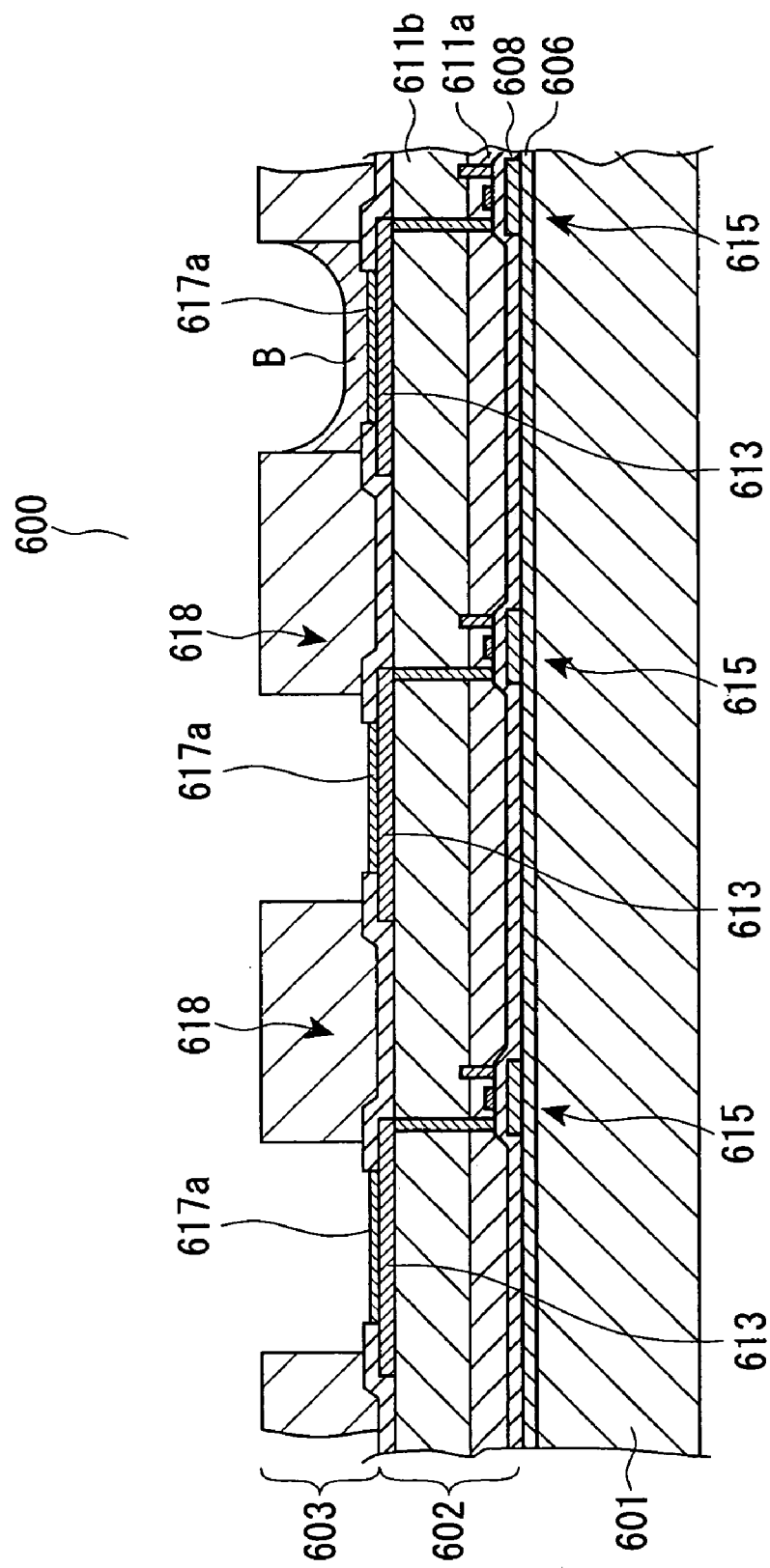
FIG. 29 is a process drawing explaining a state where the blue light-emitting layer is formed.

Next, as shown in FIG. 28, a predetermined amount of the second composition containing the light-emitting layer forming material corresponding to any one of the colors (blue (B) in the example of FIG. 23) is implanted in the pixel region (opening portion 619) as a functional liquid droplet. The second composition implanted in the pixel region spreads over the hole-injecting/transporting layer 617*a* and is filled in the opening portion 619. Note that, in case that the second composition is shot on the top surface 618*t* of the bank portion 618 away from the pixel region, it will easily find its way into the opening portion 619 since the liquid-repellent treatment has been previously applied to the top surface 618*t* as described above.

Subsequently, the second composition ejected is dried through a drying step, etc., making the nonpolar solvent contained in the second composition evaporate, and then forming the light-emitting layer 617*b* on the hole-injecting/transporting layer 617*a*. In the case of this figure, the light-emitting layer 617*b* corresponding to the blue color (B) is formed.

Figure 30:
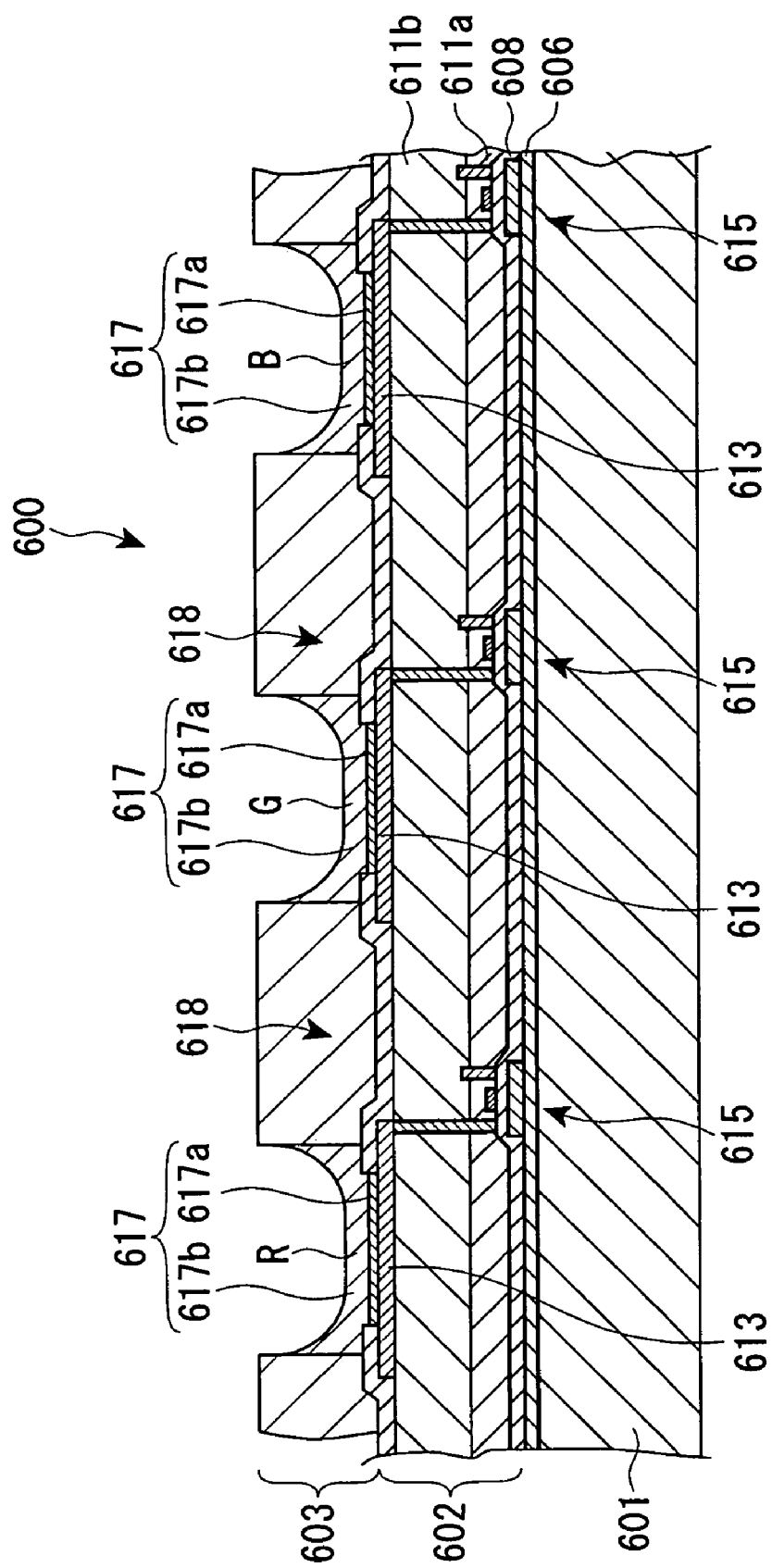
FIG. 30 is a process drawing explaining a state where light-emitting layers of each color are formed.
Figure 31:
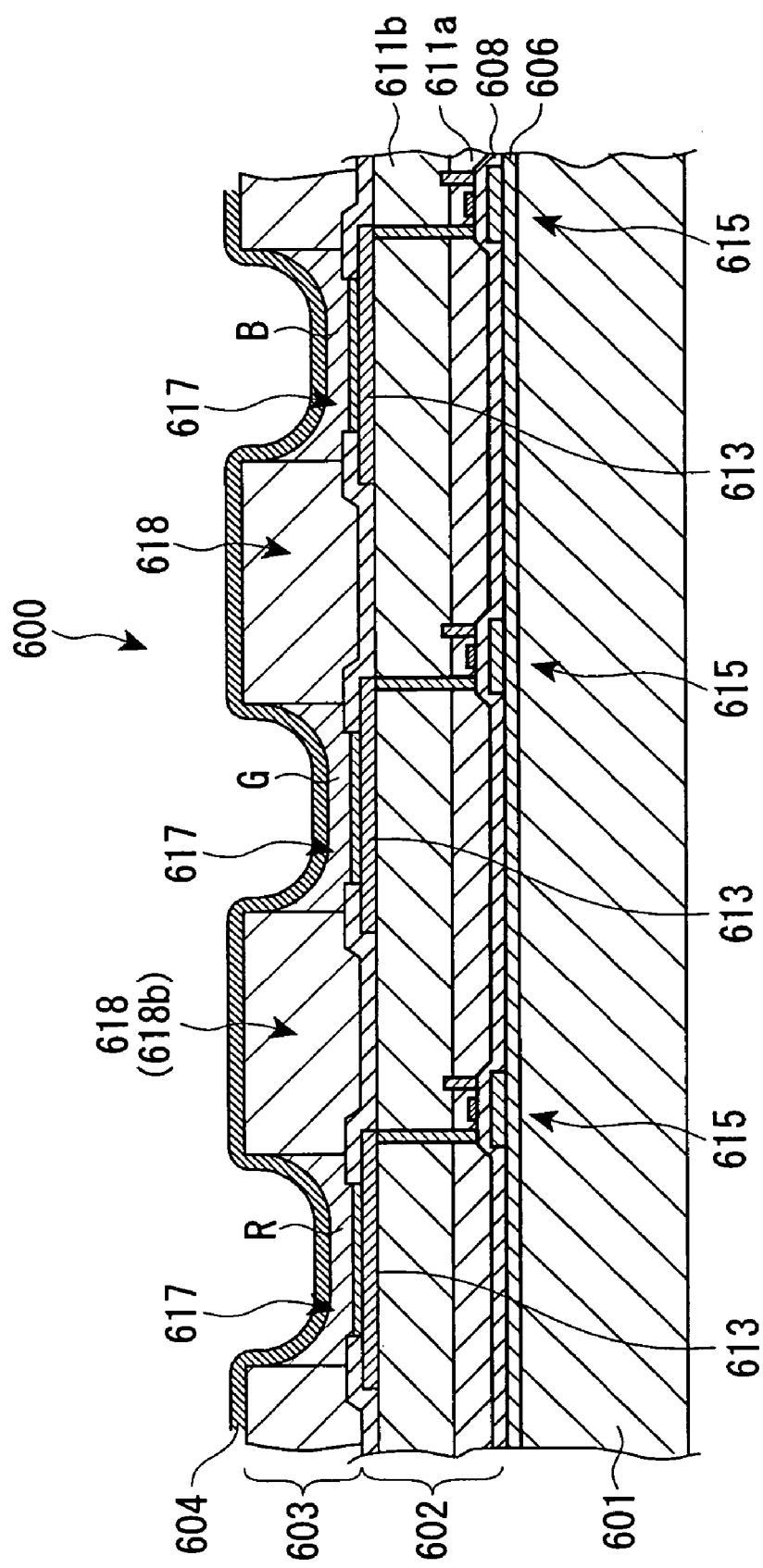
FIG. 31 is a process drawing explaining the formation of a cathode.

Similarly, as shown in FIG. 30, steps similar to that of the light-emitting layer 617*b* corresponding to the blue color (B) as described above are sequentially performed with the functional liquid droplet ejection head 41, and the light-emitting layers 617*b* corresponding to the other colors (red (R) and green (G)) are formed. Note that the order of forming the light-emitting layers 617*b* is not limited to the exemplified one, and the light-emitting layers may be formed in any order. For example, the order can be determined in accordance with the light-emitting layer forming material. Furthermore, examples of arrangement patterns for the three colors of R, G, and B include a strip arrangement, a mosaic arrangement, a delta arrangement, or the like.

In the manner as described above, the functional layer 617, namely, the hole-injecting/transporting layer 617*a* and light-emitting layer 617*b* are formed on each of the pixel electrodes 613. Then, the step is moved to the counter-electrode forming step (S65).

In the counter-electrode forming step (S65), the cathode 604 (counter electrode) is formed on the whole surfaces of the light-emitting layers 617*b* and the organic bank layers 618*b* by, for example, vapor deposition, spattering, CVD (chemical vapor deposition), or the like. In the present embodiment, the cathode 604 has, for example, a calcium layer and an aluminum layer laminated therein.

The cathode 604 has properly disposed thereon an Al film or an Ag film as an electrode and a protection layer made of $SiO_2$, SiN, or the like for preventing the Al film or the Ag film from being oxidized.

After the cathode 604 is thus formed, when other treatments such as sealing treatment for sealing the top portion of the cathode 604 with a sealing member and wiring treatment are applied, the display device 600 is obtained.

Next, FIG. 32 is an exploded perspective view of an essential part of a plasma display panel (PDP device: hereinafter, simply referred to as a display device 700). Note that the display device 700 is shown in a state where a part thereof is cut away.

The display device 700 is roughly made up of mutually opposing first and second substrates 701 and 702 and a discharge display portion 703 held between the first and second substrates. The discharge display portion 703 is constituted of a plurality of discharge chambers 705. Of the plurality of discharge chambers 705, a set of three discharge chambers 705 of a red discharge chamber 705R, a green discharge chamber 705G, and a blue discharge chamber 705B is arranged so as to constitute one pixel.

The first substrate 707 has address electrodes 706 formed on the top surface thereof in a stripe pattern at predetermined intervals, and a dielectric layer 707 is formed to cover the top surfaces of the address electrodes 706 and the first substrate 701. The dielectric layer 707 has partition walls 708 provided thereon in a standing manner, each being arranged between the respective address electrodes 706 and extending along the corresponding address electrodes 706. The partition walls 708 include those extending along the address electrodes 706 as shown in the figure and those (not shown) extending orthogonal to the address electrodes 706.

Areas partitioned by the partition walls 708 serve as the discharge chambers 705.

Each of the discharge chambers 705 has a phosphor 709 arranged therein. The phosphor 709 emits fluorescent light of any one of the colors red (R), green (G), or blue (B). The red, green, and blue discharge chambers 705R, 705G, and 705B have red, green, and blue fluorescent materials 709R, 705G, and 705B arranged at the bottom portions thereof, respectively.

The second substrate 702 has a plurality of display electrodes 711 formed on the bottom surface thereof, as shown in the figure, so as to extend in the direction orthogonal to the address electrodes 706 in a stripe pattern at predetermined intervals. To cover the display electrodes, a dielectric layer 712 and a protection film 713 made of MgO or the like are formed.

The first substrate 701 and the second substrate 702 are bonded to each other in a state where the address electrodes 706 and the display electrodes 711 lie orthogonal to each other. Note that the address electrodes 706 and the display electrodes 711 are connected to respective alternators (not shown).

When each of the electrodes 706 and 711 is energized, the phosphors 709 are excited to emit light in the discharge display portion 703, thereby providing color display.

According to the present embodiment, the address electrodes 706, the display electrodes 711, and the phosphors 709 can be formed with the imaging apparatus 1 as described in FIG. 1. Hereinafter, description will be made about a step of forming the address electrodes 706 of the first substrate 701.

In this case, the following step is performed in a state where the first substrate 701 is mounted on the set table 23 of the imaging apparatus 1.

First, a liquid material (functional liquid) containing a material for forming a conductive-film wiring is, as a functional liquid droplet, shot into a region of forming an address electrode with the functional liquid droplet ejection heads 41. The liquid material contains conductive fine particles made of a metal or the like, dispersed into a disperse medium, as a material for forming a conductive-film wiring. As the conductive fine particles, metal fine particles containing, for example, gold, silver, copper, palladium, nickel, and a conductive polymer or the like are used.

When replenishment of the liquid material in the whole region of forming address electrodes to be objected is finished, the ejected liquid material is subjected to drying treatment and the disperse medium contained in the liquid material is evaporated, thereby forming the address electrodes 706.

Meanwhile, as the address electrodes 706 are formed in the above, the display electrodes 711 and the phosphors 709 can also be formed by way of each of the above-described steps.

To form the display electrodes 711, a liquid material (functional liquid) containing a material for forming a conductive film wiring is, as a functional liquid droplet, shot into a region of forming a display electrode in the same manner as that of the address electrodes 706.

To form the phosphors 709, a liquid material (functional liquid) containing a luminescent material corresponding to each of the colors, R, G, and B, is ejected from the functional liquid droplet ejection heads 41 and shot into the discharge chambers 705 of the corresponding colors.

Figure 33:
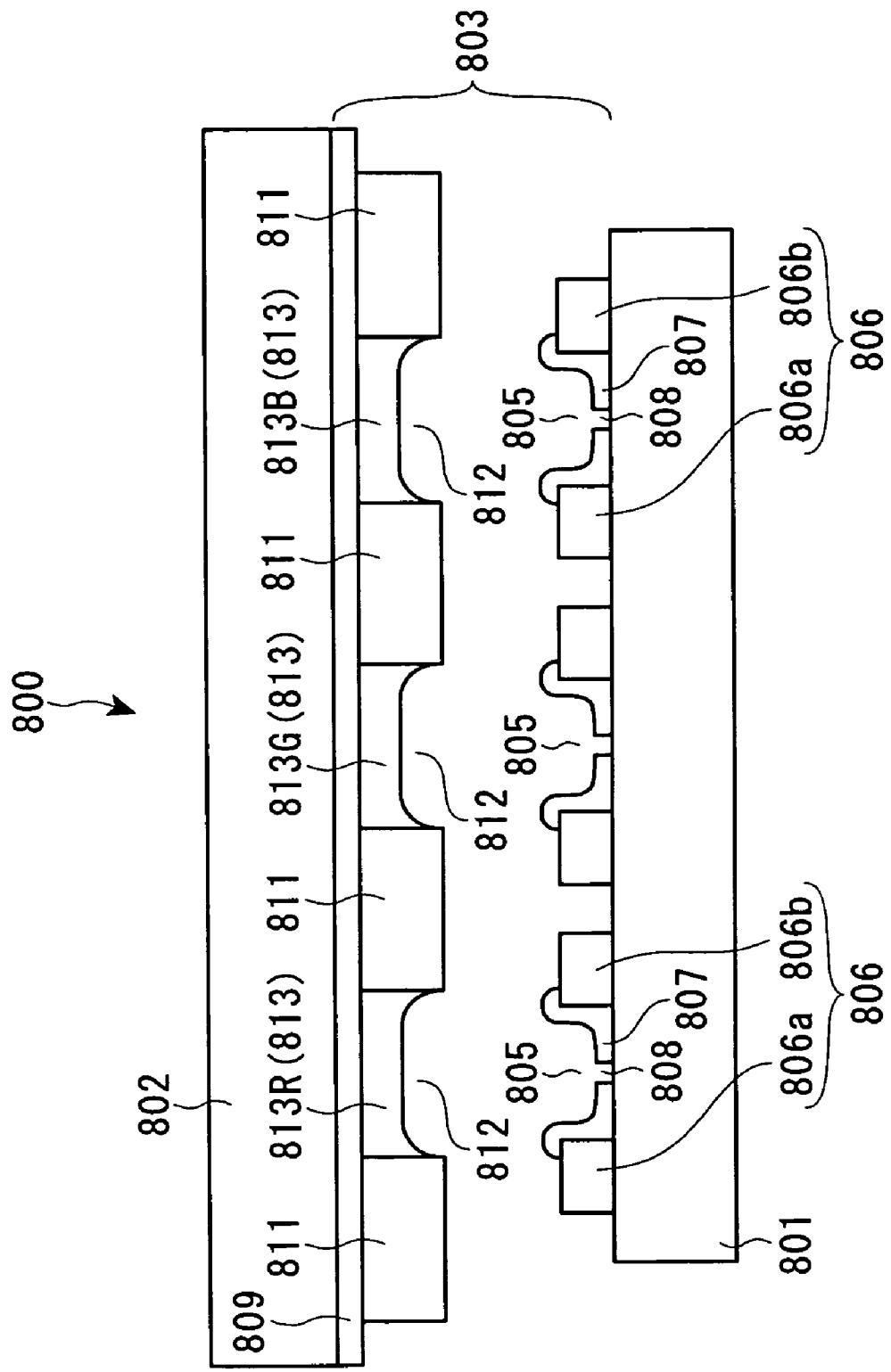
FIG. 33 is a cross section of an essential part of a display device as an electron emission device (FED device)

FIG. 33 is a cross section of an essential part of an electron emission device (also called FED or SED, hereinafter simply referred to as a display device 800). Note that, in the figure, the display device 800 is in a state where a part thereof is shown in cross section.

The display device 800 is roughly made up of mutually opposing first and second substrates 801 and 802, and a field-emission display portion 703 held between the first and second substrates. The field-emission display portion 803 is constituted of a plurality of electron-emitting portions 805 arranged in a matrix pattern.

The first substrate 801 has first and second element electrodes 806a and 806b constituting cathode electrodes 806 formed on the top surface thereof so as to be mutually orthogonal to each other. Furthermore, in a part partitioned by each of the first and second element electrodes 806a and 806b, a conductive film 807 having a gap formed therein is formed. In other words, the first element electrodes 806a, the second element electrodes 806b, and the conductive films 807c constitute the plurality of electron-emitting portion 805. Each of the conductive films 807 is made of palladium oxide (PdO) or the like, and the gap 808 is formed, for example, by means of foaming after the conductive film 807 is formed.

The second substrate 802 has anode electrodes 809 formed on the bottom surface thereof so as to oppose the cathode electrodes 806. Each of the anode electrodes 809 has bank portions 811 formed in a lattice pattern on the bottom surface thereof. In each of opening portions 812 oriented downward surrounded by the bank portions 811, phosphors 813 are arranged so as to correspond to the electron-emitting portions 805. The phosphors 813 emit fluorescent light of any one of the colors red (R), green (G), or blue (B). In each of the opening portions 812, red, green, and blue fluorescent materials 813R, 813G, and 813B are arranged in the above-described predetermined pattern.

The first substrate 801 and the second substrate 802 thus formed are bonded to each other so as to have a small gap therebetween. In the display device 800, an electron emitted from the first element electrodes 806a or the second element electrodes 806b as a cathode hits upon the phosphor 813 formed on the anode electrode 809 as an anode through the conductive film (gap 808) 807 so as to be excited to emit light, thereby providing color display.

In the same manner as those of other embodiments, the first element electrodes 806a, the second element electrodes 806b, the conductive films 807, and the anode electrodes 809 can be formed with the imaging apparatus 1, and the phosphors 813R, 813G, 813B corresponding to each of the colors can be formed with the imaging apparatus 1.

Figure 34A:
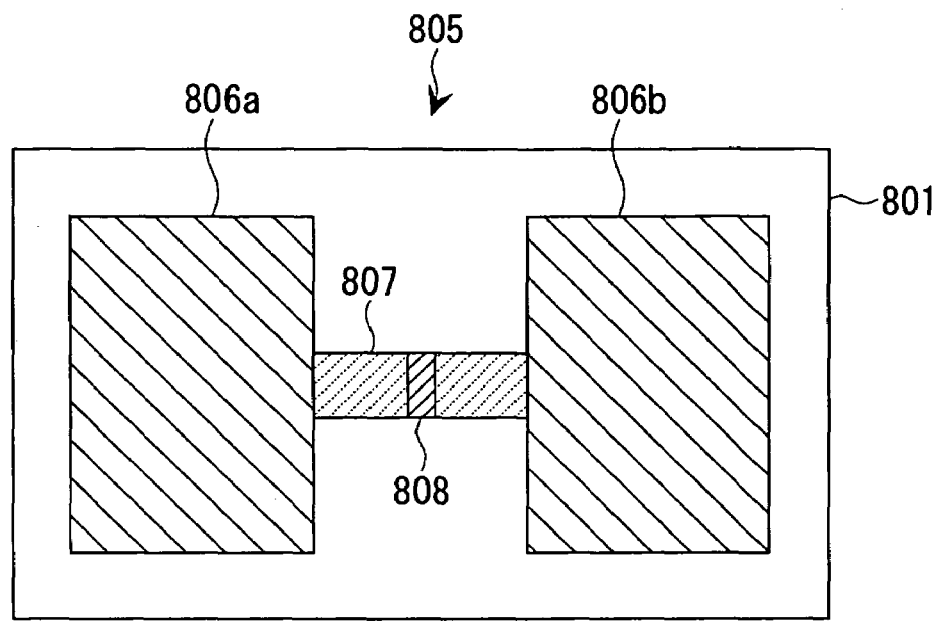
FIGS. 34A and 34B are plan views, each showing an electron-emitting portion and its surrounding components of the display device and a method of forming thereof.
Figure 34B:
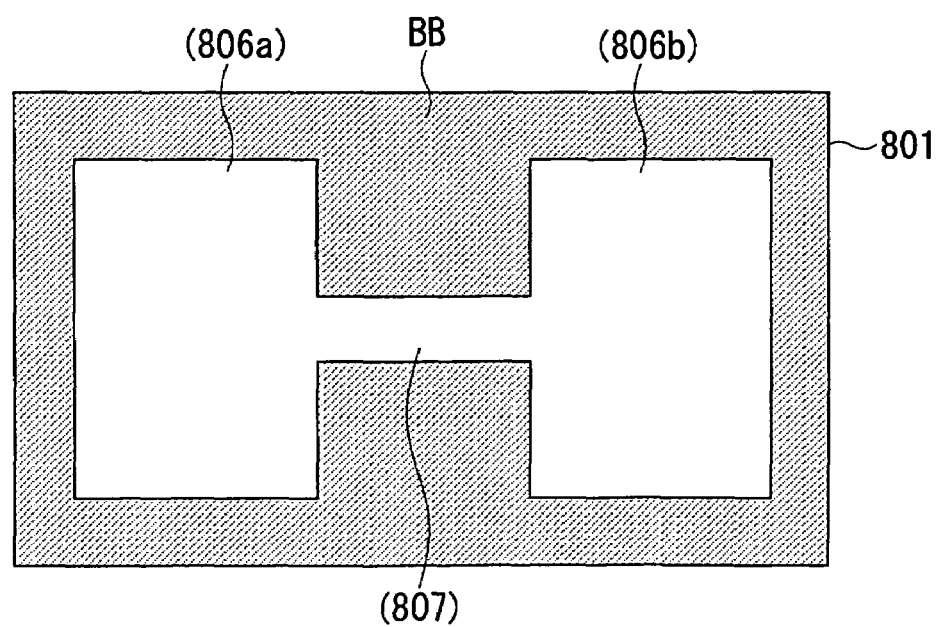

The first element electrode 806a, the second element electrode 806b, and the conductive film 807 are formed in a plan shape as shown in FIG. 34A. To deposit the first element electrode, the second element electrode, and the conductive film, a bank portion BB is formed (by means of photolithography process), while a portion where the first element electrode 806a, the second element electrode 806b, and the conductive film 807 are to be formed is left intact. Next, the first element electrode 806a and the second element electrode 806b are formed (by an ink-jet method of the imaging apparatus 1) in a groove portion constituted by the bank portion BB, the solvent used therefor is dried to deposit the above components, and then the conductive film 807 is formed (by an ink-jet method of the imaging apparatus 1). After the conductive film 807 is deposited, the bank portion BB is removed (by an ashing process), and then the above-described forming process is performed. Note that, in the same manner as the organic EL device as described above, it is preferable that the first and second substrates 801 and 802 and the bank portion 811 and BB be subjected to lyophilic treatment and liquid-repellent treatment, respectively.

Furthermore, examples of electro-optic devices include devices for forming metal wiring, lens, resist, light diffuser, or the like. Various electro-optic devices can efficiently be manufactured when the above-described imaging apparatus 1 is applied for manufacturing the same.

It is further understood by those skilled in the art that the foregoing is the preferred embodiment of the invention, and that various changes and modifications may be made without departing from the spirit and scope thereof.

What is claimed is:

1. A pressure-regulating valve which is interposed between a functional liquid droplet ejection head for ejecting a functional liquid droplet to perform an imaging process on a workpiece and a functional liquid tank for supplying a functional liquid to the functional liquid droplet ejection head, supplies to the functional liquid droplet ejection head through a secondary chamber a functional liquid introduced from the functional liquid tank to a primary chamber, and opens and closes a communication passage for communicating the primary chamber and the secondary chamber using, as a reference regulating pressure, atmospheric pressure which a diaphragm constituting one surface of the secondary chamber and exposed to atmosphere receives, the pressure-regulating valve comprising:

a valve housing forming the primary chamber and the secondary chamber;

a valve disc for opening and closing the communication passage; and a valve-disc energizing spring for energizing the valve disc in a valve-closing direction, using as a receiver a spring-receiving portion of the valve housing, wherein the valve housing is constituted of a housing main body and a lid body having the spring-receiving portion and detachably fastened to the housing main body with screws, one end of the valve-disc energizing spring is engaged to the lid body and the other end of the valve-disc energizing spring is engaged to the valve disc, and the valve-disc energizing spring is configured so as to be separated from the housing main body along with separation of the lid body.

2. The pressure-regulating valve according to claim 1, wherein the valve-disc energizing spring and the lid body are linked to each other.

3. The pressure-regulating valve according to claim 1, wherein the valve disc is configured so as to be separated from the housing main body along with separation of the valve-disc energizing spring.

4. The pressure-regulating valve according to claim 1, wherein the valve disc is constituted of a valve-disc main body and a valve seal detachably attached to the valve-disc main body.

5. The pressure-regulating valve according to claim 1, wherein
the valve-disc energizing spring is constituted of a coil spring, and
the valve disc is provided with a leading-end engaging portion where a leading-end portion on a valve-disc side of the valve-disc energizing spring is engaged in a positioned state.

6. The pressure-regulating valve according to claim 1, wherein the lid body is provided with a proximal-end engaging portion where the one end of the valve-disc energizing spring is engaged in a positioned state.

7. A functional liquid supplying apparatus comprising:
the functional liquid tank;
a functional liquid passage for connecting the functional liquid tank and the functional liquid droplet ejection head; and
the pressure-regulating valve according to claim 1 which is interposed in the functional liquid passage.

8. An imaging apparatus comprising:
the functional liquid supplying apparatus according to claim 7;
the functional liquid droplet ejection head; and
a moving unit for moving the functional liquid droplet ejection head relative to a workpiece.

9. A pressure-regulating valve which is interposed between a functional liquid droplet ejection head for ejecting a functional liquid droplet to perform an imaging process on a workpiece and a functional liquid tank for supplying a functional liquid to the functional liquid droplet ejection head,
supplies to the functional liquid droplet ejection head through a secondary chamber a functional liquid introduced from the functional liquid tank to a primary chamber, and
opens and closes a communication passage for communicating the primary chamber and the secondary chamber using, as a reference regulating pressure, atmospheric pressure which a diaphragm constituting one surface of the secondary chamber and exposed to atmosphere receives,
the pressure-regulating valve comprising:
a valve housing forming the primary chamber and the secondary chamber;
a valve disc for opening and closing the communication passage; and
a valve-disc energizing spring for energizing the valve disc in a valve-closing direction, using as a receiver a spring-receiving portion of the valve housing, wherein
the valve housing is constituted of a secondary-chamber housing forming the secondary chamber and the communication passage and of a primary-chamber housing having the spring-receiving portion and detachably fastened to the secondary-chamber housing with screws,
one end of the valve-disc energizing spring is engaged to the secondary-chamber housing and the other end of the valve-disc energizing spring is engaged to the valve disc, and
the valve-disc energizing spring is configured so as to be separated from the secondary-chamber housing along with separation of the primary-chamber housing.

10. A pressure-regulating valve which is interposed between a functional liquid droplet ejection head for ejecting a functional liquid droplet to perform an imaging process on a workpiece and a functional liquid tank for supplying a functional liquid to the functional liquid droplet ejection head,
supplies to the functional liquid droplet ejection head through a secondary chamber a functional liquid introduced from the functional liquid tank to a primary chamber, and
opens and closes a communication passage for communicating the primary chamber and the secondary chamber using, as a reference regulating pressure, atmospheric pressure which a diaphragm constituting one surface of the secondary chamber and exposed to atmosphere receives,
the pressure-regulating valve comprising:
a valve housing forming the primary chamber and the secondary chamber;
a valve disc for opening and closing the communication passage;
a valve-disc energizing spring for energizing the valve disc in a valve-closing direction, using as a receiver a spring-receiving portion of the valve housing;
a negative-pressure holding spring for energizing the diaphragm in a direction resisting atmospheric pressure; and
a diaphragm holder for holding the diaphragm in a stretched state, wherein
the diaphragm is detachably attached to the valve housing through the diaphragm holder, and the negative-pressure holding spring is configured so as to be separated from the valve housing along with separation of the diaphragm.

* * * * *